US012744308B2

(12) United States Patent
Kim et al.

(10) Patent No.: US 12,744,308 B2
(45) Date of Patent: Sep. 22, 2026

(54) BROADBAND ANTENNA FOR MOUNTING ON VEHICLE

(71) Applicant: LG ELECTRONICS INC., Seoul (KR)

(72) Inventors: Changil Kim, Seoul (KR); Changwon Yun, Seoul (KR); Yeomin Youn, Seoul (KR); Yongkon Kim, Seoul (KR); Cheolsoo Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 204 days.

(21) Appl. No.: 18/833,583

(22) PCT Filed: Feb. 7, 2022

(86) PCT No.: PCT/KR2022/001861
§ 371 (c)(1),
(2) Date: Jul. 26, 2024

(87) PCT Pub. No.: WO2023/149591
PCT Pub. Date: Aug. 10, 2023

(65) Prior Publication Data

US 2025/0105497 A1 Mar. 27, 2025

(51) Int. Cl.
*H01Q 1/32* (2006.01)
*H01Q 1/42* (2006.01)
*H01Q 13/10* (2006.01)

(52) U.S. Cl.
CPC .......... *H01Q 1/3275* (2013.01); *H01Q 1/422* (2013.01); *H01Q 13/10* (2013.01)

(58) Field of Classification Search
CPC ...... H01Q 1/3275; H01Q 1/422; H01Q 13/10; H01Q 5/35; H01Q 1/1214; H01Q 1/02;
(Continued)

(56) References Cited

U.S. PATENT DOCUMENTS 6,741,214 B1 * 5/2004 Kadambi ............ H01Q 9/0421 343/702
2021/0305688 A1 * 9/2021 Kim .................... H01Q 1/3208
(Continued)

FOREIGN PATENT DOCUMENTS

CN 213660633 7/2021
CN 213989188 8/2021
(Continued)

OTHER PUBLICATIONS

PCT International Application No. PCT/KR2022/001861, International Search Report dated Nov. 7, 2022, 4 pages.
(Continued)

*Primary Examiner* — Dimary S Lopez Cruz
*Assistant Examiner* — Austin M Back
(74) *Attorney, Agent, or Firm* — LEE, HONG, DEGERMAN, KANG & WAIMEY

(57) ABSTRACT

A vehicle according to an embodiment comprises: a roof structure, formed as the exterior of the vehicle, comprising a first fixing part and a second fixing part; and an antenna assembly mounted on the roof structure. The antenna assembly comprises: a first cover provided with first and second groove portions on the outer surface, and a plurality of coupling portions on the inner surface, the first groove portion coupling with the first fixing part of the roof structure, and the second groove portion coupling with the second fixing part of the roof structure; and a second cover coupling with the first cover. The second cover is made of metallic material and comprises four side portions.

22 Claims, 38 Drawing Sheets

(58) Field of Classification Search
CPC .......... H01Q 5/335; H01Q 5/50; H01Q 21/28; H05K 1/0243; H05K 2201/10098
See application file for complete search history.

(56) References Cited

U.S. PATENT DOCUMENTS

| | | | | |
|---|---|---|---|---|
| 2022/0037776 | A1* | 2/2022 | Sung .................... | H01Q 1/3275 |
| 2024/0332811 | A1* | 10/2024 | Sayama ............... | H01Q 1/1221 |

FOREIGN PATENT DOCUMENTS

| | | |
|---|---|---|
| CN | 113782970 | 12/2021 |
| KR | 10-2018-0044864 | 5/2018 |
| KR | 10-2021-0091175 | 7/2021 |
| WO | 2021117926 | 6/2021 |

OTHER PUBLICATIONS

European Patent Office Application Serial No. 22925058.4, Search Report dated Mar. 10, 2025, 5 pages.

* cited by examiner (a)

(b)

(a)

(b)

(a)

(b)

(a)

(b)

(a)

(b)

(a)

(b)

| SECTION | ANTENNA | 2D - CUT | CONTACT PORTION |
|---|---|---|---|
| A | V2X(1170) |  |  |
| B | MIMO (1110-1140) |  |  |
| C | Wi-Fi3 (1160c) |  |  |

BROADBAND ANTENNA FOR MOUNTING ON VEHICLE

CROSS-REFERENCE TO RELATED APPLICATION

This application is the National Stage filing under 35 U.S.C. 371 of International Application No. PCT/KR2022/001861, filed on Feb. 7, 2022, the contents of which are hereby incorporated by reference herein its entirety.

TECHNICAL FIELD

This specification relates to a broadband antenna disposed in a vehicle. One particular implementation relates to an antenna module having a broadband antenna that is capable of operating in various communication systems, and to a vehicle having the same.

BACKGROUND ART

A vehicle may perform wireless communication services with other vehicles or nearby objects, infrastructures, or a base station. In this regard, various communication services may be provided using Long Term Evolution (LTE) communication, 5G communication, or WiFi communication technology.

In order to provide these various wireless communication services in a vehicle, an antenna may be disposed on a glass of the vehicle, above or below a roof of the vehicle. When the antenna is disposed on the glass of the vehicle, it may be implemented with a transparent antenna material. Meanwhile, when the antenna is disposed above or below the roof of the vehicle, an effect on a vehicle body and the roof of the vehicle may cause a change in antenna performance.

In this regard, there is a problem in that a vehicle body and a vehicle roof are formed of a metallic material to block radio waves. Accordingly, a separate antenna structure may be disposed on a top of the vehicle body or the vehicle roof. Or, when the antenna structure is disposed on a bottom of the vehicle body or roof, a portion of the vehicle body or roof corresponding to a region where the antenna structure is disposed may be formed of a non-metallic material.

There is a need to provide wireless communication services in regions (areas) outside and inside a vehicle through vehicle antennas. In relation to this, when a vehicle antenna is disposed within the roof of the vehicle, there is a problem that it is difficult to provide a wireless signal to the region inside the vehicle.

In order to provide various communication services in addition to a 4G/5G communication service, various antenna elements need to be disposed in a vehicular antenna module. Since various antenna elements are disposed within a limited area of the antenna module, a problem arises in that interference occurs between the antenna elements.

In addition, a heat dissipation component needs to be disposed in such a manner as to dissipate heat generated in various electronic components disposed within the antenna module. This heat dissipation component may be formed of a metal material in such a manner as to absorb heat. In a case where the antenna elements are disposed adjacent to the heat dissipation component, a problem arises in that antenna performance decreases.

DISCLOSURE OF INVENTION

Technical Problem

Aspects of the present disclosure are to address the above-mentioned problem and other problems. More specifically, another aspect of the present disclosure is to provide an antenna module in which a plurality of antennas for 4G/5G communication are disposed.

A further aspect of the present disclosure is to provide an antenna module in which, in addition to a 4G/5G antenna, antennas such as a GNSS antenna, a Wi-Fi antenna, a V2X antenna, and an SDARS antenna are optimally disposed.

Still another aspect of the present disclosure is to provide various coupling structures of an antenna board and a TCU board in a vehicle antenna module.

Yet another aspect of the present disclosure is to improve antenna performance and heat dissipation performance in various coupling structures of an antenna board, and a TCU board in vehicular antenna module.

Another aspect of the present disclosure is to provide a configuration capable of maintaining isolation while optimizing antenna performances for multi-input/multi-output (MIMO) and WiFi.

Another aspect of the present disclosure is to apply a wireless signal to an inner region of a vehicle even in case where the exterior of a vehicle body or roof is made of a metal material.

Another aspect of the present disclosure is to provide an antenna operating in a dual mode while using a ground region of a body, which constitutes an antenna module, as an antenna.

Another aspect of the present disclosure is to improve antenna performance of an antenna module while maintaining a height of the antenna system at a predetermined level or less.

Another aspect of the present disclosure is to provide a structure for mounting an antenna module, which is capable of operating in a wide frequency band to support various communication systems, to a vehicle.

Solution to Problem

In order to accomplish the above-mentioned objects and other objects, according to one aspect of the present disclosure, there is provided a vehicle including: a roof structure including an antenna assembly that is formed as part of the exterior appearance of the vehicle, and a fixing part and a second fixing part; and an antenna assembly disposed in the roof structure. In the vehicle, the antenna assembly includes: a first cover including a first groove portion and a second groove portion in the outer-side surface and a plurality of coupling portions in the inner-side surface, the first groove portion being coupled to the first fixing part of the roof structure, and the second groove portion being coupled to the second fixing part of the roof structure; and a second cover coupled to the first cover. The second cover is formed of a metal material and includes four side portions.

In the antenna assembly, a first side portion and a third side portion of the four side portions are opposite portions, a second side portion and a fourth side portion thereof are opposite portions, the first side portion includes a first slot radiation portion and a second slot radiation portion, the third side portion includes a third slot radiation portion and a fourth slot radiation portion, the second side portion includes a first recess segment and a first protrusion part within the first recess segment, and the fourth side portion includes a second recess segment and a second protrusion part within the second recess segment.

In the vehicle, the antenna assembly includes: a first printed circuit board (PCB) disposed in an inner space formed by the first cover and the second cover, the first PCB including a wireless communication control IC configured to process a wireless signal, and the first PCB including a first feeder (feeding part) and a second feeder; a second PCB disposed in the inner space formed by the first cover and the second cover, the second PCB including a third feeder and a fourth feeder, and the second PCB being coupled to the first PCB; and a plurality of antenna structures disposed in the inner space formed by the first cover and the second cover, the plurality of antenna structures including a first radiator, a second radiator, a third radiator, and a fourth radiator.

In the antenna assembly, the first radiator includes a first conductive pattern and a first slot radiation portion. The first conductive pattern is disposed between the first cover and the first PCB. The first conductive pattern is electrically connected to the first feeder disposed in the vicinity of the first slot radiation portion.

In the antenna assembly, the second radiator includes a second conductive pattern and a second slot radiation portion. The second conductive pattern is disposed between the first cover and the first PCB. The second conductive pattern is electrically connected to the second feeder disposed in the vicinity of the second slot radiation portion.

In the antenna assembly, the third radiator includes a third conductive pattern and a third slot radiation portion. The third conductive pattern is disposed between the first cover and the second PCB. The third conductive pattern is electrically connected to the third feeder disposed in the vicinity of the third slot radiation portion.

In the antenna assembly, the fourth radiator includes a fourth conductive pattern and a fourth slot radiation portion. The fourth conductive pattern is disposed between the first cover and the second PCB. The fourth conductive pattern is electrically connected to the fourth feeder disposed in the vicinity of the fourth slot radiation portion.

In the antenna assembly, the first fixing part and the first protrusion part are fixed to the first groove portion by a first coupling member. The second fixing part and the second protrusion part are fixed to the second groove portion by the second coupling member.

In the vehicle, a first part of the first PCB may be disposed between the first slot radiation portion and the second slot radiation portion. A second part of the first PCB may be disposed between the first recess segment and the second recess segment. The second PCB may be disposed between the third slot radiation portion and the fourth slot radiation portion.

In the vehicle, the first PCB may further include a first connector positioned on a first part of the first PCB. The second PCB may further include a second connector configured to be coupled to the first connector of the first PCB.

In the vehicle, the first PCB may further include a first ground portion. The first ground and the second cover may be connected at a plurality of contact points. The second PCB may further include a second ground portion. The second ground portion and the second cover may be connected at a plurality of contact points.

In the vehicle, the wireless communication control IC on the first PCB may be disposed on the second part of the first PCB. The first cover may include an opening area. The opening area in the first cover may be disposed to face the wireless communication control IC on the first PCB.

In the vehicle, the opening area in the first cover may be covered by a heat sink having a metal structure. Heat generated by the wireless communication control IC may be transferred to the heat sink.

In the vehicle, the first slot radiation portion and the second slot radiation portion may be in parallel to the first side portion. The first slot radiation portion may be configured to have a greater size than the second slot radiation portion.

In the vehicle, the first PCB may further include a fifth feeder. The first slot radiation portion may include a fifth conductive pattern connected to the second cover. The fifth conductive pattern may be electrically connected to the fifth feeder within the first slot radiation portion. The first feeder and the fifth conductive pattern may be disposed on the opposite surfaces of the first PCB.

In the vehicle, the third slot radiation portion and the fourth slot radiation portion may be in parallel to the third side portion. The third slot radiation portion may be configured to have a smaller size than the fourth slot radiation portion.

In the vehicle, the first slot radiation portion may be covered by a first dielectric cover within the second cover. The second slot radiation portion may be covered by a second dielectric cover within the second cover. The third slot radiation portion may be covered by a third dielectric cover within the second cover. The fourth slot radiation portion may be covered by a fourth dielectric cover within the second cover.

In the vehicle, the first protrusion part may be connected at the middle portion of the first recess segment. The second protrusion part may be connected at the middle portion of the second recess segment. The second protrusion part may further include a sub-protrusion portion that protrudes toward the second slot radiation portion within the second recess segment.

In the vehicle, the plurality of coupling portions positioned on an inner-side of the first cover may include a first coupling portion, a second coupling portion, a third coupling portion, and a fourth coupling portion. The first conductive pattern may include a first sub pattern and a second sub pattern. The first sub pattern may be disposed on the first coupling portion positioned on the inner-side surface of the first cover, the first sub pattern may overlap the first slot radiation portion of the second cover, and the second sub pattern may be electrically connected to the first sub pattern and the first feeder.

The second conductive pattern may include a third sub pattern and a fourth sub pattern. The third sub pattern may be disposed on the second coupling portion positioned on the inner-side surface of the first cover, the third sub pattern may overlap the second slot radiation portion of the second cover, and the fourth sub pattern may be electrically connected to the third sub pattern and the second feeder.

The third conductive pattern may include a fifth sub pattern and a sixth sub pattern. The fifth sub pattern may be disposed on the third coupling portion positioned on the inner-side surface of the first cover, the fifth sub pattern may overlap the third slot radiation portion of the second cover, and the sixth sub pattern may be electrically connected to the fifth sub pattern and the third feeder.

The fourth conductive pattern may include a seventh sub pattern and an eighth sub pattern. The seventh sub pattern may be disposed on the fourth coupling portion positioned on the inner-side surface of the first cover, the seventh sub pattern may overlap the fourth slot radiation portion of the second cover, and the eighth sub pattern may be electrically connected to the seventh sub pattern and the fourth feeder.

In the vehicle, the first sub pattern, the third sub pattern, the fifth sub pattern, and the seventh sub pattern may be disposed at a higher portion than the heat sink.

In the vehicle, the first sub pattern, the third sub pattern, the fifth sub pattern, and the seventh sub pattern may be disposed to be spaced a distance of 10 mm or greater apart away from the heat sink.

In the vehicle, each of the antenna structures may include a monopole antenna portion and a bottom slot antenna portion.

In the vehicle, each of the antenna structures may operate as a 4×4 Multi-input Multi-output (MIMO) system in frequency bands of 600 MHz to 6 GHz.

In the vehicle, each of the antenna structures may be disposed within a volume size of width 86 mm, length 43 mm, and height 17 mm.

In the vehicle, the first fixing part and the second fixing part may have the shape of a bolt. The first coupling member and the second coupling member may have the shape of a nut.

In the vehicle, when a signal received from the third radiator or the fourth radiator falls below a predetermined level, the wireless communication control IC may be configured to receive only a signal received from the first radiator or the second radiator.

According to another aspect of the present disclosure, there is provided a vehicle including" a roof structure formed as part of the exterior appearance of the vehicle and including a first fixing part and a second fixing part; and an antenna assembly disposed in the roof structure. In the vehicle, the antenna assembly includes: a first printed circuit board (PCB) disposed in an inner space formed by the first cover and the second cover, the first PCB including a wireless communication control IC configured to process a wireless signal; and a second PCB disposed in the inner space formed by the first cover and the second cover, the second PCB including a first feeder, a second feeder, a third feeder, and a fourth feeder, and the second PCB being coupled to the first PCB.

According to still another aspect of the present disclosure, there is provided a vehicle including: a roof structure formed as part of the exterior appearance of the vehicle and including a first fixing part and a second fixing part; and an antenna assembly disposed in the roof structure. In the vehicle, the antenna assembly includes: a first printed circuit board (PCB) disposed in an inner space formed by the first cover and the second cover, the first PCB including a wireless communication control IC configured to process a wireless signal, the first PCB including a first feeder; and a second PCB disposed in the inner space formed by the first cover and the second cover, the second PCB including a second feeder, a third feeder, and a fourth feeder, and the second PCB being coupled to the first PCB.

In the vehicle, a first part of the first PCB may be disposed between the first slot radiation portion and the second slot radiation portion. A second part of the first PCB may be disposed between the first recess segment and the second recess segment. A first part of the second PCB may be disposed between the third slot radiation portion and the fourth slot radiation portion. A second part of the second PCB may be disposed between the first slot radiation portion and the first slot radiation portion.

Advantageous Effects of Invention

Technical effects of an antenna module including a broadband antenna mounted to the vehicle mentioned above and the vehicle to which the antenna module is mounted are described as follows.

According to the present disclosure, the performance of each antenna can be optimized in the antenna module in which a plurality of antennas for 4G/5G communication are disposed.

According to the present disclosure, the antenna module in which, in addition to a 4G/5G antenna, antennas such as a GNSS antenna, a Wi-Fi antenna, and an SDARS antenna are optimally disposed can be configured. In this regard, the size of a metal pattern of the 4G/5G antenna can be reduced, and at the same time, the antenna performance can be maintained.

According to the present disclosure, various coupling structures of an antenna board and a TCU board can be provided in the vehicular antenna module. In this regard, the antenna board and the TCU board can be coupled to each other on the same plane. In addition, a plurality of antenna elements can be connected to a feeding pattern of the antenna board or the TCU board in order to optimize the size of all antennas.

According to the present disclosure, antenna performance and heat dissipation performance can be improved in various coupling structures of the antenna board and the TCU board in the vehicular antenna modules. In this regard, 4G/5G antenna elements can be disposed on top and bottom of one side and on top and bottom of another side of the antenna module, and a heat sink can be disposed in the center area of the antenna module.

According to the present disclosure, isolation can be maintained while optimizing both antenna performance for MIMO and antenna performance for WiFi. In this regard, the Wi-Fi antenna can be realized by forming a slot structure in a lower cover disposed in a lower area of at least one of the antennas.

According to the present disclosure, even in a case where a body of the vehicle or one portion of a roof of the vehicle is formed of a metal material, a wireless signal can be provided to a region inside the vehicle. In this regard, an upper cover of the antenna module can be made of a dielectric material, and a slot antenna can be realized in the lower cover formed of a metal material.

According to the present disclosure, the antenna operating in a dual mode is enabled to operate in a dual mode while utilizing a ground region of the body, which constitutes the antenna module, as an antenna. In this regard, the slot antenna can be realized in the lower cover formed of a metal material, and another radiator can be disposed in an upper area.

According to the present disclosure, the antenna performance can be improved while maintaining the height of the antenna module at a predetermined level or less. In this regard, each radiator of the 4G/5G antenna can be formed to have a three-dimensional structure and can be designed in such a manner that the height thereof is minimized.

According to the present disclosure, a structure for mounting the antenna module, which is capable of operating in a wide frequency band to support various communication systems, to the vehicle can be provided. In this regard, the antenna module in which, in addition to a 4G/5G antenna, antennas such as a GNSS antenna, a Wi-Fi antenna, a V2X antenna, and an SDARS antenna are optimally disposed can be configured.

Further scope of applicability of the present disclosure will become apparent from the foregoing detailed description. It should be understood, however, that the detailed description and specific examples, such as the preferred embodiment of the present disclosure, are given by way of illustration only, since various modifications and alternations within the spirit and scope of the disclosure will be apparent to those skilled in the art.

MODE FOR THE INVENTION

Description will now be given in detail according to exemplary implementations disclosed herein, with reference to the accompanying drawings. For the sake of brief description with reference to the drawings, the same or equivalent components may be provided with the same or similar reference numbers, and description thereof will not be repeated. A suffix "module" or "unit" used for elements disclosed in the following description is merely intended for easy description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms "include" or "has" used herein should be understood that they are intended to indicate the existence of a feature, a number, a step, an element, a component or a combination thereof disclosed in the specification, and it may also be understood that the existence or additional possibility of one or more other features, numbers, steps, elements, components or combinations thereof are not excluded in advance.

An antenna system described herein may be mounted on a vehicle. Configurations and operations according to implementations may also be applied to a communication system, namely, antenna system mounted on a vehicle. In this regard, the antenna system mounted in the vehicle may include a plurality of antennas, and a transceiver circuitry and a processor that control the plurality of antennas.

Figure 1A:
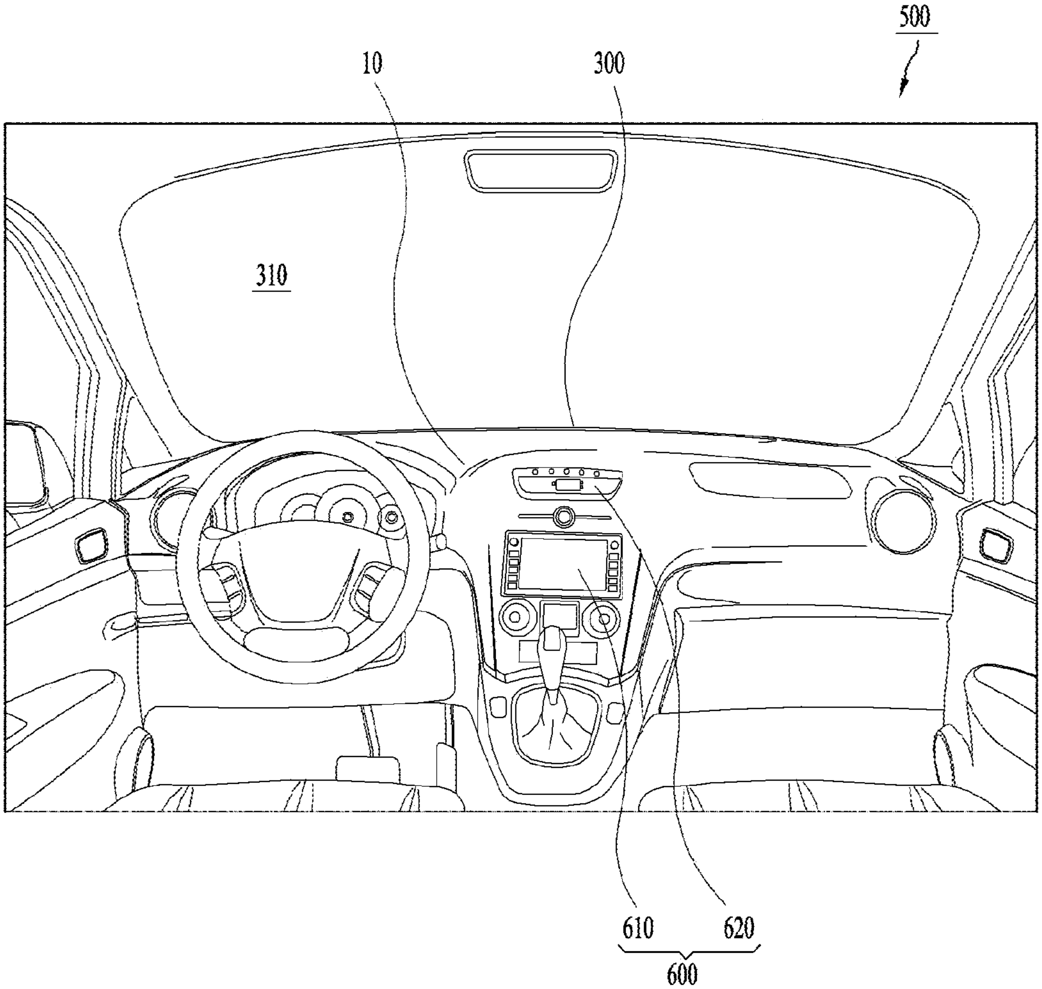
FIG. 1A is a diagram illustrating an internal configuration of a vehicle in accordance with one example.
Figure 1B:
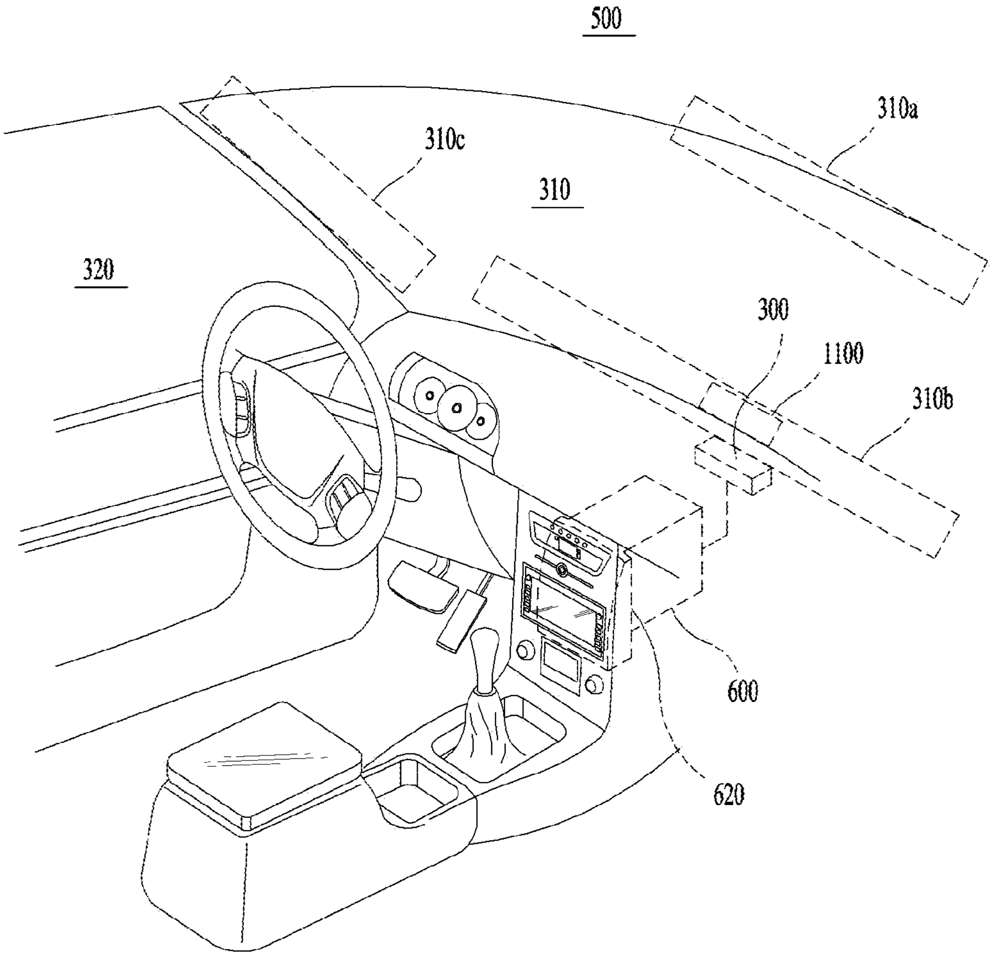
FIG. 1B is a lateral view illustrating the vehicle interior in accordance with the one example.

FIG. 1A is a diagram illustrating a vehicle interior in accordance with one example. FIG. 1B is a lateral view illustrating the vehicle interior in accordance with the one example.

As illustrated in FIGS. 1A and 1B, the present disclosure describes an antenna unit (i.e., an internal antenna system) 1000 capable of transmitting and receiving signals through GPS, 4G wireless communication, 5G wireless communication, Bluetooth, or wireless LAN. Therefore, the antenna unit (i.e., the antenna system) 1000 capable of supporting these various communication protocols may be referred to as an integrated antenna module 1000. The antenna system 1000 may include a telematics control unit (TCU) 300 and an antenna assembly 1100. For example, the antenna assembly 1100 may be disposed on a window of a vehicle.

The present disclosure also describes a vehicle 500 having the antenna system 1000. The vehicle 500 may include a dashboard and a housing 10 including the telematics control unit (TCU) 300, and the like. In addition, the vehicle 500 may include a mounting bracket for mounting the telematics control unit (TCU) 300.

The vehicle 500 may include the telematics control unit (TCU) 300 and an infotainment unit 600 configured to be connected to the telematics control unit 300. A portion of a front pattern of the infotainment unit 600 may be implemented in the form of a dashboard of the vehicle. A display 610 and an audio unit 620 may be included in the dashboard of the vehicle.

The antenna assembly 1100, namely, the antenna module 1100 in the form of a transparent antenna may be disposed at at least one of an upper region 310*a*, a lower region 310*b*, and a side region 310*c* of a front window 310. The antenna assembly 1100 may also be disposed at a side window 320, which is disposed at a side surface of the vehicle, in addition to the front window 310.

As illustrated in FIG. 1B, when the antenna assembly 1100 is disposed at the lower region 310*b* of the front window 310, it may be operably coupled to a TCU 300 disposed inside the vehicle. When the antenna assembly 1100 is disposed at the upper region 310*a* or the side region 310*c* of the front window 310, it may be operably coupled to a TCU disposed outside the vehicle. However, the present disclosure may not be limited to the TCU coupling configuration inside or outside the vehicle.

<V2X (Vehicle-to-Everything)>

V2X communication may include communications between a vehicle and all entities, such as V2V (Vehicle-to-Vehicle) which refers to communication between vehicles, V2I (Vehicle-to-Infrastructure) which refers to communication between a vehicle and an eNB or RSU (Road Side Unit), V2P (Vehicle-to-Pedestrian) which refers to communication between a vehicle and a terminal possessed by a person (pedestrian, cyclist, vehicle driver, or passenger), V2N (vehicle-to-network), and the like.

V2X communication may have the same meaning as V2X sidelink or NR V2X or may have, in a broader sense, a meaning including V2X sidelink or NR V2X.

V2X communication can be applied to various services, for example, forward collision warning, an automatic parking assist system, cooperative adaptive cruise control (CACC), control-loss warning, traffic queuing warning, safety warning, traffic vulnerable-area safety warning, emergency vehicle warning, curved-road driving speed warning, and traffic flow control.

V2X communication may be provided through a PC5 interface and/or a Uu interface. In this case, specific network entities for supporting communications between a vehicle and all entities may exist in a wireless communication system supporting V2X communication. For example, the network entity may include a base station (eNB), a Road Side Unit (RSU), a terminal, or an application server (e.g., a traffic safety server).

In addition, a terminal performing V2X communication may refer to not only a general handheld UE but also a vehicle (V-UE), a pedestrian UE, an RSU of an cNB type, an RSU of a UE type, a robot equipped with a communication module, and the like.

V2X communication may be performed directly between terminals or may be performed through the network entity (entities). V2X operation modes may be classified according to a method of performing such V2X communication.

Terms used in V2X communication may be defined as follows.

A Road Side Unit (RSU) is a V2X service enabled device that can transmit and receive data to and from a moving vehicle using V2I service. The RSU also serves as a stationary infrastructure entity that supports V2X application programs, and may exchange messages with other entities that support V2X application programs. The RSU is a term frequently used in existing ITS specifications, and the reason for introducing this term to the 3GPP specifications is to make the documents easier to read for the ITS industry. The RSU is a logical entity that combines a V2X application logic with the functionality of an eNB (referred to as an eNB-type RSU) or a UE (referred to as a UE-type RSU).

V2I Service is a type of V2X service, where one party is a vehicle whereas the other party is an entity belonging to infrastructure. A V2P Service is also a type of V2X service, where one party is a vehicle and the other party is a device carried by a person (e.g., a portable terminal carried by a pedestrian, a cyclist, a driver, or an occupant other than the driver). A V2X Service is a type of 3GPP communication service that involves a transmitting or receiving device on a vehicle. The V2X service may further be divided into a V2V service, a V2I service, and a V2P service according to which partner is involved in communication for the V2X service.

V2X enabled UE is a UE that supports V2X service. The V2V Service is a type of V2X service, where both parties involved in communication are vehicles. V2V communication range is a direct communication range between two vehicles involved in the V2V service.

Figure 2A:
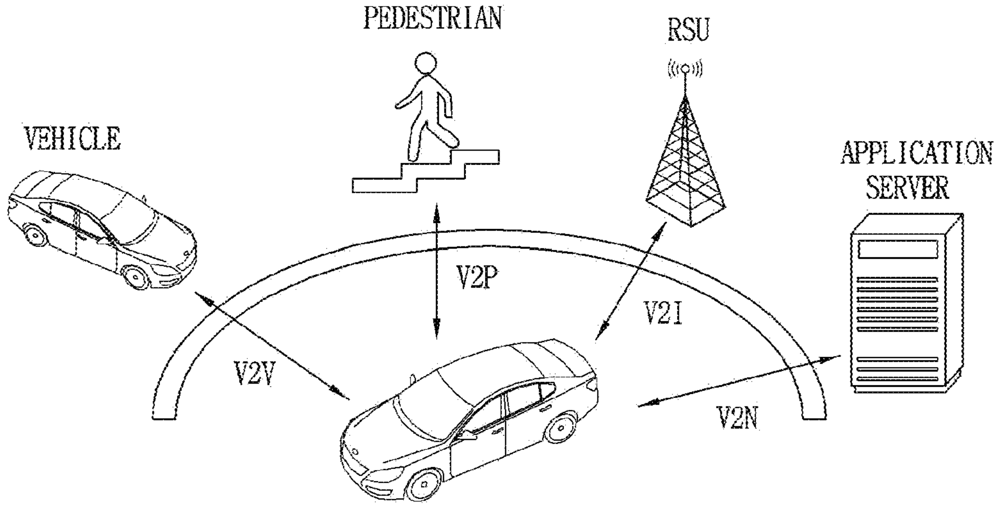
FIG. 2A is a diagram illustrating a type of V2X application.

Four types of V2X applications called Vehicle-to-Everything (V2X), as described above, include (1) vehicle-to-vehicle (V2V), (2) vehicle-to-infrastructure (V2I), (3) vehicle-to-network (V2N), (4) vehicle-to-pedestrian (V2P). FIG. 2A illustrates types of V2X applications. Referring to FIG. 2A, the four types of V2X applications may use "cooperative awareness" to provide more intelligent services for end-users.

This means that, in order to provide more intelligent information, such as cooperative collision warning or autonomous traveling, entities, such as vehicles, roadside-based facilities, application servers and pedestrians, may collect knowledge of involved local environments (e.g., information received from nearby vehicles or sensor equipment) to process and share the corresponding knowledge.

<NR V2X>

In 3GPP Releases 14 and 15, support of the V2V and V2X services in LTE has been introduced in order to extend the 3GPP platform to the automotive industry.

Requirements for support of enhanced V2X use cases are largely organized into four use case groups.

(1) Vehicles Platooning enables the vehicles to dynamically form a platoon traveling together. All the vehicles in the platoon obtain information from the leading vehicle to manage this platoon. These information allow the vehicles to drive closer than normal in a coordinated manner, going to the same direction and traveling together.

(2) Extended Sensors enable the exchange of raw or processed data gathered through local sensors or live video images among vehicles, road site units, devices of pedestrians and V2X application servers. The vehicle can recognize an environment much more than through detection by its sensor and can recognize a local situation as a whole in a more extensive manner. A high data transmission rate is one of primarily features of the extended sensor.

(3) Advanced Driving enables semi-automatic or fully-automatic driving. The advanced driving enables each vehicle and/or each RSU to share self-recognition data obtained from a local sensor with a nearby vehicle and to synchronize and adjust a trajectory or a maneuver. Each vehicle shares its intention to drive with a nearby vehicle.

(4) Remote driving serves to enable a remote driver or a V2X application program to drive a remotely-located vehicle in a dangerous environment by him/herself or itself or instead of an occupant who cannot drive the remotely-located vehicle. In a case where a traffic environment is limitedly changed and a vehicle driving path is predictable such as in public transportation, driving based on cloud computing may be available. High reliability and low latency are main requirements for the remote driving.

A description to be given below may be applicable to all of NR SL (sidelink) and LTE SL, and when no radio access technology (RAT) is indicated, the NR SL is meant. Six operational scenarios considered in NR V2X may be considered as follows. In this regard, FIG. 2B illustrates a standalone scenario supporting V2X SL communication and an MR-DC scenario supporting V2X SL communication.

In particular, 1) in Scenario 1, gNB provides control/configuration for UE's V2X communication in both LTE SL and NR SL. 2) In Scenario 2, ng-eNB provides control/configuration for UE's V2X communication in both LTE SL and NR SL. 3) In Scenario 3, eNB provides control/configuration for UE's V2X communication in both LTE SL and NR SL. On the other hand, 4) in Scenario 4, the UE's V2X communication in the LTE SL and the NR SL is controlled/configured by Uu while the UE is configured with EN-DC. 5) In Scenario 5, the UE's V2X communication in the LTE SL and the NR SL is controlled/configured by Uu while the UE is configured in NE-DC. 6) In Scenario 6, the UE's V2X communication in the LTE SL and the NR SL is controlled/configured by Uu while the UE is configured in NGEN-DC.

Figure 2B:
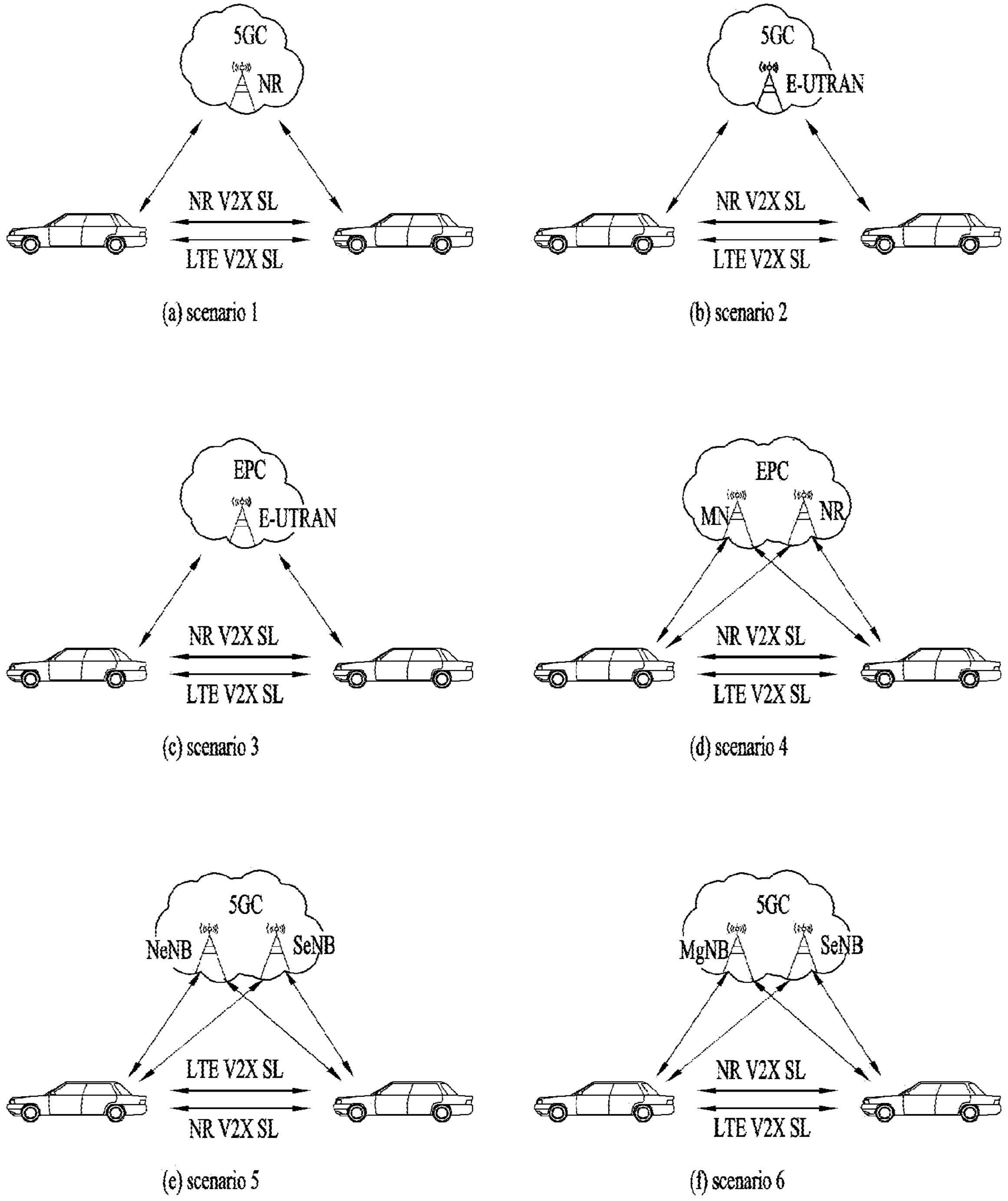
FIG. 2B illustrates a standalone scenario supporting V2X SL communication and an MR-DC scenario supporting V2X SL communication.

In order to support the V2X communication, as illustrated in FIGS. 2A and 2B, the vehicle may perform wireless communication with eNB and/or gNB through an antenna system. The antenna system may be configured as an internal antenna system as illustrated in FIGS. 1A and 1B. The antenna system may alternatively be implemented as an external antenna system and/or an internal antenna system as illustrated in FIGS. 3A to 3C.

Figure 3A:
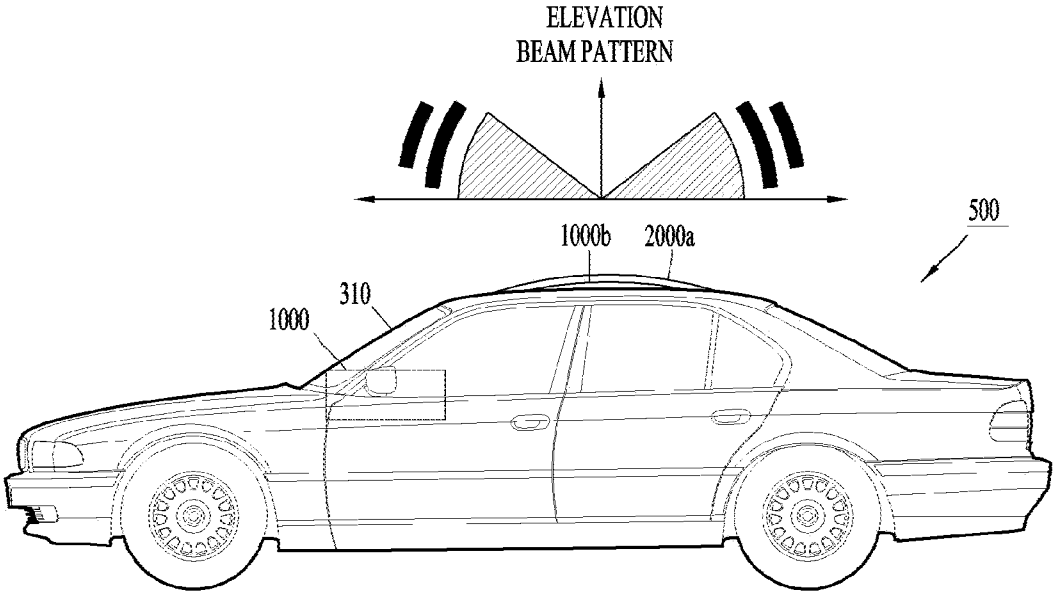
FIGS. 3A to 3C are views illustrating a structure for mounting an antenna system in a vehicle, to which the antenna system is mounted.
Figure 3B:
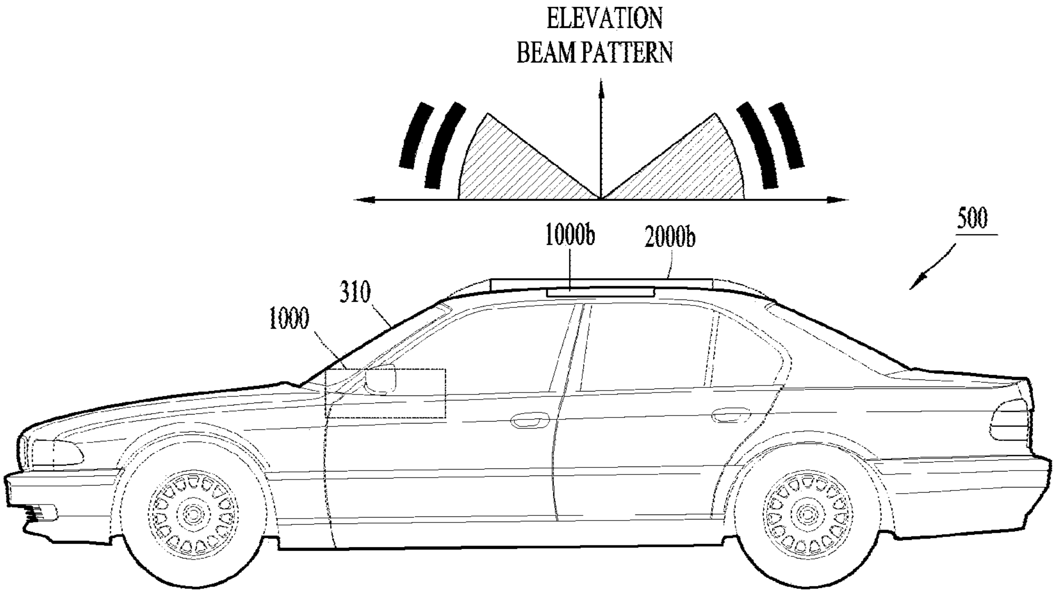
Figure 3C:
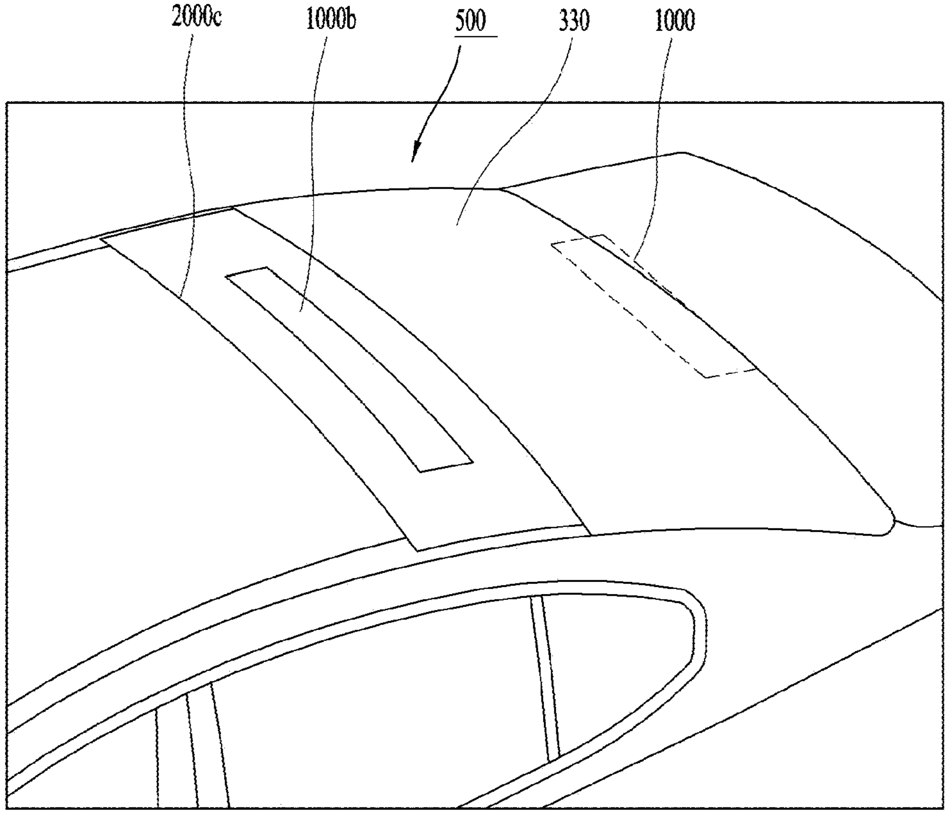

FIGS. 3A to 3C are views illustrating an example of a structure for mounting an antenna system on a vehicle, which includes the antenna system mounted on the vehicle. In this regard, FIGS. 3A to 3C illustrate a configuration capable of performing wireless communication through a transparent antenna disposed on the front window 310 of the vehicle. An antenna system 1000 including a transparent antenna may be disposed on a front window of a vehicle and inside the vehicle. Wireless communication may also be performed through a transparent antenna disposed on a side glass of the vehicle, in addition to the front window.

The antenna system for the vehicle that includes the transparent antenna can be combined with other antennas. Referring to FIGS. 3A to 3C, in addition to the antenna system 1000 implemented as the transparent antenna, a separate antenna system 1000*b* may be further configured. FIGS. 3A and 3B illustrate a structure in which the antenna system 1000*b*, in addition to the antenna system 1000, is mounted on or in a roof of the vehicle. On the other hand, FIG. 3C illustrates a structure in which the separate antenna system 1000*b*, in addition to the antenna system 1000, is mounted in a roof frame of a roof and a rear mirror of the vehicle.

Referring to FIGS. 3A to 3C, in order to improve the appearance of the vehicle and to maintain a telematics performance at the time of collision, an existing shark fin antenna may be replaced with a flat antenna of a non-protruding shape. In addition, the present disclosure proposes an integrated antenna of an LTE antenna and a 5G antenna considering fifth generation (5G) communication while providing the existing mobile communication service (e.g., LTE).

Referring to FIG. 3A, the antenna system 1000 implemented as the transparent antenna may be disposed on the front window 310 of the vehicle and inside the vehicle. The second antenna system 1000*b* corresponding to an external antenna may be disposed on the roof of the vehicle. In FIG. 3A, a radome 2000*a* may cover the second antenna system 1000*b* to protect the second antenna system 1000*b* from an external environment and external impacts while the vehicle travels. The radome 2000*a* may be made of a dielectric material through which radio signals are transmitted/received between the second antenna system 1000*b* and a base station.

Referring to FIG. 3B, the antenna system 1000 implemented as the transparent antenna may be disposed on the front window 310 of the vehicle and inside the vehicle. One the other hand, the second antenna system 1000*b* corresponding to the external antenna may be disposed within a roof structure of the vehicle and at least part of the roof structure 2000*b* may be made of a non-metallic material. At this time, the roof structure 2000*b* of the vehicle except for the at least part made of the non-metallic material may be made of a dielectric material through which radio signals are transmitted/received between the antenna system 1000*b* and the base station.

Referring to FIG. 3C, the antenna system 1000 implemented as the transparent antenna may be disposed on the rear window 330 of the vehicle and inside the vehicle. The second antenna system 1000*b* corresponding to the external antenna may be disposed within the roof frame 2000*c* of the vehicle, and at least part of the roof frame 2000*c* may be made of a non-metallic material. At this time, the roof frame 2000*c* of the vehicle 500 except for the at least part made of the non-metallic material may be made of a dielectric material through which radio signals are transmitted/received between the second antenna system 1000*b* and the base station.

Referring to FIGS. 3A to 3C, antennas provided in the antenna system 1000 mounted on the vehicle may form a beam pattern in a direction perpendicular to the front window 310 or the rear window 330. Antenna provided in the second antenna system 1000 mounted on the vehicle may further define a beam coverage by a predetermined angle in a horizontal region with respect to the vehicle body.

Meanwhile, the vehicle 500 may include only the antenna unit (i.e., the internal antenna system) 1000 corresponding to the internal antenna without the antenna system 1000*b* corresponding to the external antenna.

Figure 4:
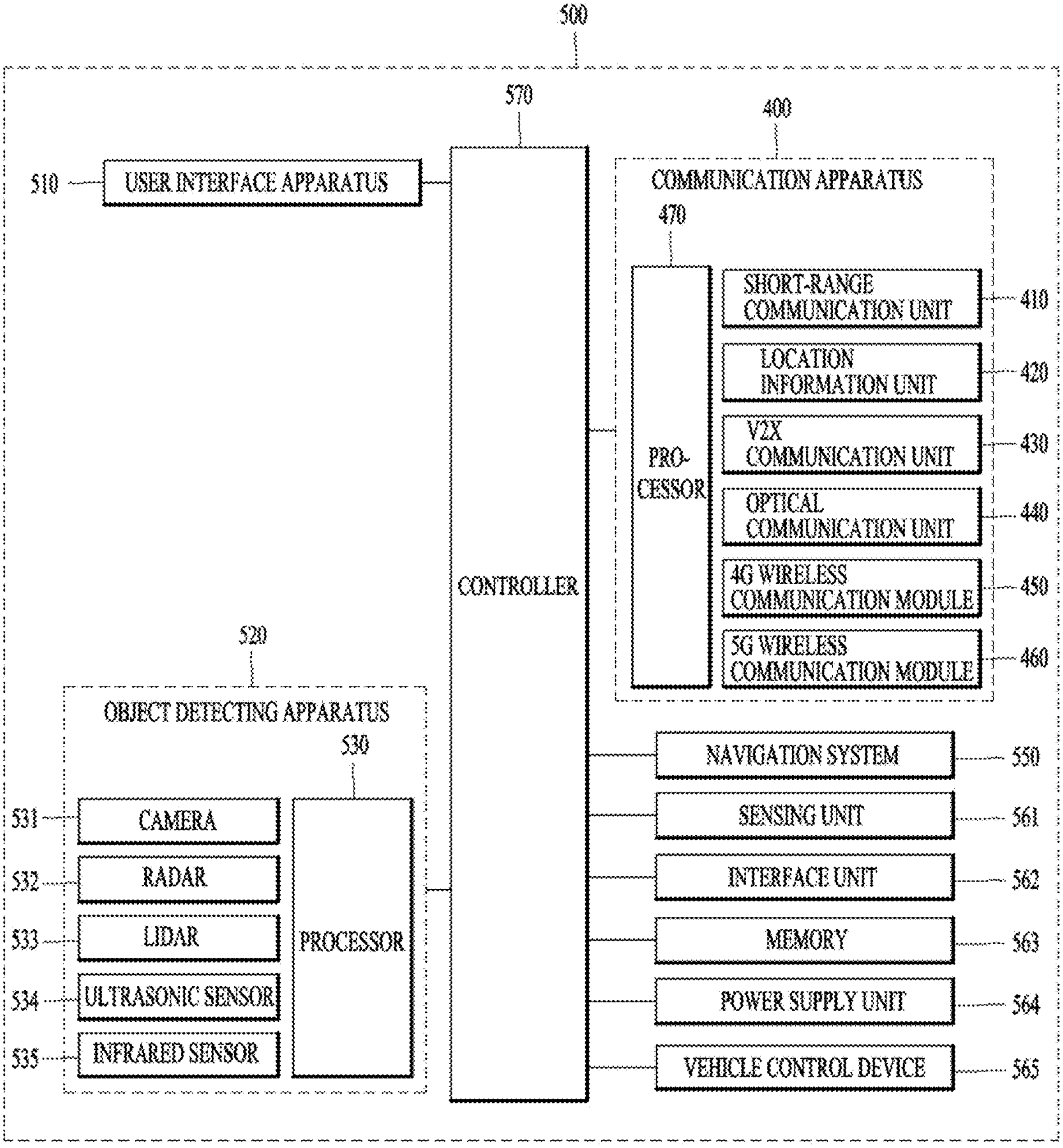
FIG. 4 is a block diagram illustrating a vehicle and an antenna system mounted to the vehicle in accordance with one example.

Meanwhile, FIG. 4 is a block diagram illustrating a vehicle and an antenna system mounted on the vehicle in accordance with an implementation.

The vehicle 500 may be an autonomous (driving) vehicle. The vehicle 500 may be switched into an autonomous driving mode or a manual mode (a pseudo driving mode) based on a user input. For example, the vehicle 500 may be switched from the manual mode into the autonomous mode or from the autonomous mode into the manual mode based on a user input received through a user interface apparatus 510.

In relation to the manual mode and the autonomous driving mode, operations such as object detection, wireless communication, navigation, and operations of vehicle sensors and interfaces may be performed by the telematics control unit mounted on the vehicle 500. Specifically, the telematics control unit mounted on the vehicle 500 may perform the operations in cooperation with the antenna module 300, the object detecting apparatus 520, and other interfaces. In some examples, the communication apparatus 400 may be disposed in the telematics control unit separately from the antenna system 300 or may be disposed in the antenna system 300.

The vehicle 500 may be switched into the autonomous mode or the manual mode based on driving environment information. The driving environment information may be generated based on object information provided by the object detecting apparatus 520. For example, the vehicle 500 may be switched from the manual mode into the autonomous driving mode or from the autonomous driving mode into the manual mode based on driving environment information generated in the object detecting apparatus 520.

For example, the vehicle 500 may be switched from the manual mode into the autonomous driving mode or from the autonomous driving mode into the manual mode based on driving environment information received through the communication apparatus 400. The vehicle 500 may be switched from the manual mode into the autonomous mode or from the autonomous module into the manual mode based on information, data or signal provided from an external device.

When the vehicle 500 is driven in the autonomous driving mode, the autonomous vehicle 500 may be driven based on an operation system. For example, the autonomous vehicle 500 may travel based on information, data or signal generated in a driving system, a parking exit (parking-lot leaving system, and a parking system. When the vehicle 500 is driven in the manual mode, the autonomous vehicle 500 may receive a user input for driving through a driving control apparatus. The vehicle 500 may travel based on the user input received through the driving control apparatus.

The vehicle 500 may include a user interface apparatus 510, an object detecting apparatus 520, a navigation system 550, and a communication apparatus 400. The vehicle may further include a sensing unit 561, an interface unit 562, a memory 563, a power supply unit 564, and a vehicle control device 565 in addition to the aforementioned apparatuses and devices. According to embodiments the vehicle 500 may include more components in addition to components to be explained in this specification or may not include some of those components to be explained in this specification.

The user interface apparatus 510 may be an apparatus for communication between the vehicle 500 and a user. The user interface apparatus 510 may receive a user input and provide information generated in the vehicle 500 to the user. The vehicle 510 may implement user interfaces (UIs) or user experiences (UXs) through the user interface apparatus 200.

The object detecting apparatus 520 may be a device for detecting an object located at outside of the vehicle 500. The object may be a variety of things associated with driving (operation) of the vehicle 500. In some examples, objects may be classified into moving objects and fixed (stationary) objects. For example, the moving objects may include other vehicles and pedestrians. The fixed objects may conceptually include traffic signals, roads, and structures, for example. The object detecting apparatus 520 may include a camera 521, a radar 522, a LiDAR 523, an ultrasonic sensor 524, an infrared sensor 525, and a processor 530. According to an embodiment, the object detecting apparatus 520 may further include other components in addition to the components described, or may not include some of the components described.

The processor 530 may control an overall operation of each unit of the object detecting apparatus 520. The processor 530 may detect an object based on an acquired image, and track the object. The processor 530 may execute operations, such as computing of a distance to the object, computing of a relative speed with respect to the object and the like, through an image processing algorithm.

According to an embodiment, the object detecting apparatus 520 may include a plurality of processors 530 or may not include any processor 530. For example, each of the camera 521, the radar 522, the LiDAR 523, the ultrasonic sensor 524 and the infrared sensor 525 may include the processor in an individual manner.

When the processor 530 is not included in the object detecting apparatus 520, the object detecting apparatus 520 may operate according to the control of a processor of an apparatus within the vehicle 500 or the controller 570.

The navigation system 550 may provide location information related to the vehicle based on information obtained through the communication apparatus 400, in particular, a location information unit 420. Also, the navigation system 550 may provide a path (or route) guidance service to a destination based on current location information related to the vehicle. In addition, the navigation system 550 may provide guidance information related to surroundings of the vehicle based on information obtained through the object detecting apparatus 520 and/or a V2X communication unit 430. In some examples, guidance information, autonomous driving service, etc. may be provided based on V2V, V2I, and V2X information obtained through a wireless communication unit operating together with the antenna system 1000.

The communication apparatus 400 may be an apparatus for performing communication with an external device. Here, the external device may be another vehicle, a mobile terminal, or a server. The communication apparatus 400 may perform the communication by including at least one of a transmitting antenna, a receiving antenna, and radio frequency (RF) circuit and RF device for implementing various communication protocols. The communication apparatus 400 may include a short-range communication unit 410, a location information unit 420, a V2X communication unit 430, an optical communication unit 440, a 4G wireless communication module 450, and a processor 470. According to an embodiment, the communication apparatus 400 may further include other components in addition to the components described, or may not include some of the components described.

The short-range communication unit 410 is a unit for facilitating short-range communications. The short-range communication unit 410 may construct short-range wireless area networks to perform short-range communication between the vehicle 500 and at least one external device. The location information unit 420 may be a unit for acquiring location information related to the vehicle 500. For example, the location information unit 420 may include a Global Positioning System (GPS) module or a Differential Global Positioning System (DGPS) module.

The V2X communication unit 430 may be a unit for performing wireless communication with a server (Vehicle to Infrastructure; V2I), another vehicle (Vehicle to Vehicle; V2V), or a pedestrian (Vehicle to Pedestrian; V2P). The V2X communication unit 430 may include an RF circuit in which protocols for communication with an infrastructure (V2I), communication between vehicles (V2V), and communication with a pedestrian (V2P) are executable. The optical communication unit 440 may be a unit for performing communication with an external device through the medium of light. The optical communication unit 440 may include an optical transmission part for converting an electric signal into an optical signal and transmitting the optical signal to the outside, and an optical reception part for converting the received optical signal into the electric signal. According to an embodiment, the optical transmission part may be formed integrally with lamps provided on the vehicle 500.

The wireless communication unit 460 is a unit that performs wireless communication with one or more communication systems through one or more antenna systems. The wireless communication unit 460 may transmit and/or receive a signal to and/or from a device in a first communication system through a first antenna system. In addition, the wireless communication unit may transmit and/or receive a signal to and/or from a device in a second communication system through a second antenna system. For example, the first communication system and the second communication system may be an LTE communication system and a 5G communication system, respectively. However, the first communication system and the second communication system may not be limited thereto, and may be changed according to applications.

In some examples, the antenna module 300 disposed in the vehicle 500 may include a wireless communication unit. In this regard, the vehicle 500 may be an electric vehicle (EV) or a vehicle that can be connected to a communication system independently of an external electronic device. In this regard, the communication apparatus 400 may include at least one of the short-range communication unit 410, the location information unit 420, the V2X communication unit 430, the optical communication unit 440, a 4G wireless communication module 450, and a 5G wireless communication module 460.

The 4G wireless communication module 450 may perform transmission and reception of 4G signals with a 4G base station through a 4G mobile communication network. In this case, the 4G wireless communication module 450 may transmit at least one 4G transmission signal to the 4G base station. In addition, the 4G wireless communication module 450 may receive at least one 4G reception signal from the 4G base station. In this regard, Uplink (UL) Multi-input/Multi-output (MIMO) may be performed by a plurality of 4G transmission signals transmitted to the 4G base station. In addition, Downlink (DL) MIMO may be performed by a plurality of 4G reception signals received from the 4G base station.

The 5G wireless communication module 460 may perform transmission and reception of 5G signals with a 5G base station through a 5G mobile communication network. Here, the 4G base station and the 5G base station may have a Non-Stand-Alone (NSA) architecture. The 4G base station and the 5G base station may be disposed in the Non-Stand-Alone (NSA) architecture. Alternatively, the 5G base station may be disposed in a Stand-Alone (SA) architecture at a separate location from the 4G base station. The 5G wireless communication module 460 may perform transmission and reception of 5G signals with a 5G base station through a 5G mobile communication network. In this case, the 5G wireless communication module 460 may transmit at least one 5G transmission signal to the 5G base station. In addition, the 5G wireless communication module 460 may receive at least one 5G reception signal from the 5G base station. In this instance, a 5G frequency band that is the same as a 4G frequency band may be used, and this may be referred to as LTE re-farming. In some examples, a Sub6 frequency band, which is a range of 6 GHz or less, may be used as the 5G frequency band. In contrast, a millimeter-wave (mmWave) band may be used as the 5G frequency band to perform wideband high-speed communication. When the mmWave band is used, the electronic device may perform beamforming for coverage expansion of an area where communication with a base station is possible.

Regardless of the 5G frequency band, in the 5G communication system, Multi-Input/Multi-Output (MIMO) may be supported to be performed multiple times, in order to improve a transmission rate. In this instance, UL MIMO may be performed by a plurality of 5G transmission signals that are transmitted to a 5G base station. In addition, DL MIMO may be performed by a plurality of 5G reception signals that are received from the 5G base station.

In some examples, A state of dual connectivity (DC) to both the 4G base station and the 5G base station may be attained through the 4G wireless communication module 450 and the 5G wireless communication module 460. As such, the dual connectivity to the 4G base station and the 5G base station may be referred to as EUTRAN NR DC (EN-DC). On the other hand, if the 4G base station and 5G base station are disposed in a co-located structure, throughput improvement can be achieved by inter-Carrier Aggregation (inter-CA). Accordingly, when the 4G base station and the 5G base station are disposed in the EN-DC state, the 4G reception signal and the 5G reception signal may be simultaneously received through the 4G wireless communication module 450 and the 5G wireless communication module 460, respectively. Short-range communication between electronic devices (e.g., vehicles) may be performed between electronic devices (e.g., vehicles) using the 4G wireless communication module 450 and the 5G wireless communication module 460. In one embodiment, after resources are allocated, vehicles may perform wireless communication in a V2V manner without a base station.

Meanwhile, for transmission rate improvement and communication system convergence, Carrier Aggregation (CA) may be carried out using at least one of the 4G wireless communication module 450 and the 5G wireless communication module 460 and a WiFi communication module. In this regard, 4G+WiFi carrier aggregation (CA) may be performed using the 4G wireless communication module 450 and the Wi-Fi communication module 113. Or, 5G+WiFi CA may be performed using the 5G wireless communication module 460 and the Wi-Fi communication module.

In some examples, the communication apparatus 400 may implement a display apparatus for a vehicle together with the user interface apparatus 510. In this instance, the display apparatus for the vehicle may be referred to as a telematics apparatus or an Audio Video Navigation (AVN) apparatus.

The processor 470 of the communication apparatus 400 may correspond to a modem. In this regard, the RFIC and the modem may be referred to as a first controller (or a first processor) and a second controller (a second processor), respectively. Meanwhile, the RFIC and the modem may be implemented as physically separate circuits. Alternatively, the RFIC and the modem may be logically or functionally separated from each other on one physical circuit. The modem may perform control and signal processing for signal transmission and reception through different communication systems using the RFID. The modem 1400 may acquire control information from a 4G base station and/or a 5G base station. Here, the control information may be received through a physical downlink control channel (PDCCH), but may not be limited thereto.

The modem may control the RFIC 1250 to transmit and/or receive signals through the first communication system and/or the second communication system for a specific time interval and from frequency resources. Accordingly, the vehicle can be allocated resources or maintain a connected state through the eNB or gNB. In addition, the vehicle may perform at least one of V2V communication, V2I communication, and V2P communication with other entities using the allocated resources.

Meanwhile, referring to FIGS. 1A to 4, the antenna module mounted on the vehicle may be disposed inside the vehicle, on the roof of the vehicle, inside the roof, or inside the roof frame. In this regard, the antenna system disclosed herein may be configured to operate in a low band (LB), mid band (MB), and high band (HB) of a 4G LTE system and a SUB6 band of a 5G NR system. Additionally, the antenna system disclosed in the present disclosure may be configured to operate in a 2.4 GHz band and a 5.44 GHz band for Wi-Fi communication services.

Figure 5:
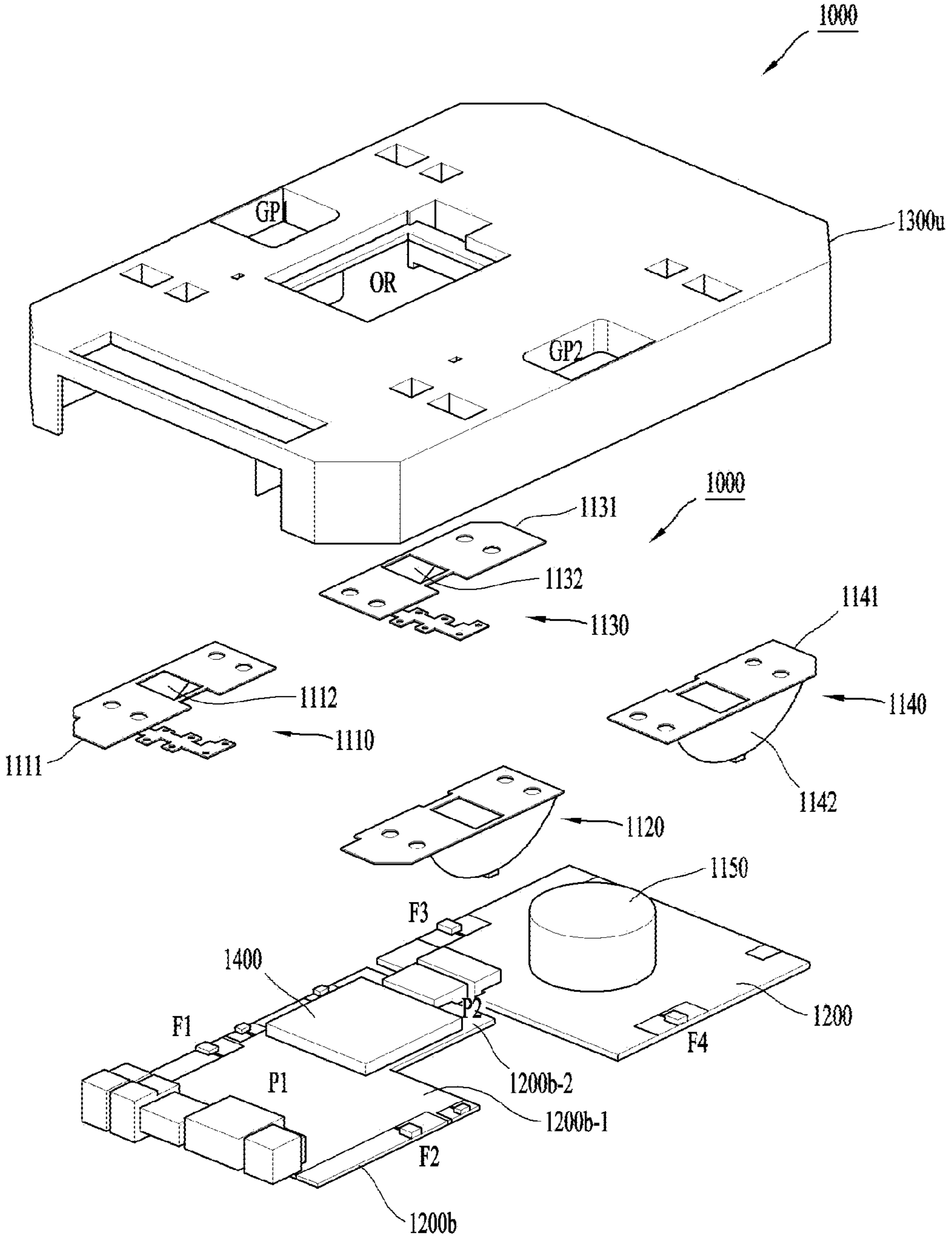
FIG. 5 is an exploded perspective view illustrating a vehicular antenna module according to the present disclosure.
Figure 6A:
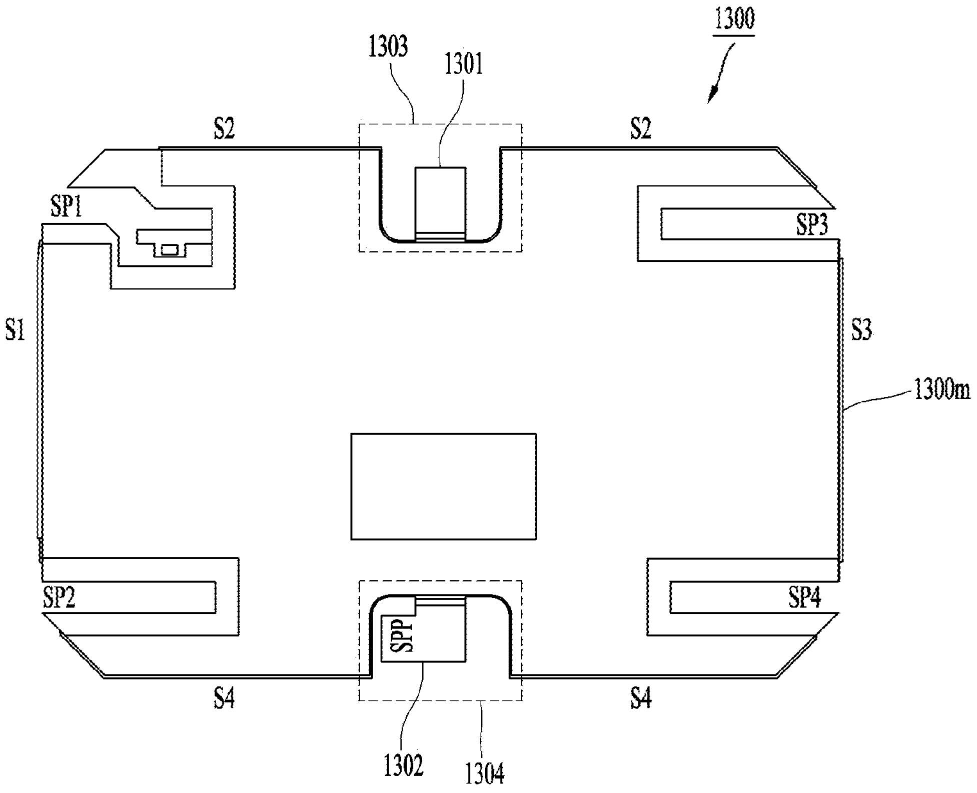
FIG. 6A is a front view illustrating that an antenna PCB is disposed on a front surface of a lower cover of the vehicular antenna module.
Figure 6B:
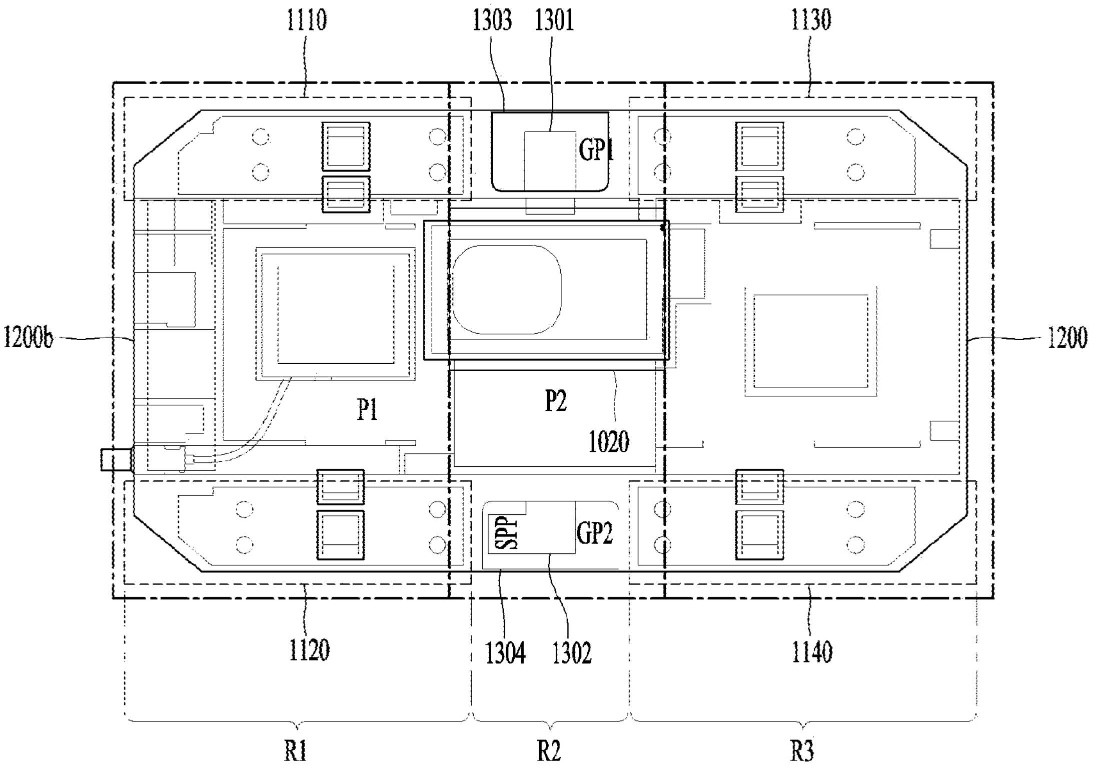
FIG. 6B is a front view illustrating the lower cover of the vehicular antenna module.

A vehicular broadband antenna module according to the present disclosure will be described below. In this regard, FIG. 5 is an exploded perspective view illustrating the vehicular antenna module according to the present disclosure. FIG. 6A is a front view illustrating that an antenna PCB is disposed on a front surface of a lower cover of the vehicular antenna module. FIG. 6B is a front view illustrating the lower cover of the vehicular antenna module.

Referring to FIG. 5, an antenna PCB 1200 and a TCU PCB 1200*b* may be disposed inside a vehicular broadband antenna module 1000. The antenna PCB 1200 may be coupled to the TCU PCB 1200*b*, and at least one antenna element may be disposed on the antenna PCB 1200. The TCU PCB 1200*b* is coupled to the antenna PCB 1200, and electronic components are disposed on the TCU PCB 1200*b*. Thus, the TCU PCB 1200*b* is configured to control a vehicular operation, that is, a telematics operation. TCU in the term 'TCU PCB 1200*b*' means a telematics control unit. The antenna PCB 1200 and the TCU PCB 1200*b* may be referred to as an antenna board 1200 and a TCU board 1200*b*, respectively. In addition, any one of the antenna PCB 1200 and the TCU PCB 1200*b* may be referred to as a first PCB, and the other one thereof may be referred to as a second PCB. For convenience in description, the TCU PCB 1200*b* is hereinafter referred to as a first PCB 1200*b*, and the antenna PCB 1200 is hereinafter referred to as a second PCB 1200.

Referring to FIGS. 5 and 6A, the vehicular antenna module 1000 may include a first PCB 1200*b* and a second PCB 1200. Referring to FIGS. 5 and 6B, the vehicular antenna module 1000 may be configured to include the first PCB 1200*b*, the second PCB 1200, and a lower cover 1300. An antenna 1100 that operates as a radiator in a 4G/5G communication band may be configured to include first to fourth radiators 1110 to 1140. The first radiator 1110 may be connected to a first feeding pattern F1 that is formed on top of the first PCB 1200*b*, and the second radiator 1120 may be connected to a second feeding pattern F2 that is formed on the bottom of the first PCB 1200*b*. The third radiator 1130 may be connected to a third feeding pattern F3 that is formed on top of the second PCB 1200, and the fourth radiator 1140 may be connected to a fourth feeding pattern F4 that is formed on the bottom of the second PCB.

Referring to FIGS. 5 to 6B, electronic components may be disposed on the first PCB 1200*b* and may be configured to be disposed in a first area R1 and a second area R2. The second PCB 1200 may be configured to be coupled to the first PCB 1200*b* and to be disposed in a third area R3. A GNSS antenna 1150 may be disposed on the second PCB 1200. A network access device (NAD) that corresponds to a processor may be disposed on the first PCB 1200*b*.

The lower cover 1300 may be disposed under the first PCB 1200*b* and the second PCB 1200. A first protrusion part 1301 and a second protrusion part 1302 may be formed on the lower cover 1300 in the second area R2.

The first PCB 1200*b*, the first radiator 1110, and the second radiator 1120 may be provided in the first area R1 of the antenna module. A first part P1 of the first PCB 1200*b* may be disposed between the first radiator 1110 and the second radiator 1120. A first opening O1 and a second opening O2 may be provided in the first PCB 1200*b* and the lower cover 1300, respectively, in the first area R2 of the antenna module. A second part P2 of the first PCB 1200*b* may be disposed between a first recess segment 1303 and a second recess segment 1304. The first protrusion part 1301 may be formed in the first recess segment 1303 in a manner that extends from the lower cover 1300. The second protrusion part 1302 may be formed in the second recess segment 1304 in a manner that extends from the lower cover 1300. The second PCB 1200, the third radiator 1130, and the fourth radiator 1140 may be provided in the third area R3 of the antenna module. The second PCB 1200 may be disposed between the third radiator 1130 and the fourth radiator 1140.

The first protrusion part 1301 may be formed to extend perpendicularly from a lower end of the first recess segment 1303 and to run in a first direction that is an upward direction. The second protrusion part 1302 may be formed to extend perpendicularly from a lower end of the second recess segment 1304 and to run in a second direction that is perpendicular to the first direction. The second protrusion part 1302 may be formed in the second direction that is perpendicular to the first direction and is a direction in which one side thereof is adjacent to the second radiator 1120.

Figure 6C:
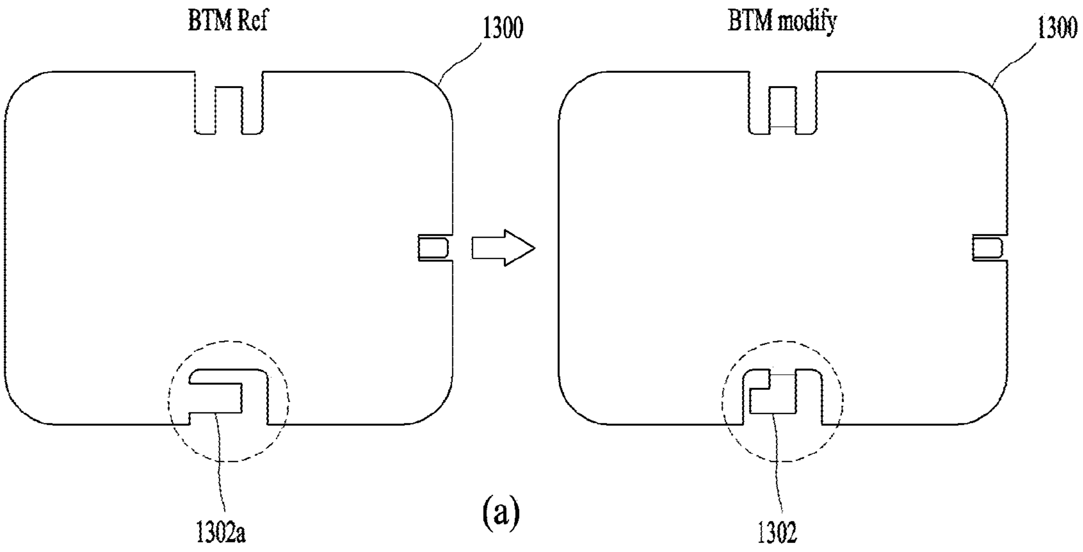
FIG. 6C is a set of a view and a graph that show a comparison of antenna efficiencies of an antenna across frequencies, showing variations with a structure of a second coupling portion in an antenna configuration in FIGS. 6A and 6B, the antenna being disposed underneath one side.
Figure 6C:
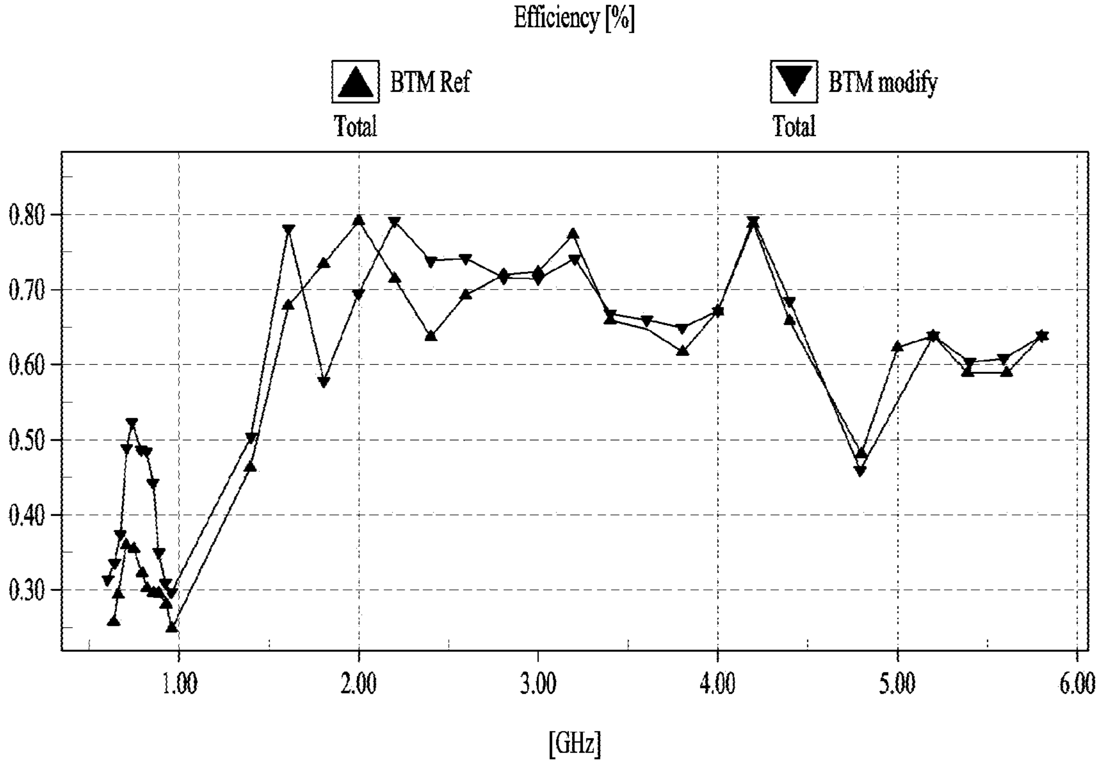

FIG. 6C is a set of a view and a graph that show a comparison of antenna efficiencies of an antenna across frequencies, showing variations with a structure of a second coupling portion, the antenna being disposed underneath one side. Referring to (a) of FIG. 6C, a second protrusion part 1302*a* may be formed to be connected to the lower cover 1300. In this regard, the second protrusion part 1302*a*, unlike the first protrusion part 1300, may be formed in the second direction in such a manner to be disposed inside a roof of the vehicle. A low-band (LB) property of an antenna, disposed adjacent to the second protrusion part 1302*a*, may decrease. In order to prevent a decrease in an efficiency property of this antenna, the second protrusion part 1302 may be formed in the first direction and the second direction perpendicular to the first direction.

As illustrated in FIGS. 6A and 6B, antenna efficiency may be improved in a low band (LB) by the second protrusion part 1302, which is formed to extend perpendicularly from a lower end of a second groove portion GP2 and to run in the second direction perpendicular to the first direction. Referring to FIGS. 6A to 6C, the second protrusion part 1302 is disposed adjacent to an end of a metal plate 1300*m* on which the second radiator 1120 is disposed. Consequently, the antenna efficiency of the second radiator 1120 may be improved in a low band (LB). In this regard, the antenna efficiency of the second radiator 1120 may be improved by 1.5 dB or higher in a band of 620 to 960 MHz, which is a low hand (BL).

Figure 7A:
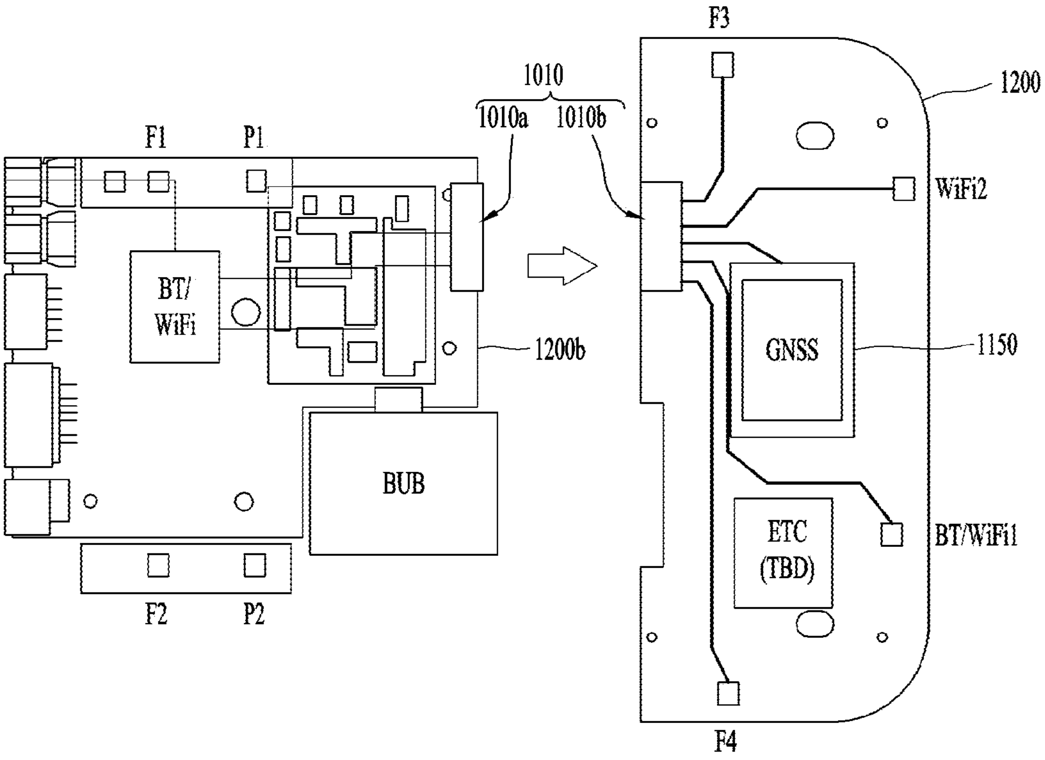
FIGS. 7A and 7B are views illustrating configurations, respectively, that result before and after a TCU PCB and an antenna PCB according to the present disclosure are coupled to each other by a board-to-board connector.
Figure 7B:
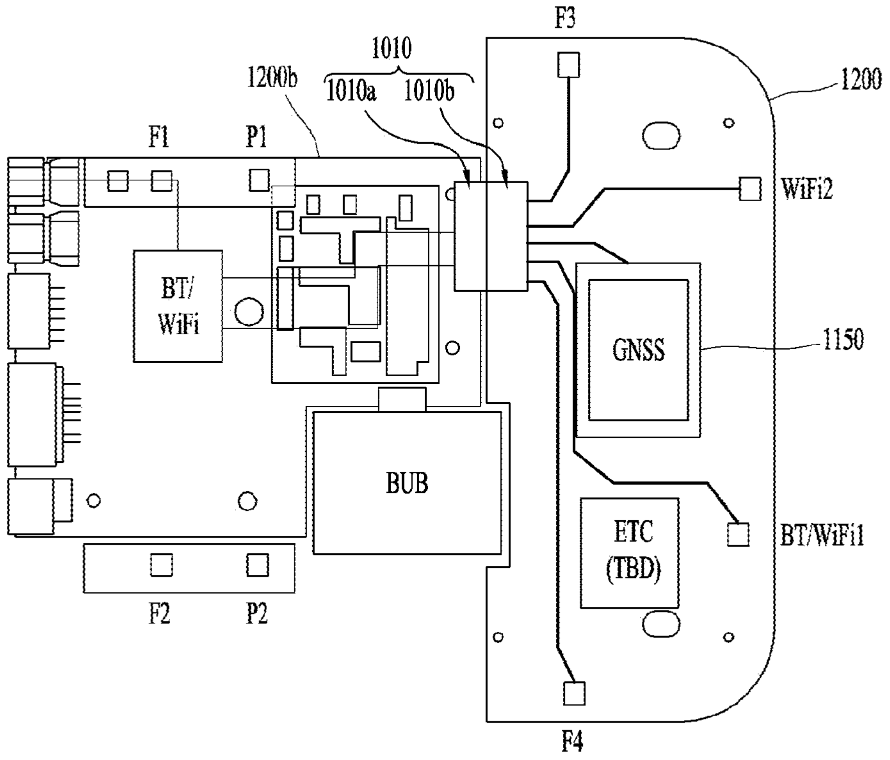
Figure 8A:
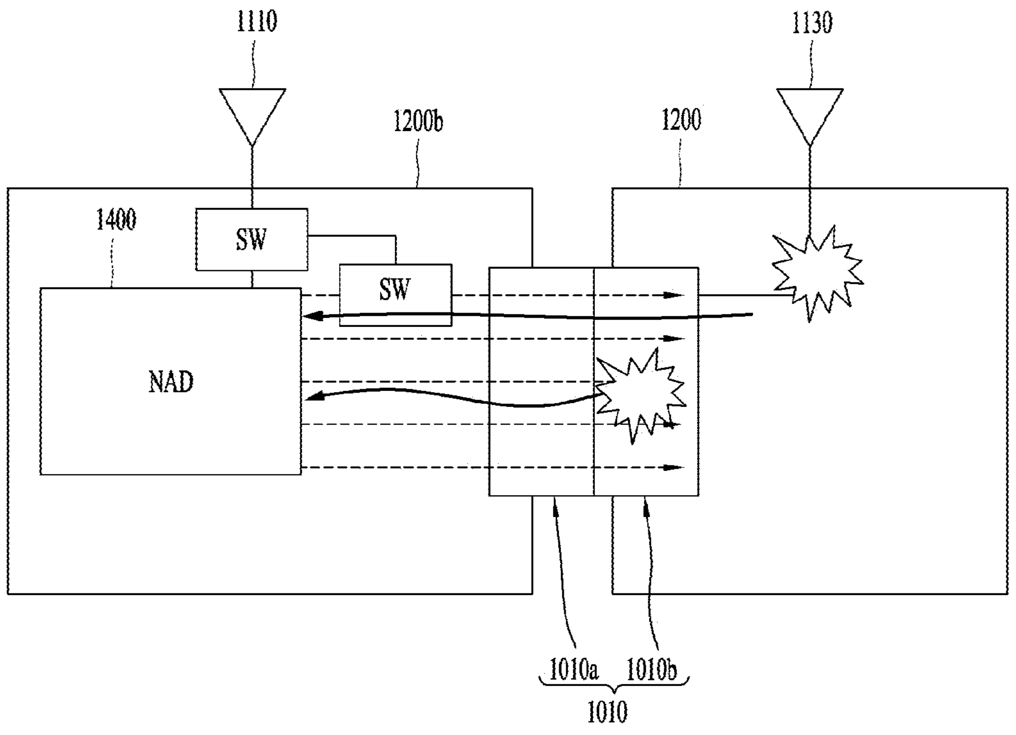
FIG. 8A is a view illustrating a configuration for a change in operation in an emergency situation, this configuration transitioning from the configuration in which the TCU PCB and the antenna PCB according to the present disclosure are coupled to each other.
Figure 8B:
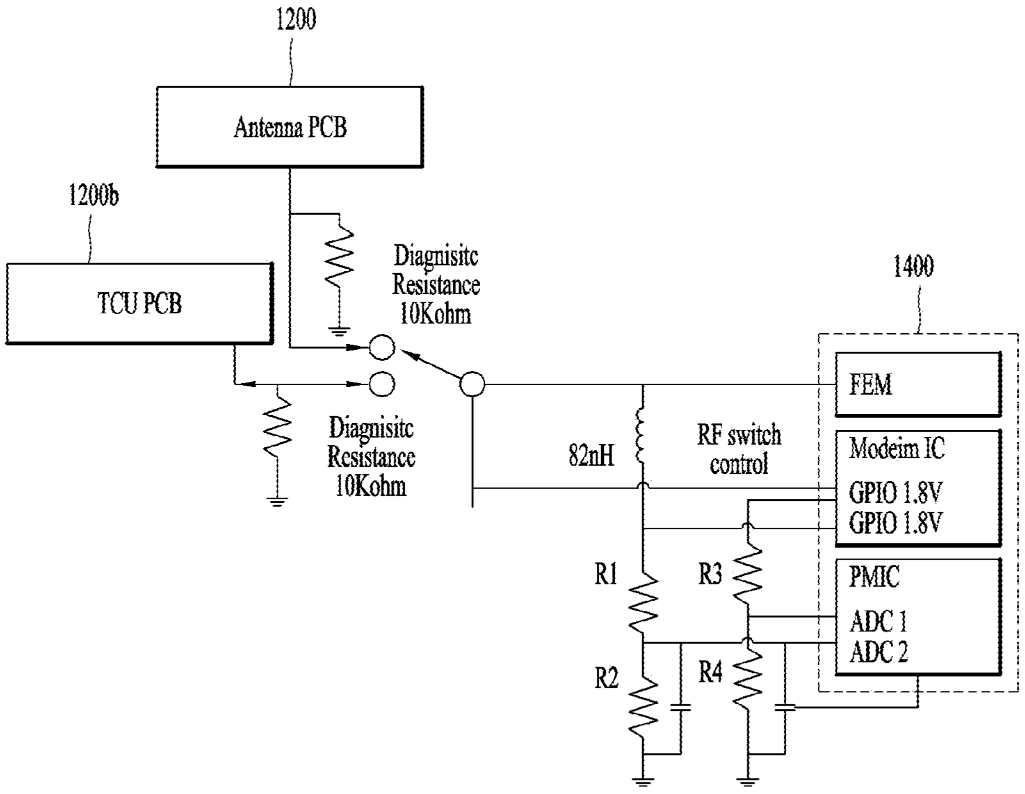
FIG. 8B is a view illustrating a circuit configuration for changing a signal transfer path between the first PCB and the second PCB, in association with the change in operation in FIG. 8A.

The first PCB 1200*b* may include a network access device (NAD) 1400, which is configured to control a signal that is applied to the first to fourth radiators 1110 to 1140. In this regard, FIGS. 7A and 7B are views illustrating configurations, respectively, that result before and after the TCU PCB and the antenna PCB according to the present disclosure are coupled to each other by a board-to-board connector. FIG. 8A is a view illustrating a configuration for a change in operation in an emergency situation, this configuration transitioning from the configuration in which the TCU PCB and the antenna PCB according to the present disclosure are coupled to each other. FIG. 8B is a view illustrating a circuit configuration for changing a signal transfer path between the first PCB and the second PCB, in association with the change in operation in FIG. 8A.

Referring to FIG. 8B, a signal transfer path may be formed in such a manner that a signal is transferred through the first PCB 1200*b* that corresponds to the TCU PCB. Referring to FIGS. 8A and 8B, a signal may be received through the first radiator 1110 that is disposed on the first PCB 1200*b*. In this regard, a wireless communication control IC 1400 may control an output therefrom to be connected to an input to the first PCB 1200*b*. A signal transfer path may be formed in such a manner that a signal is transferred through the second PCB 1200 that corresponds to the antenna PCB. A signal may be received through the third radiator 1130 disposed on the second PCB 1200. In this regard, the wireless communication control IC 1400 may control an output therefrom to be connected to an input to the second PCB 1200. The wireless communication control IC 1400 may include a model IC, a front end module (FEM), and a power management integrated chip (PMIC), but is not limited to these. The PMIC may also be disposed outside the wireless communication control IC 1400.

Referring to FIGS. 5 to 8B, the first PCB 1200*b* and the second PCB 1200 may be operatively coupled to each other using board-to-board connectors 1010*a* and 1010*b*. Referring to FIGS. 5 to 8, it may be determined whether or not non-transfer of a signal to an antenna disposed in the third area R3 occurs, using the board-to-board connectors 1010*a* and 1010*b*. In other words, in the configuration in which the first PCB 1200*b* and the second PCB 1200 are coupled to each other, it may be determined whether or not non-transfer of a signal to the second PCB 1200 occurs, using the board-to-board connectors 1010*a* and 1010*b*. Accordingly, the first PCB 1200*b* may control a signal to be transferred to an antenna disposed in the first area R1 instead of the antenna disposed in the third area R3.

In this regard, the NAD 1400 may determine whether or not a signal, received through the antenna disposed in the third area R3, is at or below a threshold value, using the board-to-board connectors 1010*a* and 1010*b*. The NAD 1400 may determine whether or not a signal, received through the third radiator 1130 or the fourth radiator 1140 in the third area R3, is at or below the threshold value, using the board-to-board connectors 1010*a* and 1010*b*. When a signal that is received through the third radiator 1130 or the fourth radiator 1140 is at or below the threshold value, the NAD 1400 may control the signal transfer path. The NAD 1400 may control the signal transfer path in such a manner that a signal is received or transmitted through the first radiator 1110 and the second radiator 1120, which are disposed in the first area R1. Therefore, when a signal received from the third radiator 1130 or the fourth radiator 1140 falls below a predetermined level, the wireless communication control IC 1400 may be configured to receive only a signal received from the first radiator 1110 or the second radiator 1120.

Figure 9A:
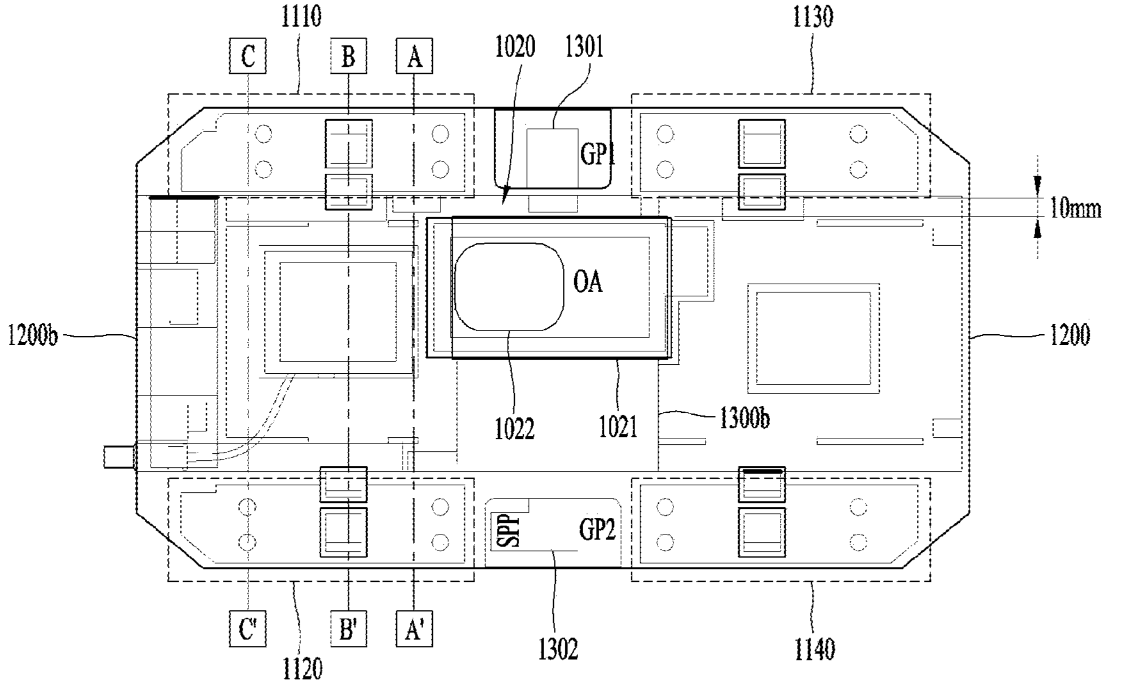
FIG. 9A is a view illustrating a structure in which an upper cover and a heat sink in FIG. 5 are coupled to each other.
Figure 9A:
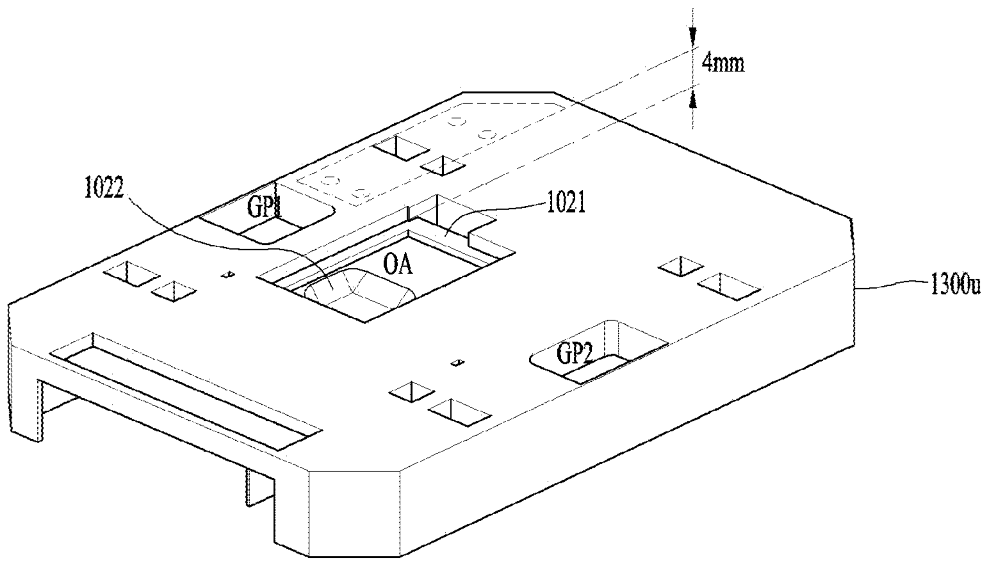
Figure 9B:
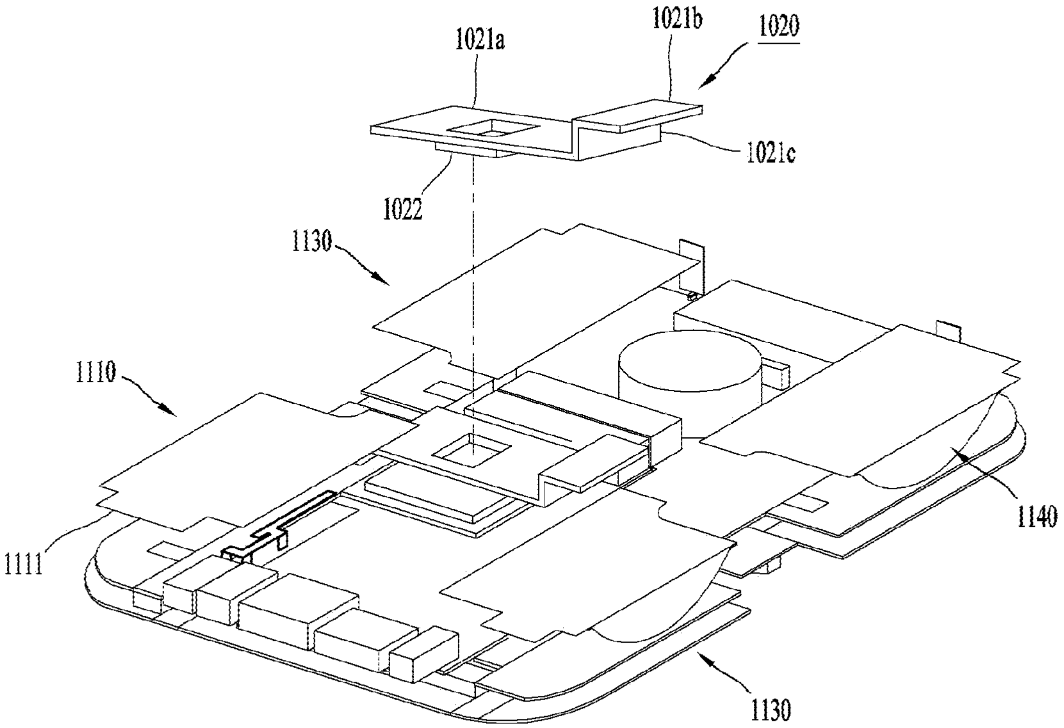
FIG. 9B is a view illustrating a structure that results from expanding a structure of the heat sink in one axial direction.

A heat sink 1020 may be disposed inside the vehicular antenna module according to the present disclosure. In this regard, FIG. 9A is a view illustrating a structure in which an upper cover and the heat sink in FIG. 5 are coupled to each other. FIG. 9B is a view illustrating a structure that results from expanding a structure of the heat sink in one axial direction.

Referring to FIGS. 5 to 6B and (a) of FIG. 9A, the first to fourth radiator radiators 1110 to 1140 may be disposed in an upper region of the first area R1, a lower region of the first area R1, an upper region of the third area R3, and a lower region of the third area R3, respectively. A V2X antenna may be disposed along Line A on a lower area of the first radiator 1110. The feeding pattern for the first radiator 1110 may be disposed along Line B on the lower area of the first radiator 1110. A feeding pattern for a Wi-Fi antenna may be disposed along Line C on the lower area of the first radiator 1110. These arrangement structures along Lines A, B, and C are described in detail referring FIGS. 17B and 18B.

The antenna module 1000 may further the heat sink 1020 that is disposed in the second area R2 of the antenna module. The heat sink 1020 may be configured with a structure formed of a metal material in such a manner as to absorb heat generated from the NAD 1400. A backup battery 1300*b* may be disposed on a lower area of the heat sink 1020.

The heat sink 1020 may be disposed in a middle region of the second area R2. The middle region thereof is positioned halfway between the upper regions of the first area R1 and the third area R3, where the first radiator 1110 and the third radiator 1130 are disposed, respectively, and halfway between the lower regions of the first area R1 and the third area R3, where the second radiator 1120 and the fourth radiator 1140 are disposed, respectively. The heat sink 1020 may be disposed in the middle region of the second area R2, which is positioned halfway between the upper region of the second area R2, where the first protrusion part 1301 is disposed, and the lower region of the second area R2, where the second protrusion part 1302 is disposed.

A lower portion of the heat sink 1020 may be coupled to the first PCB 1200*b* in a manner that is adjacent to the NAD 1400. An upper portion of the heat sink 1020 may be formed from a metal plate 1021. A distance between the upper end of the metal plate 1021 of the heat sink 1020 and each of the lower ends of the metal plates of the first radiator 1110 and the third radiator 1130 may be set to a first threshold distance or greater. The distance between them may be set to the first threshold distance or greater to prevent interference with the first radiator 1110 and the third radiator 1130. As an example, the distance between them may be set to the first threshold distance of 10 mm or greater, but is not limited thereto.

Referring to FIGS. 5 to 6B and (b) of FIG. 9A, a height of the metal plate 1021 of the heat sink 1020 and a height of each of the metal plates of the first radiator 1110 and the third radiator 1130 may be set to a second threshold height or greater. These heights may be set to the second threshold height or greater to prevent the interference with the first radiator 1110 and the third radiator 1130. As an example, the second threshold height may be set to 4 mm or greater, but is not limited thereto.

Therefore, a position where the heat sink according to the present disclosure is disposed for improving heat dissipation may be determined in a manner that does not overlap a 4×4 MIMO antenna. In addition, the heat sink may be configured to have a metal plate structure. The metal plate structure is separated by the first threshold distance or greater and separated by the second threshold height or greater in such a manner as to minimize an influence on the performance of the antenna.

The vehicular antenna module 100 according to the present disclosure may further include an upper cover 1300*u*. The upper cover 1300*u* may be configured to be fastened to the lower cover 1300 and to accommodate the first PCB 1200*b* and the second PCB 1200 inside. An upper hole with a three-dimensional structure 1022 may be formed in one area of the metal plate 1021 of the heat sink 1020. A lower portion of the three-dimensional structure 1022 may be connected to the first PCB 1200*b*. An opening area OR may be formed in an area of the upper cover 1300*u*, which corresponds to an area where the metal plate 1021 of the heat sink 1020 is formed, in such a manner that heat absorbed from the NAD 1400 dissipates out of the antenna module through the upper cover 1300*u*.

Referring to FIG. 9B, the heat sink 1020 may be formed with a structure that expands in one axis direction. The metal plate 1021 of the heat sink 1020 may be configured to include a first plate 1021*a* and a second plate 1021*b*. The second plate 1021*b* may enable the heat sink 1020 to be formed with a structure that expands in one axis direction, and thus the heat sink 1020 may improve a heat dissipation property. The upper hole with the three-dimensional structure 1022 may be formed in one area of the metal plate 1021. The lower portion of the three-dimensional structure 1022 may be connected to the first PCB 1200*b*. In this regard, the shape of the three-dimensional structure 1022 is not limited to a rectangular parallelepipedal structure in FIG. 9B and can be changed in various ways, taking into consideration factors such as the heat dissipation property and interference with the arrangement structure. For example, the shape of the three-dimensional structure 1022 is not limited to the rectangular parallelepipedal structure and can be changed to a multi-sided structure, a circular-cylinder structure, or the like.

The first and fourth radiators 1110 to 1140 in FIG. 9B have structures in which opening areas are illustrated as not being formed in metal plates 1111, respectively, but are not limited to these structures. The structures of the first to fourth radiators 1110 to 1140 may be structures in which the opening areas are formed in the metal plates 1111, respectively, as illustrated in FIG. 5. Specifically, opening areas 1111*o* in FIG. 14A or opening areas 1111*ob* in FIG. 14B, which is described below, may be formed in the structures of the first to fourth radiators 1110 to 1140, respectively.

The heat sink 1020 is formed with a structure that expands in one axis direction up to an area where the backup battery 1300*b* in (a) of FIG. 9A is disposed, thereby being capable of improving the heat dissipation property. With reference (a) of FIG. 9A and FIG. 9B, the second plate 1021*b* may be formed to have a greater height than the first plate 1021*a* in order to secure a height sufficient to dispose the backup battery 1300*b* and to dissipate heat in an upward direction. A third plate 1021*c* may be formed to extend perpendicularly to an end of the first plate 1021*a* in order to connect the first plate 1021*a* and the second plate 1021*b* to each other. The second plate 1021*b* and the third plate 1021*c* may be perpendicularly connected to each other.

Figure 10:
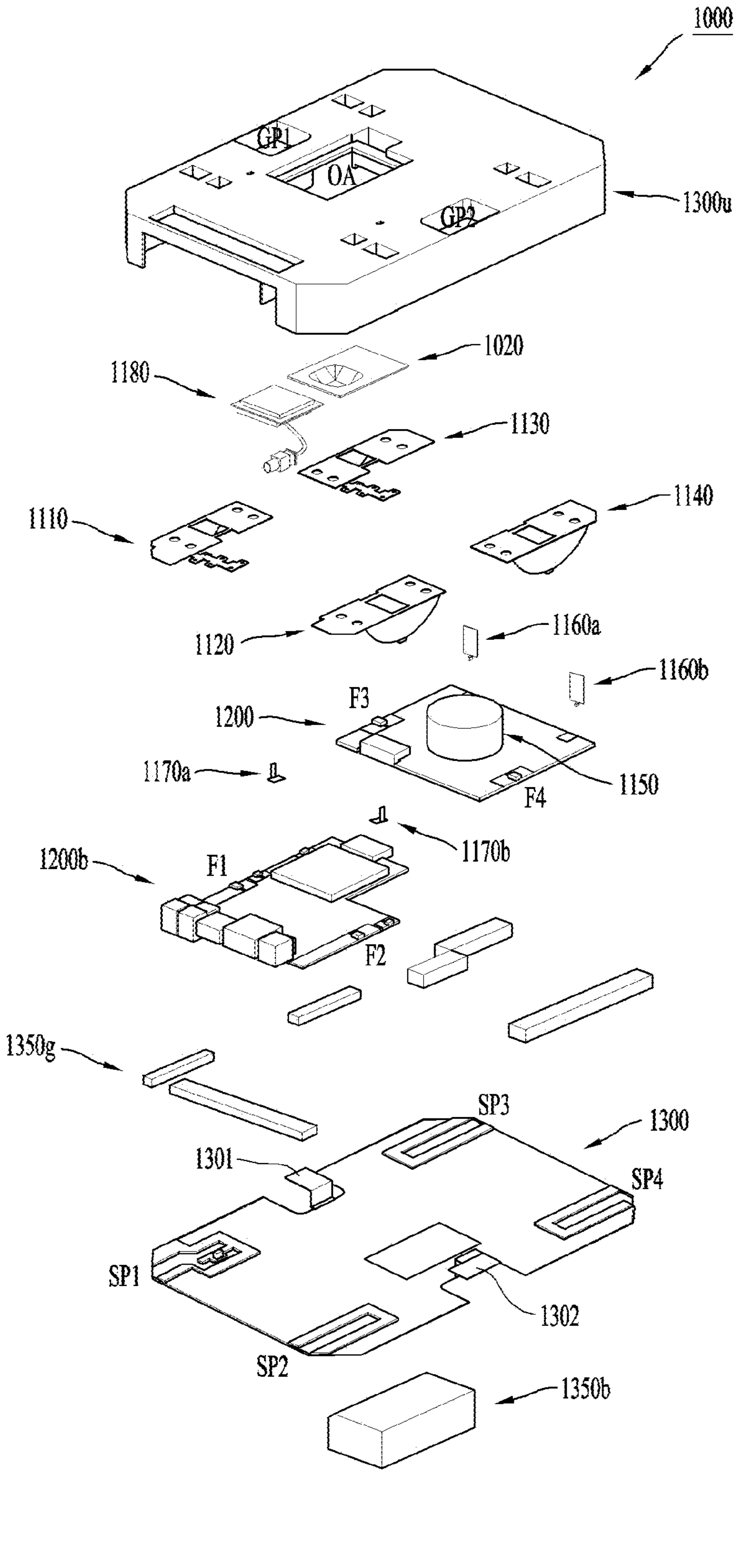
FIG. 10 is an exploded perspective view illustrating the vehicular antenna module according to the present disclosure, which includes other antenna elements in addition to a 4G/5G antenna.

The vehicular antenna module according to the present disclosure may be configured to include antenna elements in addition to the first to fourth radiators 1110 to 1140. In this regard, FIG. 10 is an exploded perspective view illustrating the vehicular antenna module according to the present disclosure, which includes other antenna elements in addition to a 4G/5G antenna. FIGS. 11A to 11D are views each illustrating a configuration of each component that constitutes the antenna module.

Figure 11A:
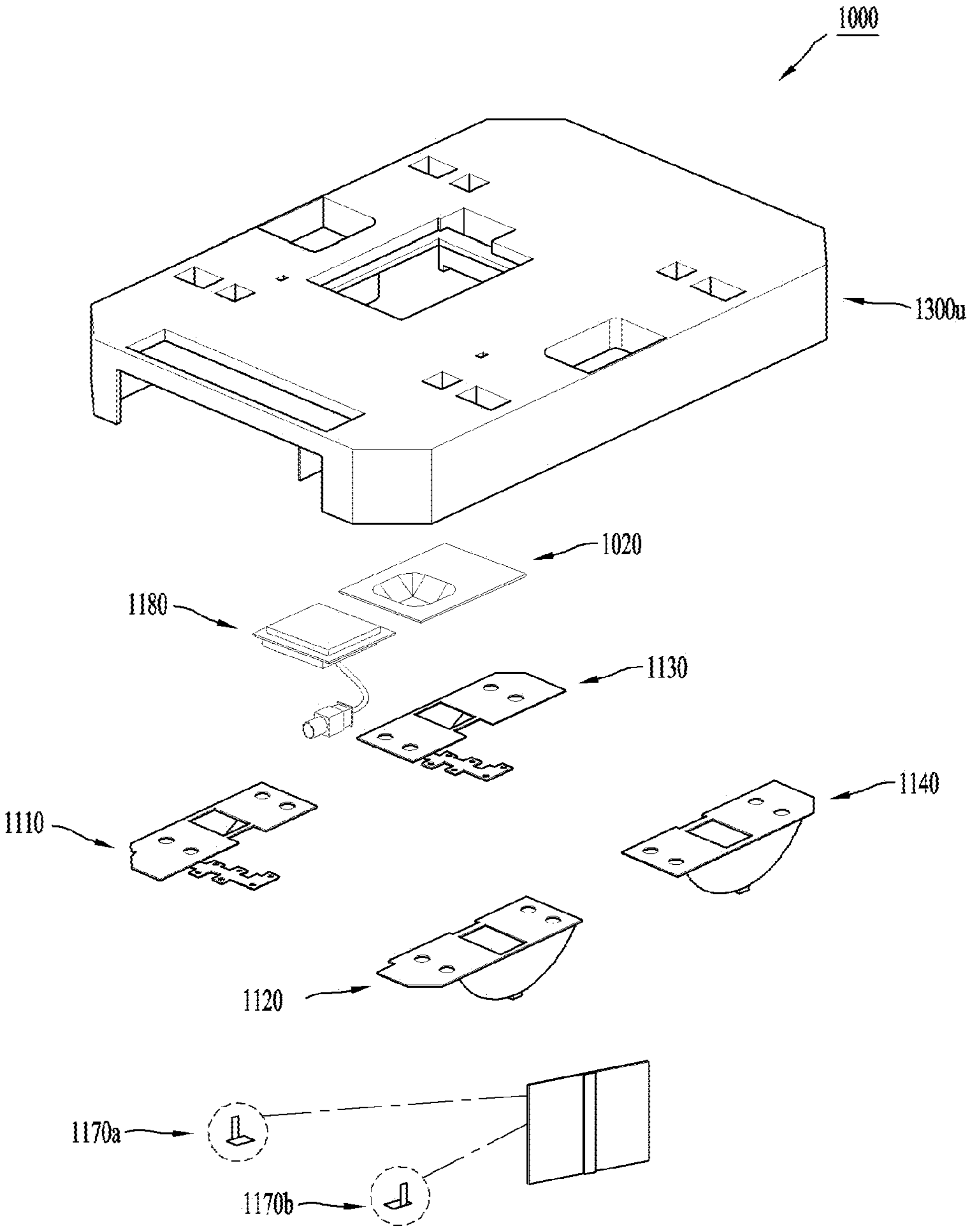
FIGS. 11A to 11D are views each illustrating a configuration of each component that constitutes the antenna module.

FIG. 11A illustrates a configuration in which the first to fourth radiators 1110 to 1140, the heat sink 1020, and other antenna elements are disposed on an upper portion of the upper cover 1300*u*. In this regard, V2X antennas 1170*a* and 1170*b* and an SDARS antenna 1180 may be disposed, but there is no limitation to these antennas. The V2X antennas 1170*a* and 1170*b* may be configured, on top of a dielectric board perpendicularly disposed, as a monopole radiator or a dipole radiator on which a metal pattern is formed, and may also be referred to as V2V antennas. Beam patterns on the V2X antennas 1170*a* and 1170*b* may be formed in an end-fire array and may be formed to face in an upward direction by the ground below. The SDARS antenna 1180 may be configured as a patch antenna disposed on a dielectric board. A beam pattern of the SDARS antenna 1180 is formed in a bore sight shape and is formed to face in the upward direction by the ground below.

Figure 11B:
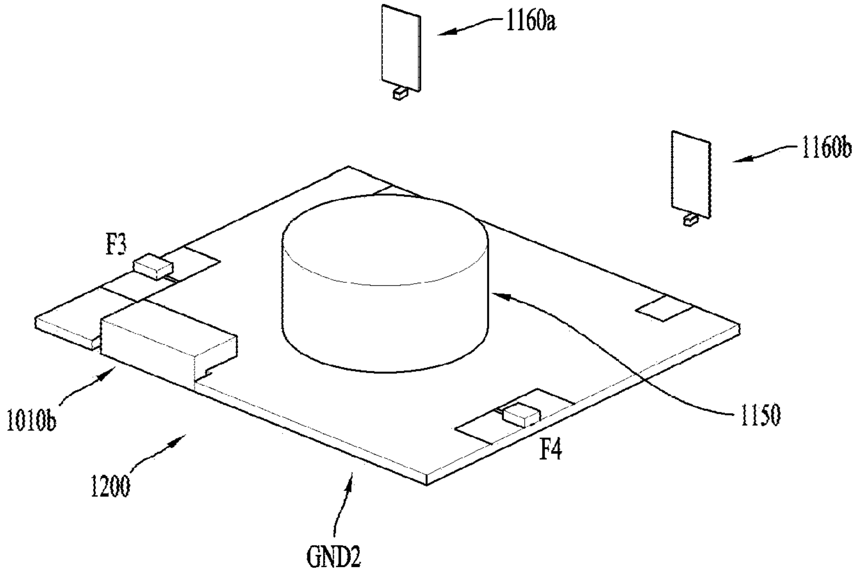

FIG. 11B illustrates a configuration in which antenna elements are disposed on the second PCB 1200. Referring to FIG. 11B, the GNSS antenna 1150 and first and second Wi-Fi antennas 1160*a* and 1160*b* may be disposed on the second PCB 1200, but there is no limitation to these antennas.

Figure 11C:
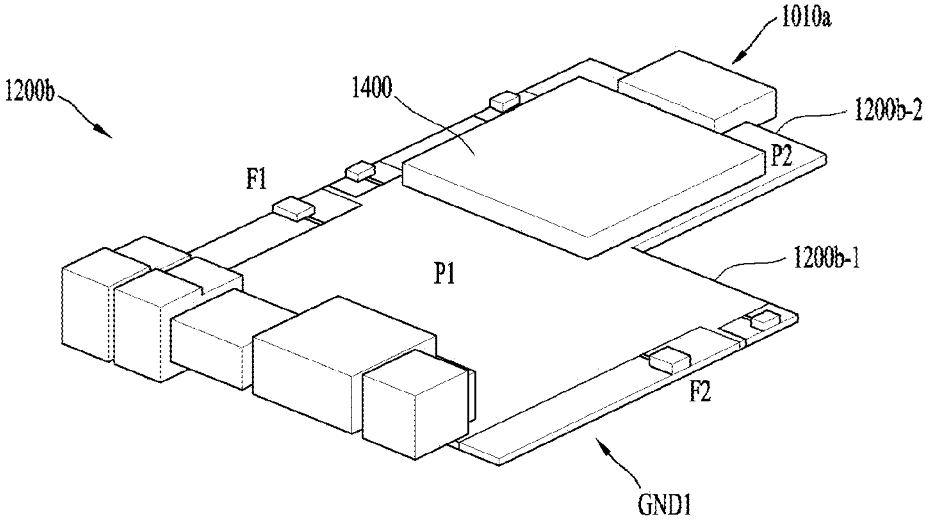
Figure 11D:
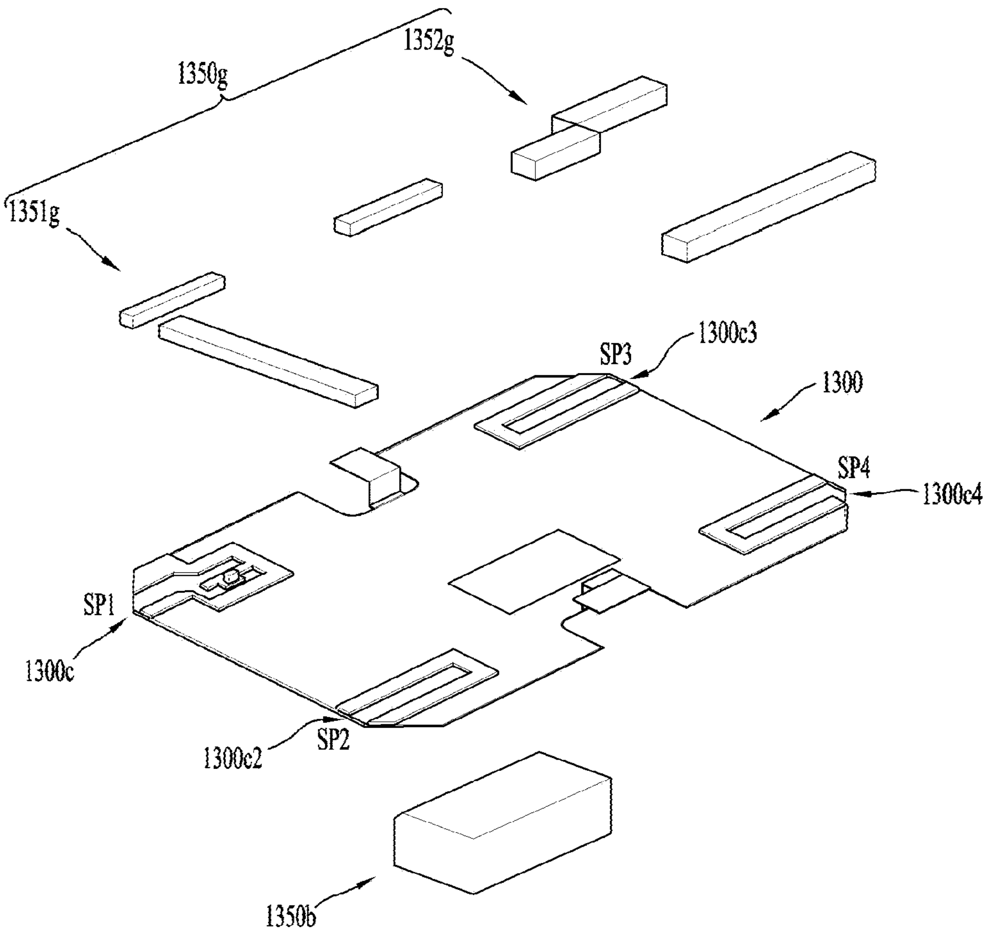

Referring to FIG. 11C, a multiplicity of connector terminals for interfacing may be disposed on one side of the first PCB 1200*b*. The board-to-board connector 1010*a* for coupling to the antenna PCB may be disposed on the other side of the first PCB 1200*b*. The NAD 1400 may be disposed on one area of the first PCB 1200*b* in a manner that is adjacent to the board-to-board connector 1010*a*. Referring to FIG. 11D, a dielectric cover 1300*c* may be disposed on a slot region formed in the lower cover 1300. Accordingly, a radiator that constitutes the first to fourth radiators 1110 to 1140 may radiate a signal in a specific band and may radiate a signal through a slot antenna in other bands. Therefore, the first to fourth radiators 1110 to 1140 can operate in a broadband using a combination of a radiator and a slot.

Referring to FIGS. 5 to 7B, FIG. 10, and FIGS. 11A to 11D, the second PCB 1200 may include the first feeding pattern F1 and the second feeding pattern F2 that are configured to be connected to the first radiator 1110 and the second radiator 1120, respectively. The second PCB 1200 may further include the GNSS antenna 1150 and the first and second Wi-Fi antennas 1160*a* and 1160*b*.

The GNSS antenna 1150 may be disposed in an area between the first feeding pattern F1 and the second feeding pattern F2. The GNSS antenna 1150 may be configured to receive a GPS signal and transfer the GPS signal to the NAD 1400 through the board-to-board connectors 1010*a* and 1010*b*. The first and second Wi-Fi antennas 1160*a* and 1160*b* may be disposed on upper and lower areas, respectively, of the second PCB 1200. The board-to-board connectors 1010*a* and 1010*b*, configured to be interfaced to the first PCB 1200*b*, are formed on one side. The first and second Wi-Fi antennas 1160*a* and 1160*b* may be disposed on upper and lower areas on the other side instead of on one side. The first and second Wi-Fi antennas 1160*a* and 1160*b* are configured to receive and transmit a Wi-Fi signal and may perform MIMO or a diversity operation.

The second PCB 1200 may include the third feeding pattern F3 and the fourth feeding pattern F4 that are configured to be connected to the third radiator 1130 and the fourth radiator 1140, respectively. The first PCB 1200*b* may further include the NAD 1400 and the first and second V2X antennas 1170*a* and 1170*b*.

The NAD 1400 may be disposed on one side of the first PCB 1200*b* which is coupled to the second PCB 1200. The NAD 1400 may be operatively coupled to the first to fourth radiators 1110 to 1140 and may control a signal to be applied to at least one of the first to fourth radiators 1110 to 1140. The first and second V2X antennas 1170*a* and 1170*b* may be connected to first and second patterns P1 and P2 adjacent to the third feeding pattern F3 and the fourth feeding pattern F4, respectively. The first and second V2X antennas 1170*a* and 1170*b* may be disposed perpendicularly to the first PCB 1200*b*. The first and second V2X antennas 1170*a* and 1170*b* may be configured to transmit or receive a V2X signal to and from an entity in the vicinity of a vehicle.

The SDARS antenna 1180 may be configured to receive a signal from a satellite. The SDARS antenna 1180 may be disposed on the first PCB 1200*b* or may be disposed on the upper cover 1300*u*. The SDARS antenna 1180 is disposed on the upper cover 1300*u*, thereby increasing a space where another electronic component is disposed within the first PCB 1200*b*. In this regard, the SDARS antenna 1180 may be disposed on the upper cover 1300*u*. Thus, the NAD 1400 may be disposed on the first PCB 1200*b* in a manner that is adjacent to an area coupled to the second PCB 1200. A connector configured to be connected to the SDARS antenna 1180 may be configured to be coupled to a connector terminal on the other side of the first PCB 1200*b*.

The first protrusion part 1301 may be formed to extend perpendicularly from the lower end of the first recess segment 1303 and to run in the first direction that is the upward direction. The second protrusion part 1302 may be formed to extend perpendicularly from the lower end of the second recess segment 1304 and to run in the second direction that is perpendicular to the first direction. The second protrusion part 1302 may be formed in the second direction that is perpendicular to the first direction and is the direction in which one side thereof is adjacent to the second radiator 1120. Accordingly, the second protrusion part 1302 may improve a property of a first band that is a low band LB of the second radiator 1120 adjacent to the second opening O2.

The second PCB 1200 and the first PCB 1200*b* may be configured to be connected to the lower cover 1300 through a ground contact portion 1350*g*. The backup battery 1300*b* may be disposed on an upper portion of the lower cover 1300. The backup battery 1300*b* may be disposed in an unoccupied region of an area where the second PCB 1200 and the first PCB 1200*b* are coupled to each other.

Figure 12A:
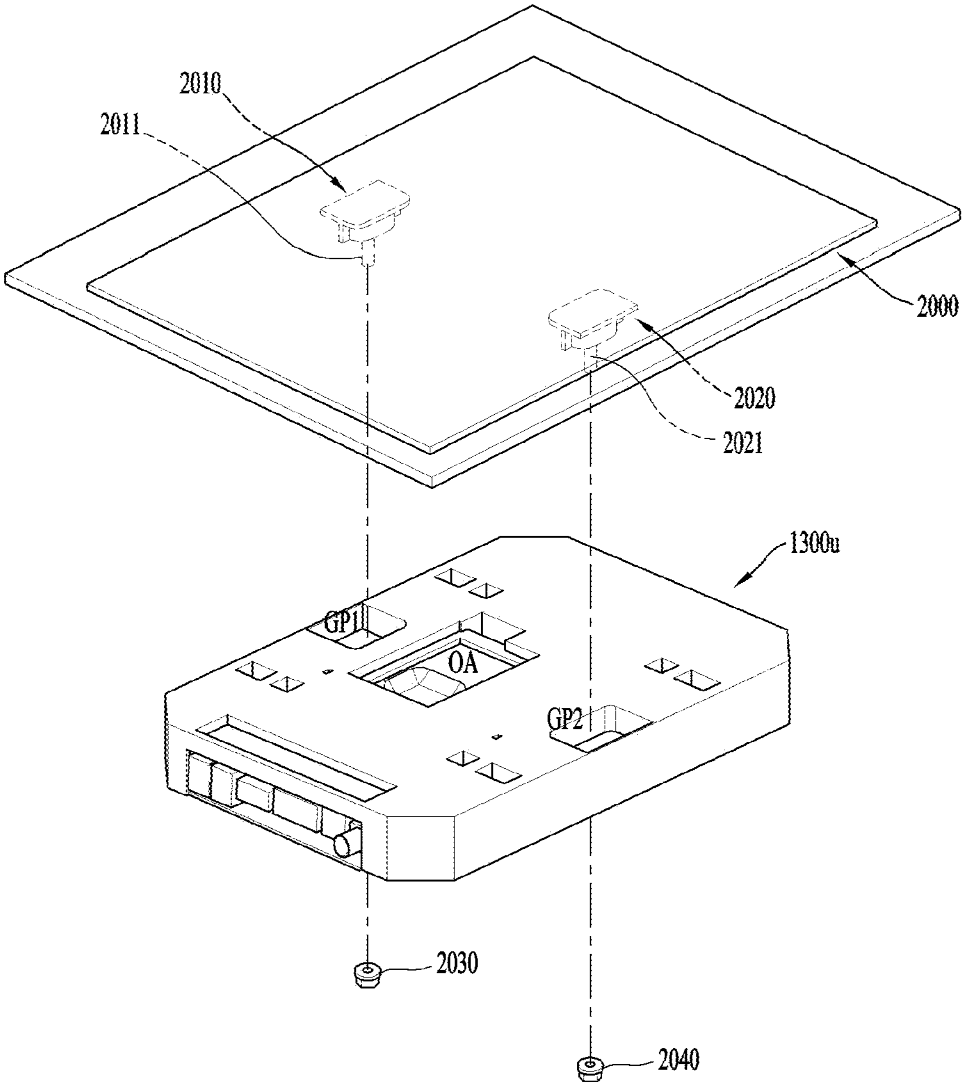
FIGS. 12A and 12B are a perspective view and a side view, respectively, illustrating that an antenna assembly structure according to the present disclosure is coupled to a roof structure of a vehicle.
Figure 12B:
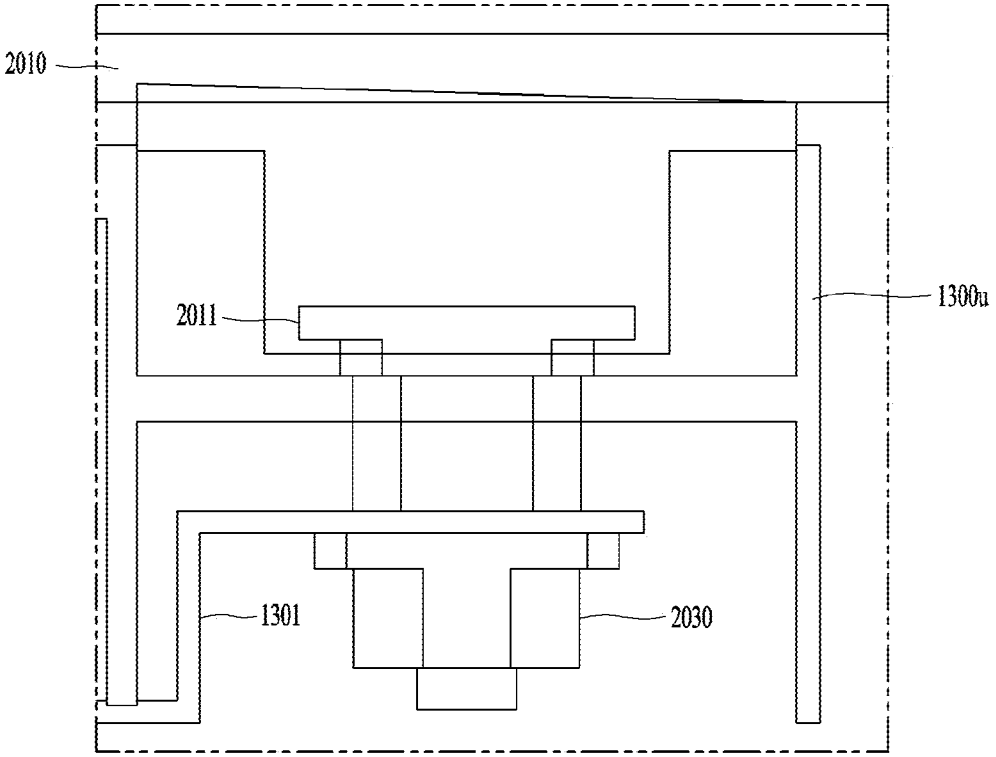

A vehicle equipped with the antenna module according to the present disclosure, that is, with the antenna assembly, may be configured to have a roof structure. FIGS. 12A and 12B are a perspective view and a side view, respectively, illustrating that an antenna assembly structure according to the present disclosure is coupled to the roof structure of the vehicle. In this regard, roof structures 2000*a*, 2000*b*, and 2000*c* in FIGS. 3A to 3C, as illustrated in FIG. 12A, may be formed to be the same as a roof structure 2000. The roof structure 2000 of the vehicle equipped with the antenna module, as illustrated in FIG. 12B, may include a first fixing part 2010 and a second fixing part 2020. A first cover 1300*u* corresponding to the upper cover may include a first groove portion GP1 and the second groove portion GP2. A second cover 1300 corresponding to the lower cover may include the first protrusion part 1301 and the second protrusion part 1302.

The first groove portion GP1 and the second groove portion GP2 may be formed in the upper cover 1300*u* in an area where the first protrusion part 1301 and the second protrusion part 1302 on the lower cover 1300 are formed, in such a manner as to be coupled to the roof structure 2000, which constitutes the upper portion of the vehicle. The roof structure 2000 may include the first fixing part 2010 and the second fixing part 2020 in a manner that corresponds to an area where the first protrusion part 1301 and the second protrusion part 1302 are formed. The first fixing part 2010 and the second fixing part 2020 may be inserted into the first groove portion GP1 and the second groove portion GP2, respectively, and may be fastened to a lower roof structure through the first protrusion part 1301 and the second protrusion part 1302, respectively.

The vehicle equipped with the antenna assembly according to the present disclosure will be described in detail below referring to FIGS. 5 to 6C and FIGS. 9A to 12B.

The roof structure 2000 is formed to constitute the exterior appearance of the vehicle and may include the first fixing part 2010 and the second fixing part 2020. The antenna assembly 1000 disposed on the roof structure may include the first cover 1300*u*, corresponding to the upper cover, and the second cover 1300, corresponding to the lower cover. The first cover 1300*u* may include the first groove portion GP1 and the second groove portion GP2 in the outer-side surface, and may include a plurality of coupling portions in the inner-side surface. The first groove portion GP1 may be coupled to the first fixing part 2010 of the roof structure, and the second groove portion GP2 may be coupled to the second fixing part 2020 of the roof structure.

The second cover 1300 may be configured to be coupled to the first cover 1300*u*. The second cover 1300 may be formed of a metal material and may have four side portions. The second cover 1300 may have first to fourth side portions S1 to S4. The first side portion S1 and the third side portion S3 are opposite sides, and the second side portion S2 and the fourth side portion S4 are opposite sides.

The first side portion S1 may be configured to include a first slot radiation portion SP1 and a second slot radiation portion SP2. The third side portion S3 may be configured to include a third slot radiation portion SP3 and a fourth slot radiation portion SP4. The second side portion SP2 may include the first recess segment 1303 and the first protrusion part 1301 within the first recess segment 1303. The fourth side portion SP4 may include the second recess segment 1304 and the second protrusion part 1302 within the second recess segment 1304.

The antenna assembly 1000 may further include a first printed circuit board (PCB) 1200*b* and a second PCB 1200. The first PCB 1200*b* may be disposed in an inner space formed by the first cover 1300*u* and the second cover 1300. The first PCB 1200*b* may include a wireless communication control IC 1400 configured to process a wireless signal. The wireless communication control IC 1400 may be realized as a network access device (NAD), but is not limited thereto. The first PCB 1200*b* may include a first feeder (feeding part) F1 and a second feeder F2. The second PCB 1200 may be disposed in the inner space formed by the first cover 1300*u* and the second cover 1300. The second PCB 1200 may include a third feeder F3 and a fourth feeder F4. The second PCB 1200 may be coupled to the first PCB 1200*b*.

In this regard, there is no limitation to a structure in which the first feeder F1 and the second feeder F2, as illustrated in FIG. 11B, are disposed on the first PCB 1200*b*. In addition, there is no limitation to a structure in which the third feeder F3 and the fourth feeder F4, as illustrated in FIG. 11C, are disposed on the second PCB 1200. As another embodiment, in a structure illustrated in (a) of FIG. 13A, the second PCB 1200 may be configured to include the first feeder F1, the second feeder F2, the third feeder F3, and the fourth feeder F4. As still another embodiment, in a structure illustrated in (b) of FIG. 13A, the first PCB 1200*b* may be configured to include the first feeder F1. The second PCB 1200 may be configured to include the second feeder F2, the third feeder F3, and the fourth feeder F4.

Therefore, the vehicle equipped with the antenna module (antenna assembly) according to the present disclosure is not limited to different structures of the feeders on the first and second PCBs 1200*b* and 1200 as illustrated in FIGS. 11B and 11C. Therefore, the independent claims directed to the vehicle equipped with the antenna module (the antenna assembly) according to the present disclosure are not limited to the structures of the feeders as illustrated in FIGS. 11B and 11C. Accordingly, the independent claims directed to the vehicle equipped with the antenna module (the antenna assembly) according to the present disclosure may also encompass the structure of the feeder in (a) and (b) of FIG. 13A.

The antenna assembly 1000 may include a plurality of antenna structures. The plurality of antenna structures may be disposed in an inner space formed by the first cover 1300*u* and the second cover 1300. The plurality of antenna structures may be configured to include the first radiator 1110, the second radiator 1120, the third radiator 1130, and the fourth radiator 1140.

The first radiator 1110 may include a first conductive pattern 1110*a* and the first slot radiation portion SP1. The first conductive pattern 1110*a* may be disposed between the first cover 1300*u* and the first PCB 1300*u*. The first conductive pattern 1110*a* may be electrically connected to the first feeder F1 disposed in the vicinity of the first slot radiation portion SP1. The second radiator 1120 may include a second conductive pattern 1120*a* and the second slot radiation portion SP2. The second conductive pattern 1120*a* may be disposed between the first cover 1300*u* and the first PCB 1300*u*. The second conductive pattern 1120*a* may be electrically connected to the second feeder F2 disposed in the vicinity of the second slot radiation portion SP2.

The third radiator 1130 may include a third conductive pattern 1130*a* and the third slot radiation portion SP3. The third conductive pattern 1130*a* may be disposed between the first cover 1300*u* and the first PCB 1300*u*. The third conductive pattern 1130*a* may be electrically connected to the third feeder F3 disposed in the vicinity of the third slot radiation portion SP3. The fourth radiator 1140 may include a fourth conductive pattern 1140*a* and the fourth slot radiation portion SP4. The fourth conductive pattern 1140*a* may be disposed between the first cover 1300*u* and the first PCB 1300*u*. The fourth conductive pattern 1140*a* may be electrically connected to the fourth feeder F4 disposed in the vicinity of the fourth slot radiation portion SP4.

A structure for fastening between the roof structure 2000 and the antenna assembly 1000 may be configured with the first and second fixing parts 2010 and 2020 and first and second coupling structures 2030 and 2040, as illustrated in FIGS. 12A and 12B. The first fixing part 2010 and the first protrusion part 1301 may be configured to be fixed by the first coupling member 2030 through the first groove portion GP1. The second fixing part 2020 and the second protrusion part 1302 may be configured to be fixed by the second coupling member 2040 through the second groove portion GP2. In this regard, the first fixing part 2010 and the second fixing part 2020 may have the shape of a bolt. An end portion of the first fixing part 2010 may be realized as a first fastening portion 2011 in the shape of a bolt. An end portion of the second fixing part 2020 may be realized as a second fastening portion 2021 in the shape of a bolt. The first coupling member 2030 and the second coupling member 2040 may have the shape of a nut. Accordingly, the first coupling member 2030 and the second coupling member 2040, which have the shape of a nut, may be fastened to the first fastening portion 2011 and the second fastening portion 2021, which have the shape of a bolt, respectively.

In the structure for the fastening between the roof structure 2000 of the vehicle and the antenna assembly 1000, the first and second fixing parts 2010 and 2020 and the first and second coupling structures 2030 and 2040 may be formed of a metal material. The first and second fastening portions 2011 and 2021, having the shape of a bolt, which are formed on end sections of the first and second fixing parts 2010 and 2020, respectively, may also be formed of a metal material. Accordingly, the ground of the roof structure 2000 of the vehicle and the ground of the antenna assembly 1000 may be electrically connected to each other. An outer-side fixation member formed in such a manner as to surround the first and second fastening portions 2011 and 2021 is not limited to a metal material. As long as it can maintain the rigidity, the outer-side fixation member that is formed in such a manner as to surround the first and second fastening portions 2011 and 2021 may be formed of a dielectric material.

The antenna assembly according to the present disclosure may be configured to be fastened to the first cover and the second cover through a fastening means. In this regard, FIG. 12C is a view illustrating an exploded state and a coupled state that result before and after the antenna assembly configured in such a manner as to fasten the first cover and the second cover according to the present disclosure through a fastening means.

Figure 12C:
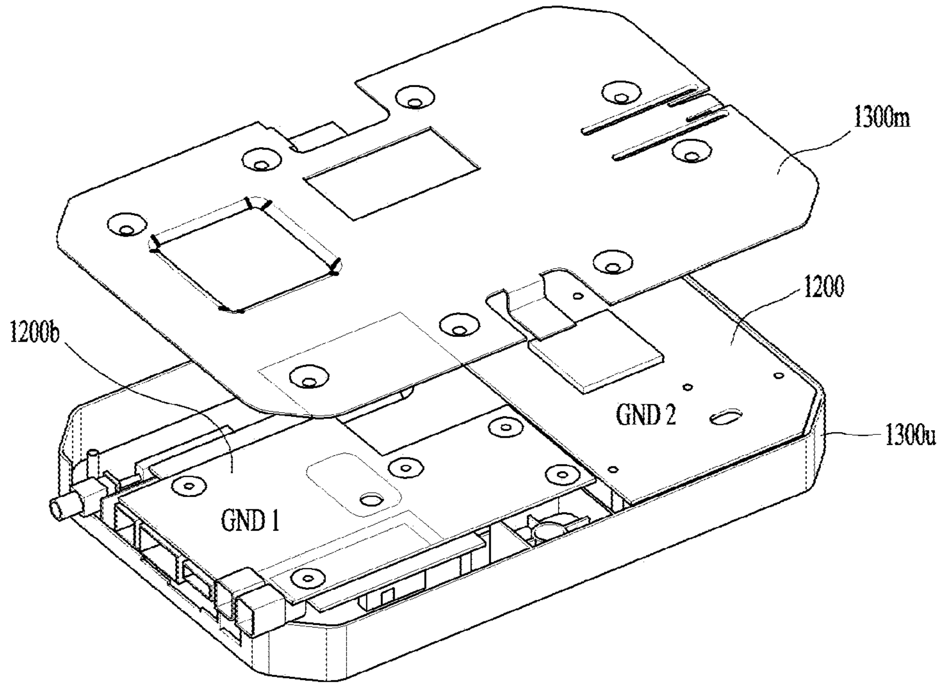
FIG. 12C is a view illustrating an exploded state and a coupled state that result before and after the antenna assembly configured in such a manner as to fasten a first cover and a second cover according to the present disclosure through a fastening means.
Figure 12C:
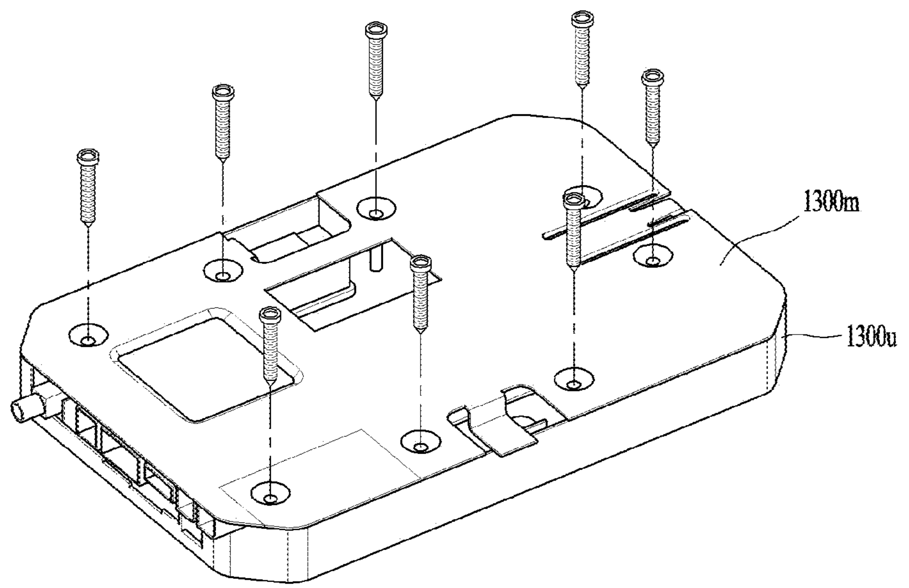

Referring to FIG. 12C, a metal plate 1300*m* of the second cover is electrically connected to the ground of the vehicle and may function as the ground. Referring to (a) of FIG. 12C, a metal pattern formed on a rear surface of the first PCB 1200*a* may be connected to the metal plate 1300*m* and may function as a first ground GND1. In addition, a metal pattern formed on a rear surface of the second PCB 1200 may be connected to the metal plate 1300*m* and may function as a second ground GND2. The first ground portion GND1 of the first PCB 1200*a* and the second cover 1300 may be connected through a fastening means at a plurality of contact points. The second ground portion GND2 of the second PCB 1200 and the second cover 1300 may be connected through a fastening means at a plurality of contact points.

The first PCB 1200*b* and the second PCB 1200 according to the present disclosure may be disposed in various shapes of arrangement structures. In this regard, FIGS. 13A and 13B are views each illustrating an example where the TCU PCB and the antenna PCB of the vehicular antenna module according to the present disclosure are coupled to each other.

The TCU PCB and the antenna PCB of the vehicular antenna module according to the present disclosure may be formed in various structures and may be coupled to each other. In this regard, FIGS. 13A and 13B are views each illustrating an example where the TCU PCB and the antenna PCB of the vehicular antenna module according to the present disclosure are coupled to each other. (a) of FIG. 13A illustrates a structure in which the second PCB 1200 is coupled in such a manner as to surround an upper end portion, a one-side end portion, and a lower end portion of the first PCB 1200*b*. Referring to (a) of FIG. 13A, the second PCB 1200 may be formed in such a manner that the second PCB 1200 constitutes the entire configuration of the antenna module. Pins of the board-to-board board (B-to-B) may be formed in such a manner that the number thereof is maximized when compared to other structures.

Figure 13A:
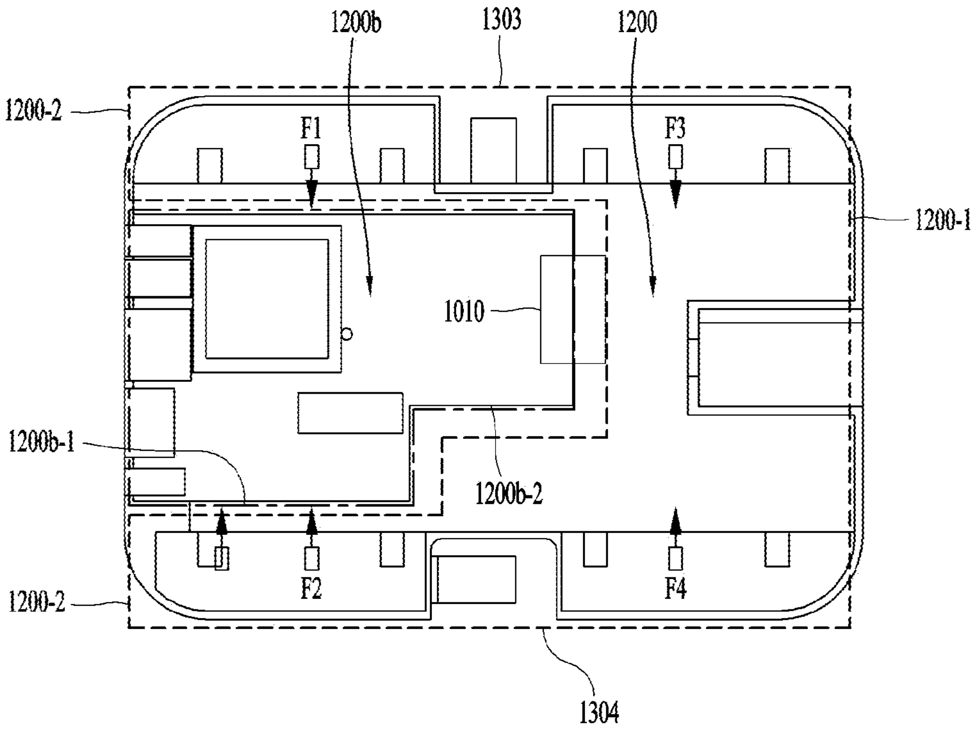
FIGS. 13A and 13B are views each illustrating an example where a TCU PCB and an antenna PCB of the vehicular antenna module according to the present disclosure are coupled to each other.
Figure 13A:
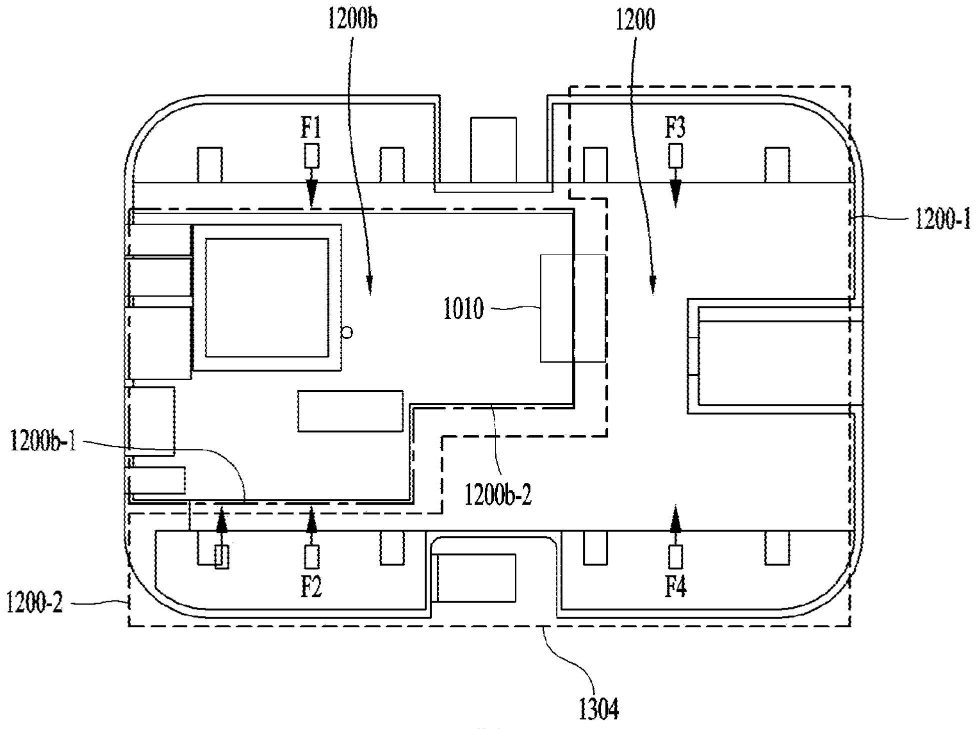

(b) of FIG. 13A illustrates a structure in which the second PCB 1200 is coupled in such a manner as to surround the one-side end portion and the lower end portion of the first PCB 1200*b*. Referring to (b) of FIG. 13A, the second PCB 1200 may be formed in such a manner that the second PCB 1200 constitutes one portion of the configuration of the antenna module. Accordingly, the size of the second PCB 1200 can be reduced, thereby saving costs. In addition, the number of the pins of the board-to-board (B-to-B) can be decreased when compared to the structure in (a) of FIG. 15A, thereby saving costs.

Figure 13B:
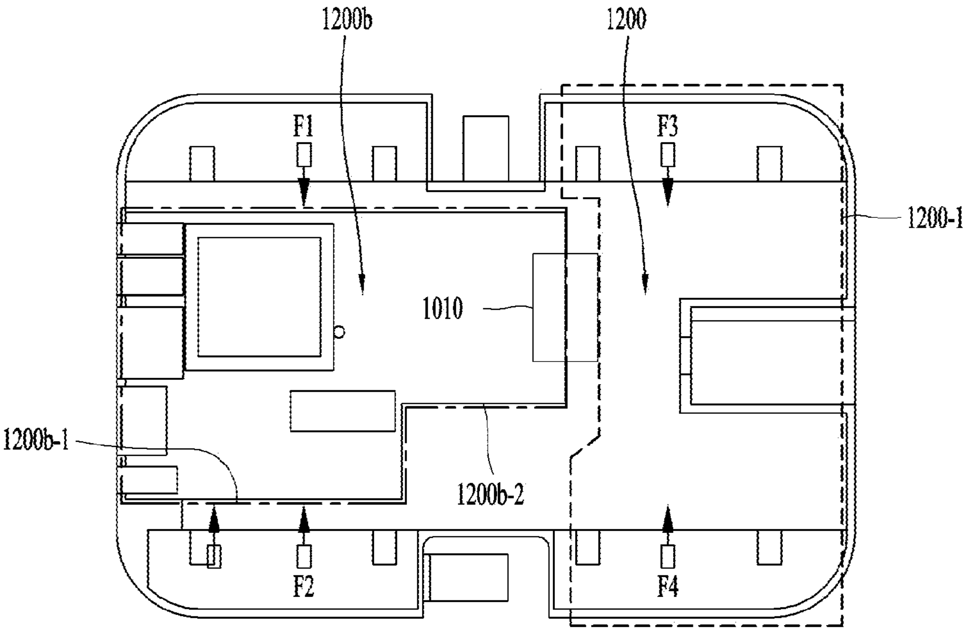
Figure 13B:
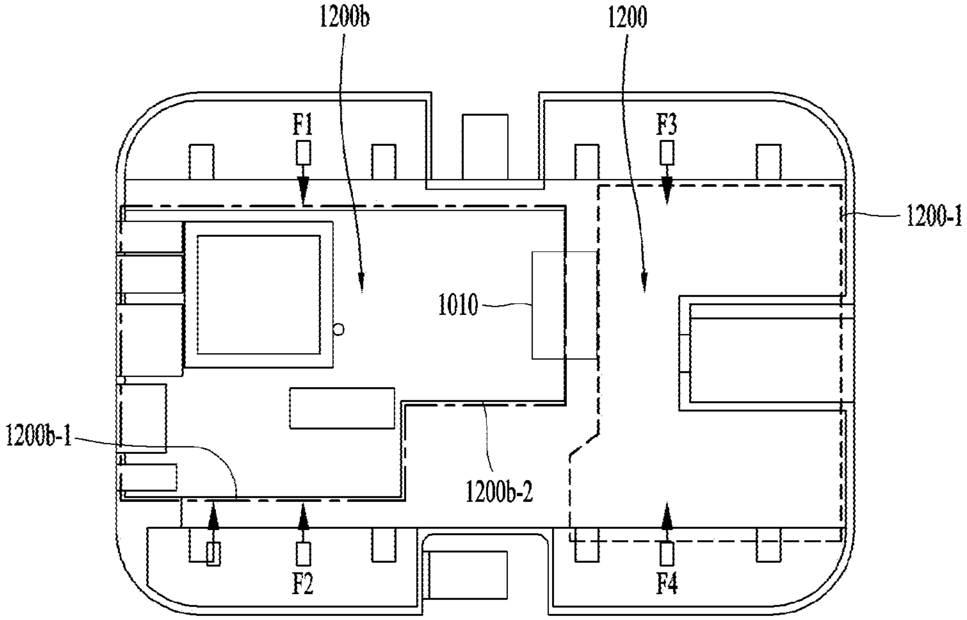

(b) of FIG. 13B illustrates a structure in which a one-side end portion of the first PCB 1200*b* and the second PCB 1200 are coupled to each other. Referring to (a) of FIG. 13B, the second PCB 1200 may be formed in such a manner that the second PCB 1200 constitutes one portion of the configuration of the antenna module. Accordingly, the size of the second PCB 1200 can be reduced, thereby saving costs. In addition, the number of the pins of the board-to-board (B-to-B) can be decreased when compared to the structure in (a) of FIG. 15A, thereby saving costs.

(b) of FIG. 13B illustrates a structure in which a one-side end portion of the first PCB 1200*b* and the second PCB 1200 are coupled to each other and in which the size of the second PCB 1200 is reduced when compared to the structure in (a) of FIG. 13B. Referring to (b) of FIG. 13B, the second PCB 1200 may be formed in such a manner that the second PCB 1200 constitutes one portion of the configuration of the antenna module. Accordingly, the size of the second PCB 1200 can be reduced, thereby saving costs. In addition, the number of the pins of the board-to-board (B-to-B) can be decreased when compared to the structure in (a) of FIG. 13A, thereby saving costs.

Referring to FIGS. 13A and 13B, the second PCB 1200 may be coupled to the first PCB 1200*b* at one side through the board-to-board connector 1010. Referring to (a) and (b) of FIG. 15A, the second PCB 1200 may be formed at one of the upper and lower sides of the first PCB 1200*b* in such a manner as to surround the first PCB 1200*b*. Accordingly, the second PCB 1200 may secure more space in which an antenna element and electronic components can be disposed.

Referring to FIGS. 5 to 6C and FIGS. 9A to 13B, a first part 1200*b*-1 of the first PCB 1200*b* may be disposed between the first slot radiation portion SP1 and the second slot radiation portion SP2. A second part 1200*b*-2 of the first PCB 1200*b* may be disposed between the first recess segment 1303 and the second recess segment 1304. The second PCB 1200 may be disposed between the third slot radiation portion SP3 and the fourth slot radiation SP4. As an example, a first part 1200-1 of the second PCB 1200 may be disposed between the third slot radiation portion SP3 and the fourth slot radiation SP4. A second part 1200-2 of the second PCB 1200 may be disposed between the first slot radiation portion SP1 and the second slot radiation SP2. The second part 1200-2 of the second PCB 1200 may be disposed in such a manner as to cover the first slot radiation portion from over the first slot radiation portion SP1 and the second slot radiation portion SP2.

The first PCB 1200*b* may further include a first connector 1010*a* that is positioned on the second part 1200*b*-2 of the first PCB. The second PCB 1200 may further include a second connector 1010*b* configured in such a manner as to be coupled to the first connector of the first PCB 1200*b*. The first connector 1010*a* of the first PCB 1200*b* and the second connector 1010*b* of the second PCB 1200 may constitute the board-to-board connector and may couple different PCBs on the same plane.

Referring to FIGS. 11B and 11C, the first PCB 1200*b* may further include the first ground portion GND1. As an example, the first ground portion GND1 may be a metal pattern disposed on a rear surface of the first PCB 1200*b*, but is not limited thereto. The first ground portion GND1 may be a metal pattern that is formed on a front surface of the first PCB 1200*b* and is electrically connected to a rear surface thereof. The second PCB 1200 may further include the second ground portion GND2. As an example, the second ground portion GND2 may be a metal pattern disposed on a rear surface of the second PCB 1200, but is not limited thereto. The second ground portion GND2 may be a metal pattern that is formed on a front surface of the second PCB 1200 and is electrically connected to the rear surface thereof.

As described above, the first ground portion GND1 and the second cover 1300 may be connected to each other at a plurality of contact points. The second ground portion GND2 and the second cover 1300 may be coupled to each other at a plurality of contact points. Referring to FIGS. 5 to 6C and FIGS. 9A to 13B, the first ground portion GND1 and the second cover 1300 may be configured to be connected to each other through a first ground contact portion 1351*g*. In addition, the second ground portion GND2 and the second cover 1300 may be configured to be connected to each other through a second ground contact portion 1352*g*. The first ground contact portion 1351*g* and the second ground contact portion 1352*g* may constitute the ground contact portion 1350.

The first cover 1300*u* may include an opening area OA, and heat generated within the antenna assembly may dissipate to the outside through the opening area OA. In this regard, the wireless communication control IC 1400 that is to be disposed on the first PCB 1200*b* may be disposed on the second part 1200*b*-2 of the first PCB. The opening area OA in the first cover 1300*u* may be formed to face the wireless communication control IC 1400 on the first PCB 1200*b*. The opening area OA in the first cover 1300*u* may be configured to be covered by the heat sink 1020 having a metal structure. Heat generated by the wireless communication control IC 1400 may be transferred to the heat sink 1020.

Figure 14A:
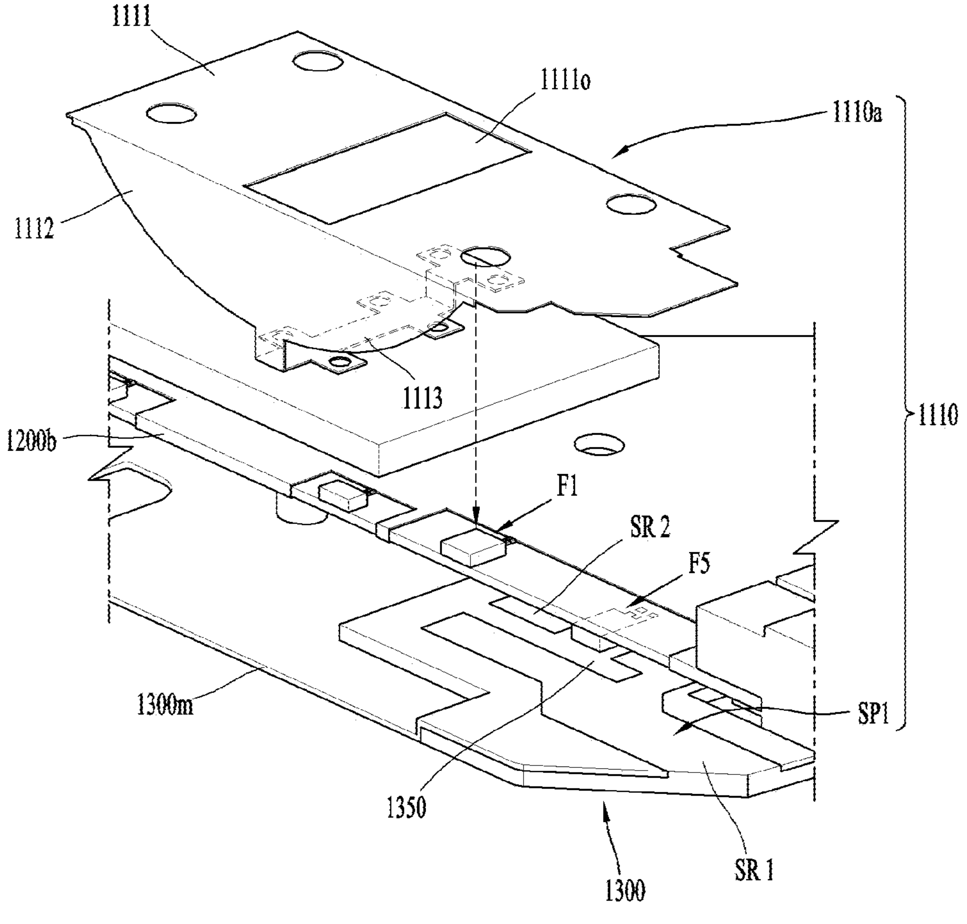
FIG. 14A is a perspective view illustrating a structure in which a radiator performing 4G/5G communication is disposed in the antenna module according to the present disclosure, which can be installed on the vehicle.
Figure 14B:
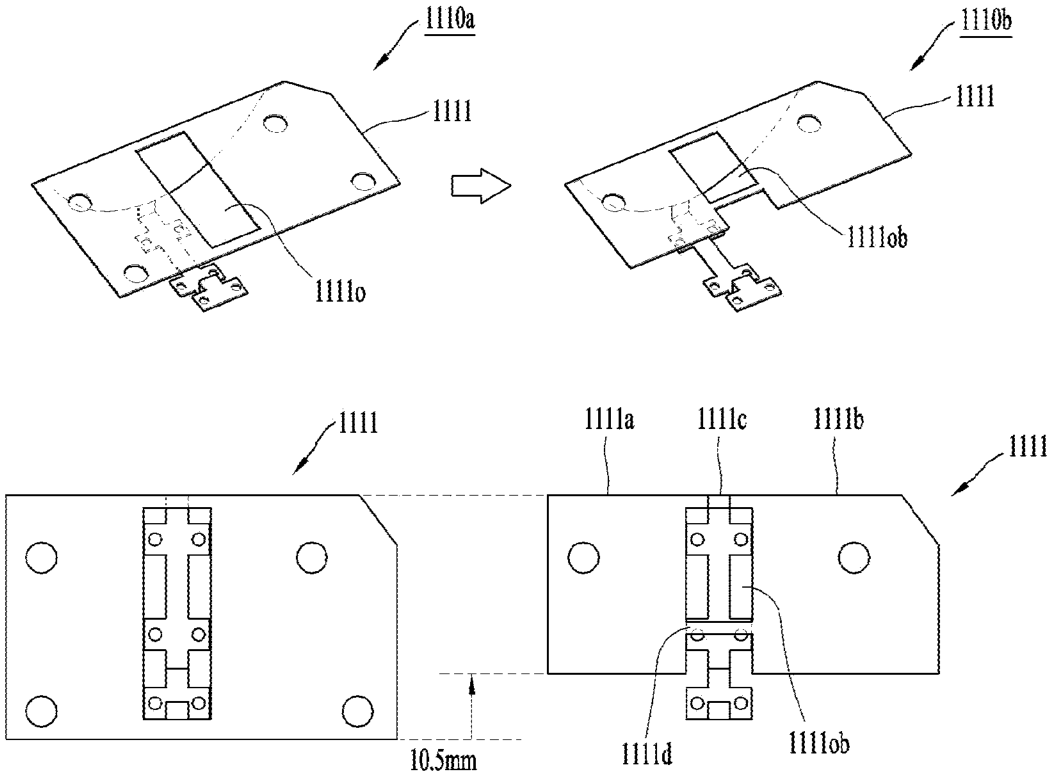
FIG. 14B is a view illustrating a comparison between a first type radiator in FIG. 14A and a second type radiator of which the size is reduced.

A structure of a radiator that constitutes the first to fourth antennas, which perform 4G/5G communication in the vehicular antenna module according to the present disclosure, is described in detail. In this regard, FIG. 14A is a perspective view illustrating a structure in which the radiator performing 4G/5G communication is disposed in the antenna module according to the present disclosure, which can be installed on the vehicle. FIG. 14B is a view illustrating a comparison between a first type radiator in FIG. 14A and a second type radiator of which the size is reduced.

Referring to FIG. 14A, radiator 1110 may be configured to include a first metal pattern 1111 corresponding to an upper metal pattern and a second metal pattern 1112 corresponding to a side metal pattern. The radiator 1110 may be configured to further include a third metal pattern 1113 corresponding to a lower metal pattern. With regard to this, the first metal pattern 1111 and the second metal pattern 1112 may be referred to as a first sub pattern 1111 and a second sub pattern 1112. The third metal pattern 1113 may be referred to as a feed pattern 1113.

The first metal pattern 1111 may be disposed parallel to the top cover and the bottom cover. An opening region 1111*o* may be formed in the first metal pattern 1111. As a current path is increased by the opening region 1111*o*, the radiator 1100 may operate in a lower frequency band.

The second metal pattern 1112 may be vertically connected to the first metal pattern 1111 to form a side region (side surface region). The third metal pattern 1113 may be configured to be connected to the second metal pattern 1112 and the first feeder F1. The third metal pattern 1113 may be configured to transmit the first signal of the first band to the second metal pattern 1112, which is the side metal pattern.

As the radiator 1110 operates as a first radiator and the slot regions SR1 and SR2 operate as a second radiator, the main antenna may resonate in a wide band over the full LB band. Accordingly, the main antenna may operate in a dual mode in which it operates as a first radiator in the first band and as a second radiator in the second band, thereby operating as a broadband antenna over the full LB band.

In this regard, the radiator 1110 operates as a first radiator that radiates the first signal of the first band fed from the first feeder F1. On the other hand, the slot regions SR1 and SR2 operate as a second radiator that radiates the first signal of the second band fed from the second feeder F2. Accordingly, the first radiator operating in the first band and the second radiator operating in the second band constitute the main antenna.

Referring to FIGS. 5 to 14A, the first to fourth radiators 1110 to 1140 each may be configured to include a first metal pattern 1111 and a second metal pattern 1112. The first metal pattern 1111 may be disposed over the lower cover 1300 in a manner that runs in parallel to the lower cover 1300. The first metal pattern 1111 may be formed in the shape of a rectangle with a predetermined width and length. The border areas of the first metal pattern 1111 may constitute the upper end portion, the lower end portion, the one-side end portion, and the other-side end portion, respectively. An opening area 1111*o* may be formed in the center area of the first metal pattern 1111.

The second metal pattern 1112 may have a side area formed to extend from the upper end portion or the lower end portion of the first metal pattern 1111 in a manner that runs perpendicularly to the first metal pattern 1111. The second metal pattern 1112 may be formed in such a shape that the width thereof decreases toward the lower cover 1300. The second metal pattern 1112 may be formed in a semi-circular shape, but is not limited thereto.

FIG. 14B is a set of a perspective view and a front view illustrating the comparison in structure between the first type radiator 1110 and the second type radiator 1110*b*. As described above, the opening area 1111*o* may be formed in the first metal pattern 1111 of the first type radiator 1110. The opening area 1111*ob* may be formed in the first metal pattern 1111 of the second type radiator 1110*b*. The first metal pattern 1111 of the second type radiator 1110*b* may include a first metal area 1111*a* formed at one side and a second metal area 1111*b* formed at the other side. The first metal pattern 1111 may include a first connection portion 1111*c* connecting the first metal area 1111*a* and the second metal area 1111*b* to each other. The first metal pattern 1111 may further include a second connection portion 1111*d* connecting the first metal area 1111*a* and the second metal area 1111*b* to each other. The opening area 1111*ob* may be formed by the first connection portion 1111*c* and the second connection portion 1111*d* that serve as connectors.

The first metal pattern 1111 of the second type radiator 1110*b* may be formed to have a smaller length in a one axis direction than the first metal pattern 1111 of the first type radiator 1110. The size of the second type radiator 1110*b* can be reduced, and accordingly, a level of interference between the radiators can be lowered. As an example, the length, in a one side direction, of the first metal pattern 1111 of the second type radiator 1110*b* can be reduced by approximately 10.5 mm, making it shorter than the length, in the one side direction, of the first metal pattern 1111 of the first type radiator 1110. However, there is no limitation to this numerical value, but the numerical value can widely vary according to the entire size and the arrangement structure of the vehicular antenna module.

A slot region, from which metal is removed, may be formed in a metal plate of the lower cover of the vehicular antenna module according to the present disclosure in a manner that corresponds to an antenna area where an antenna is disposed. In this regard, the structure of the broadband antenna according to the present disclosure may be separately disposed at different positions within the antenna module. Slot areas may be formed at different positions on the metal plate 1300*m* of the lower cover 1300 in a manner that corresponds to the antenna elements which are separately disposed at different positions in this manner. The dielectric cover may be disposed in a manner that corresponds to positions where the slot regions are formed.

Figure 15A:
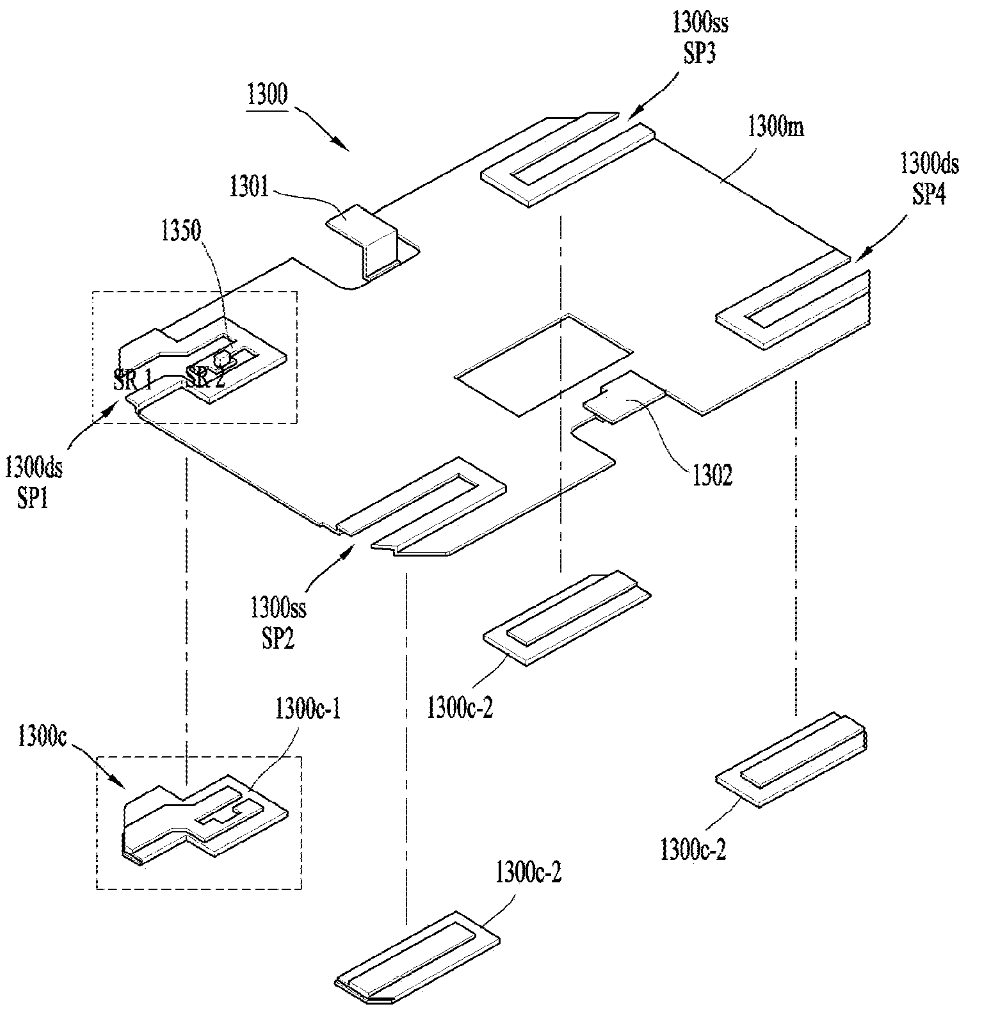
FIGS. 15A and 15B are views each illustrating slot regions that are formed at different positions on a metal plate of the lower cover according to embodiments.
Figure 15B:
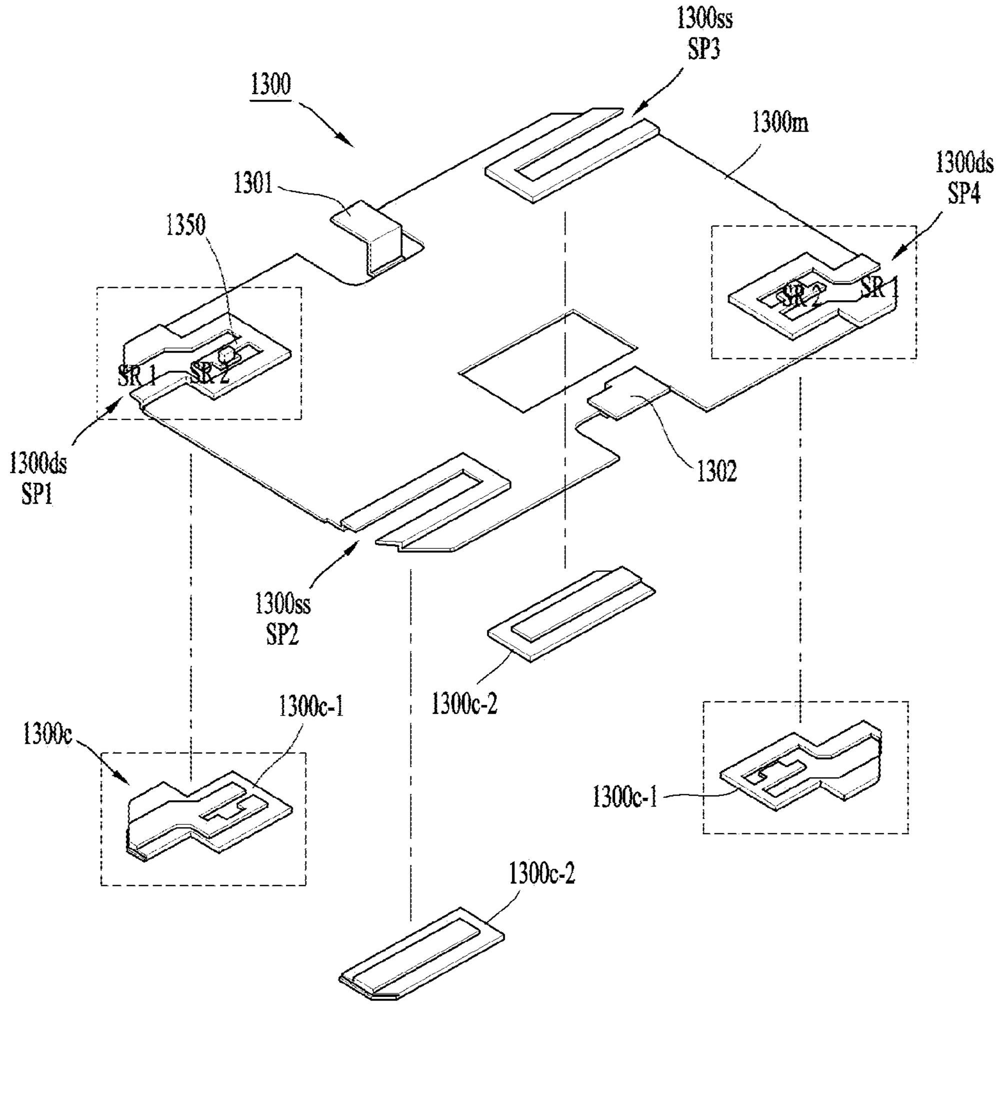

In this regard, FIGS. 15A and 15B are views each illustrating the slot regions that are formed at different positions on the metal plate of the lower cover according to embodiments. Referring to FIGS. 5 to 6C and FIGS. 9A to 15A, the first slot radiation portion SP1 and the second slot radiation portion SP2 may be disposed on the first side portion S1 in parallel to each other. The first slot radiation portion SP1 may be formed to have a greater size than the second slot radiation portion SP2. Accordingly, the first slot radiation portion SP1 may be configured to operate in multi-bands. The first PCB 1200*b* may further include a fifth feeder F5. The first slot radiation portion SP1 may be configured to include a fifth conductive pattern 1350 connected to the second cover 1300. The fifth conductive pattern 1350 may be realized in the shape of a branch member, but is not limited thereto. The fifth conductive pattern 1350 may be electrically connected to the fifth feeder F5 within the first slot radiation portion. The first feeder F1 and the fifth feeder F5 may be disposed on the opposite surfaces of the first PCB 1200*b*.

The third slot radiation portion SP3 and the fourth slot radiation portion SP4 may be disposed on the third side portion S3 in parallel to each other. The third slot radiation portion SP3 may be configured to have a smaller size than the fourth slot radiation portion SP4, but is not limited to this configuration. As another example, the third slot radiation portion SP3 may be configured to have the same size as the fourth slot radiation portion SP4.

The first to fourth slot radiation portions SP1 to SP4 may be configured to be coupled to their respective dielectric covers. In this regard, the first slot radiation portion SP1 may be covered by a first dielectric cover 1300*c* within the second cover 1300. The second slot radiation portion SP2 may be covered by a second dielectric cover 1300*c*2 within the second cover 1300. The third slot radiation portion SP3 may be covered by a third dielectric cover 1300*c*3 within the second cover 1300. The fourth slot radiation portion SP4 may be covered by a fourth dielectric cover 1300*c*4 within the second cover 1300.

The first and second protrusion parts 1301 and 1302 on the second cover 1300 may be formed in different shapes, thereby optimizing the antenna efficiency. The first protrusion part 1301 may be connected to the metal plate 1300*m* of the second cover at the middle portion of the first recess segment 1303. The middle portion of the first recess segment 1303 forms an area between one side and the other side. The second protrusion part 1302 may be connected to the metal plate 1300*m* of the second cover of the second recess segment 1304 at the middle portion. The second protrusion part 1302 may further include a sub-protrusion part SSP that protrudes toward the second slot radiation portion SP2 within the second recess segment 1304.

Meanwhile, referring to FIGS. 5 to 15B, the main antenna may include a first antenna, a second antenna, a third antenna, and a fourth antenna that are disposed on top and bottom of one side and on top and bottom of another side of the metal plate 1300*m* of the bottom cover. Mold covers 1300*c* made of a dielectric material may be disposed on a first slot portion SP1 to a fourth slot portion SP4 corresponding to the first to fourth antennas.

Specifically, FIG. 15A illustrates a structure in which a dual slot region 1300*ds* is disposed at the first position on the metal plate 1300*m* of the bottom cover 1300. The first slot region SR1 and the second slot region SR2, as described above, may be formed in each of the dual slot regions 1300*ds*. On the other hand, single slot regions 1300*ss* may be disposed at the remaining second to fourth positions on the metal plate 1300*m* of the bottom cover 1300. Only one slot is disposed in each single slot region 1300*ss*.

A first type mold cover 1300*c*-1 coupled to the dual slot region 1300*ds* may be disposed in the dual slot region 1300*ds*. On the other hand, a second type mold cover 1300*c*-2 coupled to the single slot region 1300*ss* may be disposed in the single slot region 1300*ss*. When the dual slot region 1300*ds* is formed, the antenna element may operate up to the second band of the LB band. On the other hand, when the single slot region 1300*ss* is formed, the antenna element may operate only in the first band of the LB band even if the radiator is disposed.

Accordingly, one or several of the slot regions SP1 to SP4 may be formed as first type slots 1300*ss*. The remaining areas, among the slot regions SP1 to SP4, may be formed as second type slots 1300*ds*. Referring to FIGS. 14A and 15*a*, the first type slot 1300*ss* may be configured as a rectangular slot with a first width and a first length under the first metal pattern 1111 of the radiator. The second type slot 1300*ds* may be configured to include a first slot SR1 and a second slot SR2 under the first metal pattern 1111 of the radiator.

The second type slot 1300*ds* may be configured as a second rectangular slot with a second width, which is greater than the first width, and a second length under the first metal pattern 1111. A branch member 1350 may be formed at one side of the second rectangular slot. The second type slot 1300*ds* may be divided into a first slot SR1 at the upper position and a second slot SR2 at the lower position by the branch member 1350. A third Wi-Fi antenna 1160*c* may be further included which is configured to be fed by the second slot SR2 and to receive and transmit a Wi-FI signal. Unlike other Wi-Fi antennas, the third Wi-Fi antenna 1160*c* is configured to radiate a signal primarily through a slot region.

FIG. 15B illustrates a structure in which the dual slot regions 1300*ds* are disposed at the first position and the third position on the metal plate 1300*m* of the bottom cover 1300. The locations where the dual slot regions 1300*ds* are disposed are not limited to this and may vary depending on the application. The first slot region SR1 and the second slot region SR2, as described above, may be formed in each of the dual slot regions 1300*ds*. On the other hand, single slot regions 1300*ss* may be disposed at the remaining second and fourth positions on the metal plate 1300*m* of the bottom cover 1300. Only one slot is disposed in each single slot region 1300*ss*.

A first type mold cover 1300*c*-1 coupled to the dual slot region 1300*ds* may be disposed in the dual slot region 1300*ds*. On the other hand, a second type mold cover 1300*c*-2 coupled to the single slot region 1300*ss* may be disposed in the single slot region 1300*ss*. When the dual slot region 1300*ds* is formed, the antenna element may operate up to the second band of the LB band. On the other hand, when the single slot region 1300*ss* is formed, the antenna element may operate only in the first band of the LB band even if the radiator is disposed.

Accordingly, at the first and third positions where the dual slot regions 1300*ds* are disposed, MIMO may be performed in the second band through the first feeder F1 and the slot regions SR1 and SR2 of FIG. 11. On the other hand, at the first to fourth positions where the single slot region 1300*ss* or the dual slot region 1300*ds* is disposed, MIMO may be performed in the first band through the first feeder F1 and the radiator 1110 of FIG. 11.

Referring to FIGS. 5 to 15B, the lower cover 1300 may be configured to include the metal plate 1300*m* in which the slot regions SP1 to SP4 are formed in the upper region and the lower region of the first area R1 and the upper region and the lower region of the third area R3. The slot regions SP1 to SP4 may correspond to a lower region of an area where the first metal pattern 1111 of the radiator is formed.

The first radiator 1110, the second radiator 1120, the third radiator 1130, and the fourth radiator 1140, which are disposed on top and bottom of one side and top and bottom of another side, respectively, of the lower cover 1300, may be configured to perform MIMO. The dielectric cover 1300*c* formed of a dielectric material may be disposed in the first to fourth slot portions SP1 to SP4 that correspond to the first to fourth radiators 1110 to 1140, respectively.

The first to fourth radiators 1110 to 1140 each may further include a third metal pattern 1113 in addition to the first metal pattern 1111 and the second metal pattern 1112. The first to fourth radiators 1110 to 1140 each may further include an opening area 11100.

The third metal pattern 1113 may extend from a lower end of the second metal pattern 1112. The third metal pattern 1113 may be disposed adjacent to a one side end of each of the slot regions SP1 to SP4 in the lower cover 1300. The third metal pattern 1113 may be configured to be connected to each of the first to fourth feeding patterns F1 to F4. The opening area 11100 may be formed, in one area of the first metal pattern 1111, to have a predetermined width and length.

The vehicular antenna module according to the present disclosure may be configured in various shapes in order to reduce the size of the antenna PCB. In this regard, FIGS. 16A and 16 are exploded perspective views each illustrating the vehicular antenna module configured with the antenna PCB of which the size is reduced.

Figure 16A:
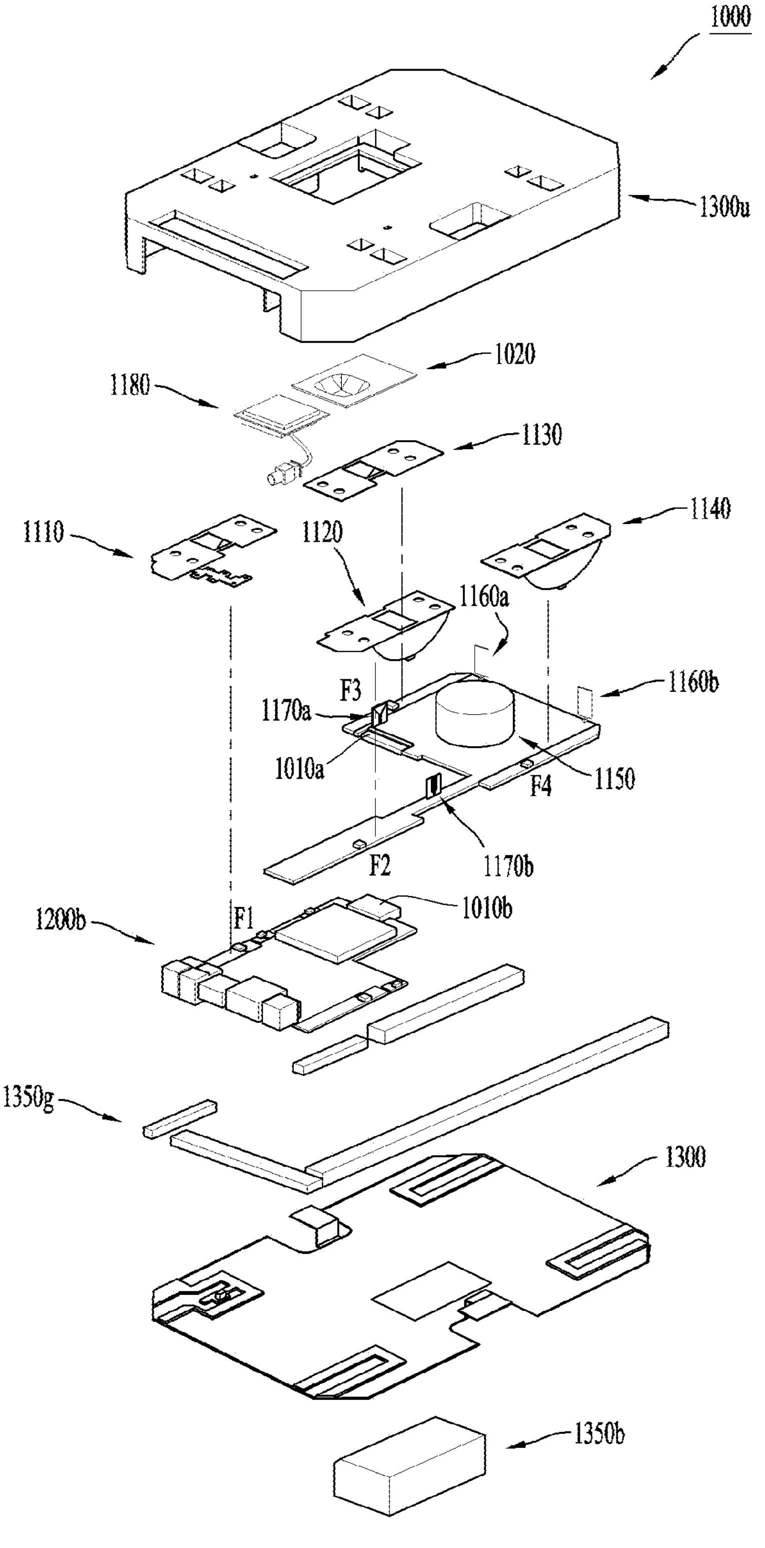
FIGS. 16A and 16B are exploded perspective views each illustrating the vehicular antenna module configured with the antenna PCB of which the size is reduced.

FIG. 16A, like (b) of FIG. 15A, illustrates a structure where the second PCB 1200 is coupled in such a manner as to surround a one-side end portion and a lower end portion of the first PCB 1200*b*. The second PCB 1200 and the first PCB 1200*b* may be coupled to each other by the board-to-board connectors 1010*a* and 1010*b*. Referring to FIG. 16A, the first radiator 1110 may be connected to the first feeding pattern F1 formed on the first PCB 1200*b*. The second to fourth radiators 1120 to 1140 may be connected to the second to fourth feeding patterns F2 to F4 formed on the second PCB 1200. Accordingly, the size of the second PCB 1200 can be reduced when compared to a structure in which the second PCB 1200 entirely surrounds the first PCB 1200*b* from above and below.

Other antenna elements may be disposed on the second PCB 1200. The GNSS antenna 1150 may be disposed on the center area of the second PCB 1200. The first and second Wi-Fi antennas 1160*a* and 1160*b* may be disposed on an upper region and a lower region, respectively, of a side area of the second PCB 1200. The first and second V2X antennas 1170*a* and 1170*b* may be disposed an upper area and a lower area, respectively, of the PCB 1200.

The first metal pattern that is an upper metal pattern of each of the first to fourth radiators 1110 and 1140 may be formed in a fused manner on a surface of the upper cover 1300. Accordingly, in a case where the antenna module is disposed within the roof of the vehicle and is used, the first to fourth radiators 1110 to 1140 can further secure the structural stability within the antenna module.

Figure 16B:
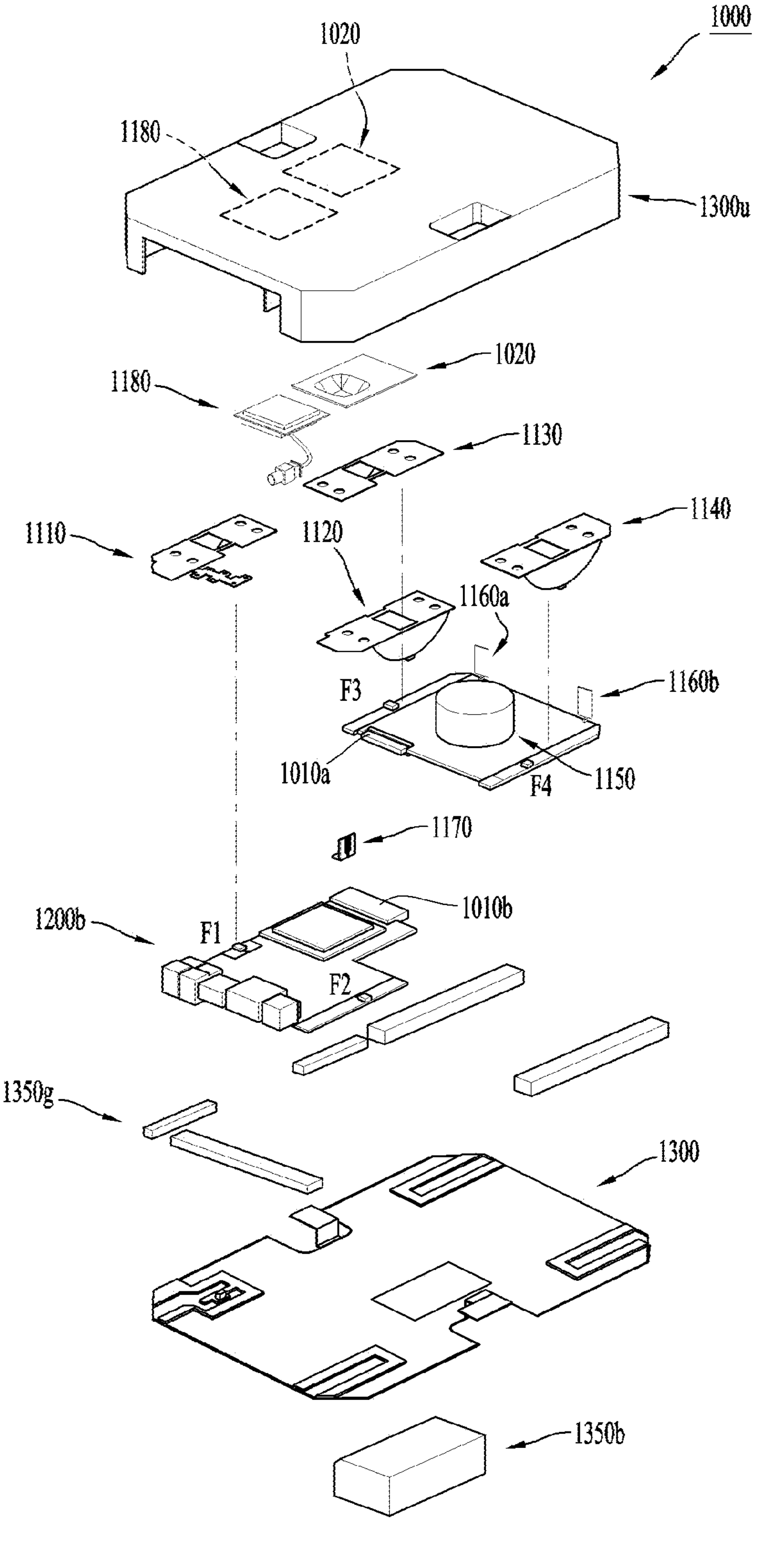

FIG. 16B, like (a) of FIG. 13B, illustrates a structure in which a one-side end portion of the first PCB 1200*b* and the second PCB 1200 are coupled to each other. The second PCB 1200 and the first PCB 1200*b* may be coupled to each other by the board-to-board connectors 1010*a* and 1010*b*. Referring to FIG. 16B, the first radiator 1110 and the second radiator 1120 may be connected to the first feeding pattern F1 and the second feeding pattern F2, respectively, which are formed on the first PCB 1200*b*. The third radiator 1130 and the fourth radiator 1140 may be connected to the third feeding pattern F3 and the fourth feeding pattern F4, respectively, which are on the second PCB 1200. Accordingly, the size of the second PCB 1200 can be reduced when compared to the structure in which the second PCB 1200 entirely surrounds the first PCB 1200*b* from both above and below.

Other antenna elements may be disposed on the second PCB 1200. The GNSS antenna 1150 may be disposed on the center area of the second PCB 1200. The first and second Wi-Fi antennas 1160*a* and 1160*b* may be disposed on the upper region and the lower region, respectively, of the side area of the second PCB 1200. The V2X antenna 1170 may be disposed on an upper area of the second PCB 1200. The V2X antenna 1170 may be realized as a monopole on a board such as a flexible printed circuit board (FPCB).

The first metal pattern that is the upper metal pattern of each of the first to fourth radiators 1110 and 1140 may be formed in a fused manner on the surface of the upper cover 1300. Accordingly, in the case where the antenna module is disposed within the roof of the vehicle and is used, the first to fourth radiators 1110 to 1140 can further secure the structural stability within the antenna module. The SDARS antenna 1180 can also be formed in a fused manner on the surface of the upper cover 1300, thereby securing the structural stability. In addition, the heat sink 1020 can also be formed in a fused manner on the surface of the upper cover 1300 and can dissipate heat out of the antenna module, thereby improving the heat dissipation property.

Figure 17:
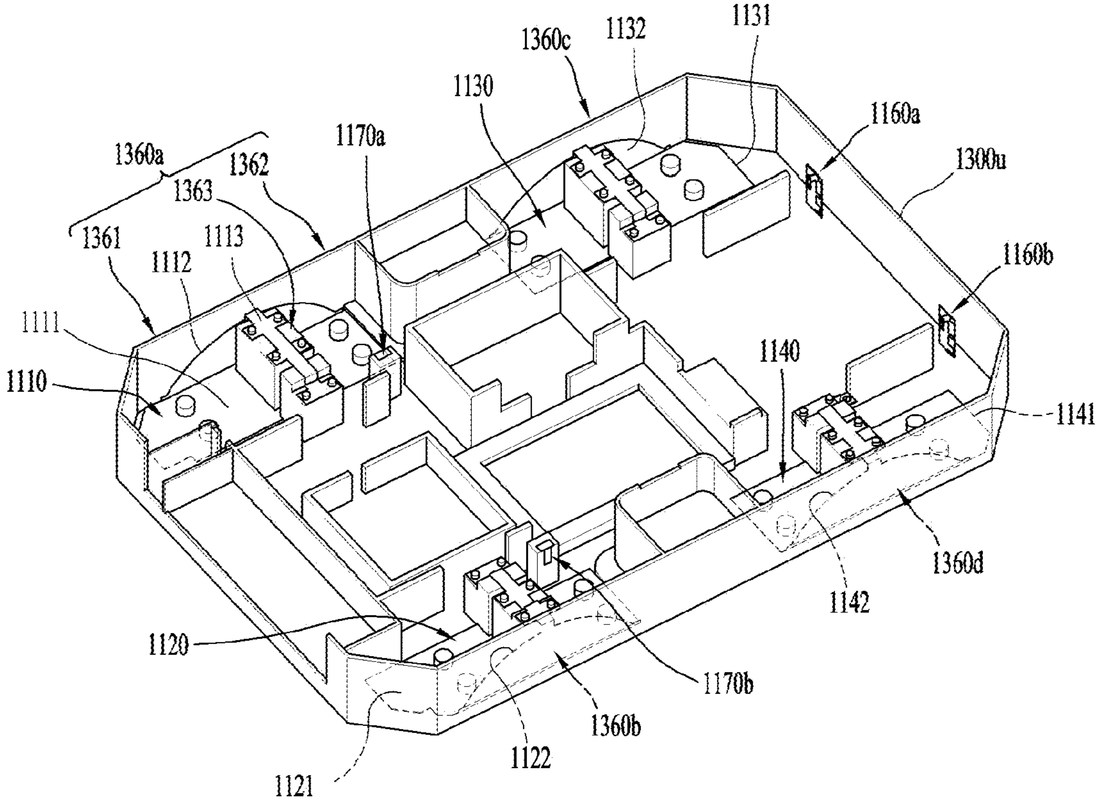
FIG. 17 is a view illustrating a structure of the upper cover formed with a partitioned structure according to the present disclosure.
Figure 18:
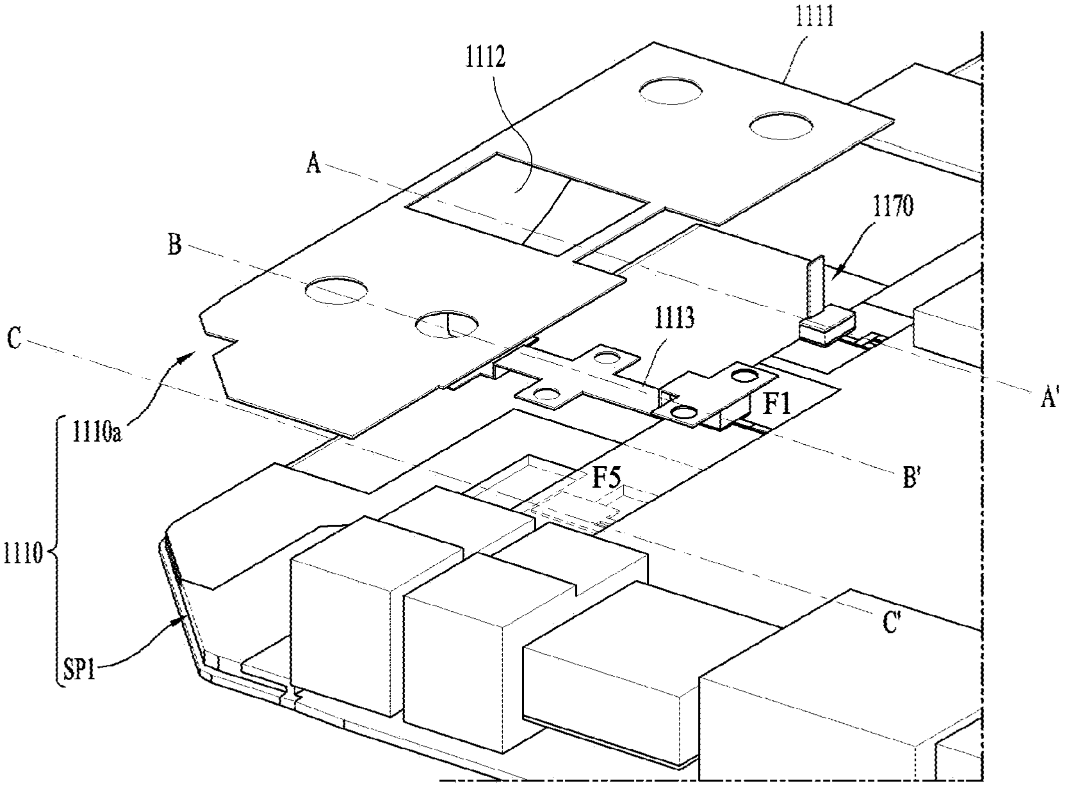
FIG. 18 is a view illustrating a structure in which a V2X antenna is disposed on a lower area of a first antenna.

The upper cover of the vehicular antenna module according to the present disclosure may be formed to have a partitioned structure in such a manner that a plurality of antenna elements are fused or are accommodated within predetermined partitions. In this regard, FIG. 17 is a view illustrating a structure of the upper cover formed with the partitioned structure according to the present disclosure. FIG. 18 is a view illustrating a structure in which the V2X antenna is disposed on a lower area of the first antenna.

Referring to FIG. 17, the first to fourth radiators 1110 to 1140 may be disposed in a fused manner on a surface of the upper cover 1300*u*. In this regard, the first to fourth radiators 1110 to 1140 may be separated from other constituent elements by partition structures 1360*a* to 1360*d*, respectively. The partition structures 1360*a* to 1360*d* may be formed in such a manner as to fix the first to fourth radiators 1110 to 1140, respectively, in the upper area.

The partition structure 1360*a* of the first radiator 1110 may be configured to include first to third partition structures 1361 to 1363. One side of the first metal pattern 1111 of the first radiator 1110 may be disposed in the first partition structure 1361. The other side of the first metal pattern 1111 of the first radiator 1110 may be disposed in the second partition structure 1362. The second metal pattern 1112 may be fused on upper areas of the first partition structure 1361 and the second partition structure 1362. The third partition structure 1363 may be configured in such a manner that the third metal pattern 1113 of the first radiator 1110 is fixed.

An end portion of the upper metal pattern of each of the first radiator 1110 and the second radiator 1120 may extend up to an end portion of the upper cover 1300*u*. The upper metal pattern of each of the third radiator 1130 and the fourth radiator 1140 may be formed in such a manner that an end thereof is offset by a predetermined distance from the upper cover 1300*u*. In this regard, the partition structures 1360*c* and 1360*d* of the third radiator 1130 and the fourth radiator 1140 are formed in such a manner that ends thereof are offset by a predetermined distance from a lateral surface of the upper cover 1300*u*. Therefore, the first and second Wi-Fi antennas 1160*a* and 1160*b* may be disposed in an area that is formed in a manner that is offset by a predetermined distance. The first and second Wi-Fi antennas 1160*a* and 1160*b* may be formed in a fused manner on the lateral surface of the upper cover 1300*u*. In addition, the first and second V2X antennas 1170*a* and 1170*b* may be attached inside a structure of the upper cover 1300*u*.

Referring to (a) of FIG. 9A and FIG. 18, the V2X antenna 1170 may be disposed along Line A on the lower area of the first radiator 1110. The first feeding pattern F1 for the first radiator 1110 may be disposed along Line B on the lower area of the first radiator 1110. The first feeding pattern F1 may be connected to the third metal pattern 1113 of the first radiator 1110. A feeding pattern F5 for the Wi-Fi antenna may be disposed along Line C on the lower area of the first radiator 1110.

Referring to FIGS. 5 to 6C, FIGS. 9A to 15A, and FIGS. 17 and 18, the first cover 1300*u* may be configured to include a plurality of coupling portions having inner-side surfaces. The plurality of coupling portions may be configured to include a first coupling portion 1360*a*, a second coupling portion 1360*b*, a third coupling portion 1360*c*, and a fourth coupling portion 1360*d*. The first conductive pattern 1110*a*, the second conductive pattern 1120*a*, the third conductive pattern 1130*a*, and the fourth conductive pattern 1140*a*, which constitute each radiator, may be attached to the first coupling portion 1360*a*, the second coupling portion 1360*b*, the third coupling portion 1360*c*, and the fourth coupling portion 1360*d*, respectively.

The first conductive pattern 1110*a* may include a first sub pattern 1111 and a second sub pattern 1112. The first sub pattern 1111 may be disposed on the first coupling portion 1360*a* positioned on an inner-side surface of the first cover 1300*u*. The first sub pattern 1111 may be disposed over the first slot radiation portion SP1 of the second cover 1300 in a manner that overlaps the first slot radiation portion SP1 thereof. The second sub pattern 1112 may be electrically connected to the first sub pattern 1111 and the first feeder F1. In this regard, the feeding pattern 1113 may also be regarded as being included in the second sub pattern 1112. The second conductive pattern 1120*a* may include a third sub pattern 1121 and a fourth sub pattern 1122. The third sub pattern 1121 may be disposed on the second coupling portion 1360*b* that is positioned on the inner-side surface of the first cover 1300*u*. The third sub pattern 1121 may be disposed over the first slot radiation portion SP2 of the second cover 1300 in a manner that overlaps the first slot radiation portion SP2 thereof. The fourth sub pattern 1122 may be electrically connected to the third sub pattern 1121 and the second feeder F2.

The third conductive pattern 1130*a* may include a fifth sub pattern 1131 and a sixth sub pattern 1132. The fifth sub pattern 1131 may be disposed on the third coupling portion 1360*c* that is positioned on the inner-side surface of the first cover 1300*u*. The fifth sub pattern 1131 may be disposed over the third slot radiation portion SP3 of the second cover 1300 in a manner that overlaps the third slot radiation portion SP3 thereof. The sixth sub pattern 1132 may be electrically connected to the fifth sub pattern 1131 and the third feeder F3. The fourth conductive pattern 1140*a* may include a seventh sub pattern 1171 and an eighth sub pattern 1142. The seventh sub pattern 1171 may be disposed on the fourth coupling portion 1360*d* that is positioned in the inner-side surface of the first cover 1300*u*. The seventh sub pattern 1171 may be disposed over the fourth slot radiation portion SP4 of the second cover 1300 in a manner that overlaps the fourth slot radiation portion SP4 thereof. The eighth sub pattern 1142 may be electrically connected to the seventh sub pattern 1171 and the fourth feeder F4.

Referring to FIG. 9A, the first sub pattern 1111, the third sub pattern 1121, the fifth sub pattern 1131, and the seventh sub pattern 1141 may be disposed on a higher portion than the heat sink 1020. In other words, the upper patterns of the radiators may be disposed on a portion that is higher by a predetermined distance on the z-axis than a portion where the heat sink 1020 is disposed. The first sub pattern 1111, the third sub pattern 1121, the fifth sub pattern 1131, and the seventh sub pattern 1141 may be disposed to be spaced a distance of 10 mm or greater apart away from (the end of) the heat sink 1020. Accordingly, heat dissipating through the heat sink 1020 is not blocked by the upper patterns of the radiators, and thus the heat dissipation performance can be improved.

Each of the antenna structures may be configured to include a monopole antenna portion and a bottom slot antenna portion. Referring to FIGS. 14A and 18, the first radiator 1100*a*, which is one of the antenna structures, may be configured to include a monopole antenna portion 1110 and a bottom slot antenna portion SP1. Each of the antenna structures may operate as a 4×4 Multi-input Multi-output (MIMO) system in frequency bands of 600 MHz to 6 GHz. Each of the antenna structures may be disposed within a volume size of width 86 mm, length 43 mm, and height 17 mm, but is not limited to this volume size. As another example, the second type radiator 1110*b* may be disposed within a volume size of width 73 mm, length 29 mm, and height 17 mm.

Figure 19:
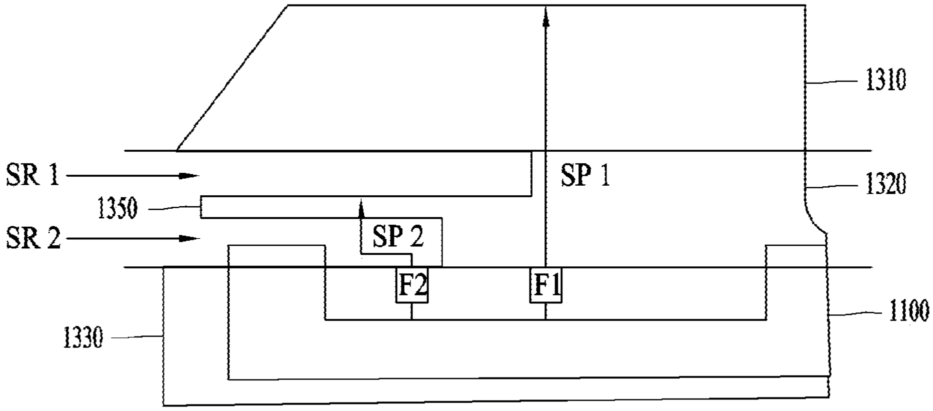
FIG. 19 is a set of views illustrating branch line structures according to different examples of the present specification.
Figure 19:
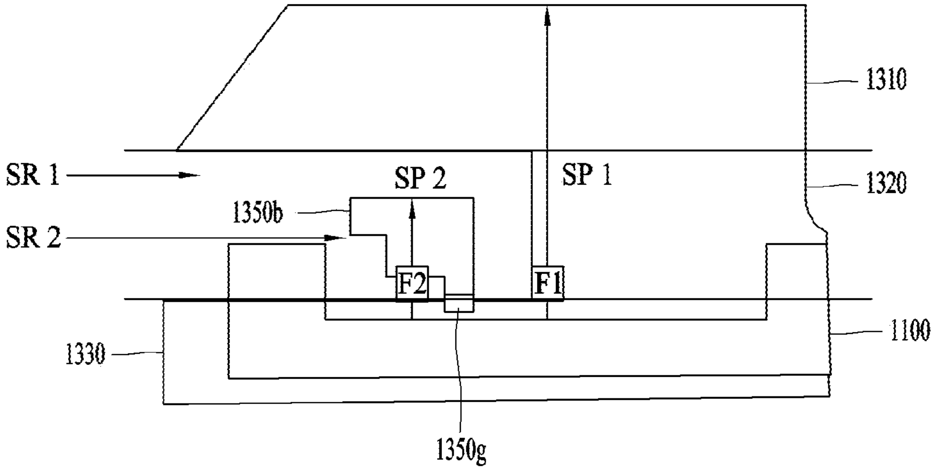

Meanwhile, the broadband antenna structure according to the present disclosure may be configured as a multi-stage slot structure, and the lengths of the slot region and branch line may vary depending on the application. In this regard, FIG. 19 illustrates branch line structures according to different examples of the present disclosure. Referring to (a) of FIG. 19, the position of the end of the branch line 1350 may be disposed more inside than the positions of the ends of the first metal plate 1310 and the third metal plate 1330. A first signal path SP1 may be formed by the first signals of the first band and the second band through the first feeder F1. A second current path SP2 may be formed by the second signal of the third band through the second feeder F2.

Referring to (b) of FIG. 19, the branch line 1350*b* may be configured as a separate board, that is, a separate PCB without being connected to the second metal plate 1320. The branch line 1350*b* may be connected to the third metal plate 1330 through the ground contact portion 1350*g*. The position of the end of the branch line 1350 may be disposed more inside than the positions of the ends of the first metal plate 1310 and the third metal plate 1330, similar to (a) of FIG. 14. A first signal path SP1 may be formed by the first signals of the first band and the second band through the first feeder F1. A second current path SP2 may be formed by the second signal of the third band through the second feeder F2. The second slot region SR2 is a slot region disposed in the lower region of the branch line 1350*b* corresponding to the metal pattern in the WiFi band.

Figure 20:
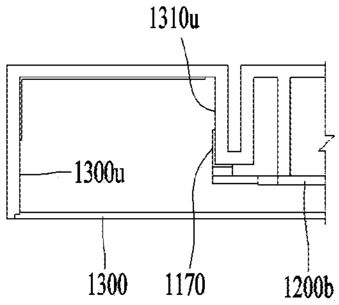
FIG. 20 is a table illustrating cross-sectional views taken along lines on a lower area of the first antenna of the vehicular antenna module according to the present disclosure, along with views illustrating contact portions.
Figure 20:
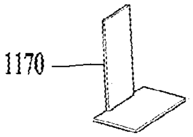
Figure 20:
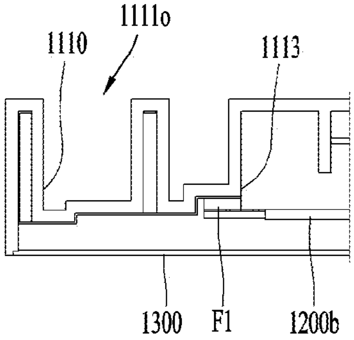
Figure 20:
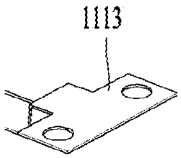
Figure 20:
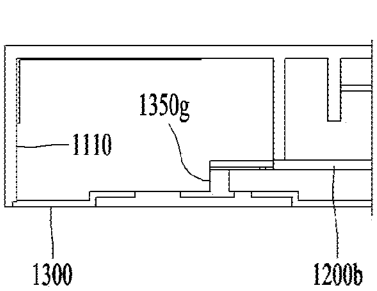
Figure 20:
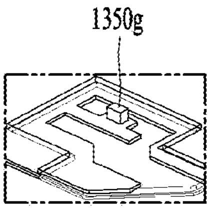

An area where the first antenna of the vehicular antenna module according to the present disclosure is disposed may be realized as a configuration for operating a multiplicity of antennas. In this regard, FIG. 20 is a table illustrating cross-sectional views taken along lines on the lower area of the first antenna of the vehicular antenna module according to the present disclosure, along with views illustrating contact portions.

Referring to (a) of FIG. 9A and FIGS. 18 to 20, the V2X antenna 1170 may be disposed along Line A on the lower area of the first radiator 1110. A side end portion of the upper cover 1300*u* may be coupled to the lower cover 1300. The V2X antenna 1170 attached to a surface of the upper cover 1300*u* may be connected to the first PCB 1200*b*. In order to fix the V2X antenna 1170 to the upper cover 1300*u*, a side portion 1310*u* may be formed inside the upper cover 1300*u*.

The first feeding pattern F1 for the first radiator 1110 may be disposed along Line B on the lower area of the first radiator 1110. The first feeding pattern F1 may be connected to the third metal pattern 1113 of the first radiator 1110. Along Line B, the opening area 1111*ob* may be formed on the first metal pattern 1111. An end of the third metal pattern 1113 may be connected to the first PCB 1200*b* through the first feeding pattern F1.

The feeding pattern F2 for the Wi-Fi antenna may be disposed along Line C on the lower area of the first radiator 1110. Along line C, the lower cover 1300 and the first PCB 1200*b* may be connected to each other through the ground contact portion 1350. In addition, referring to FIG. 18A, the lower cover 1300 and the first PCB 1200*b* may be connected to each other through the second feeding pattern F2.

The vehicular antenna module according to an aspect of the present disclosure is described above. The vehicle equipped with the vehicular antenna module according to another aspect of the present disclosure is described below. In this regard, the above-provided description of all configurations and the technical features may also apply to the following vehicle equipped with the vehicular antenna module.

Figure 21:
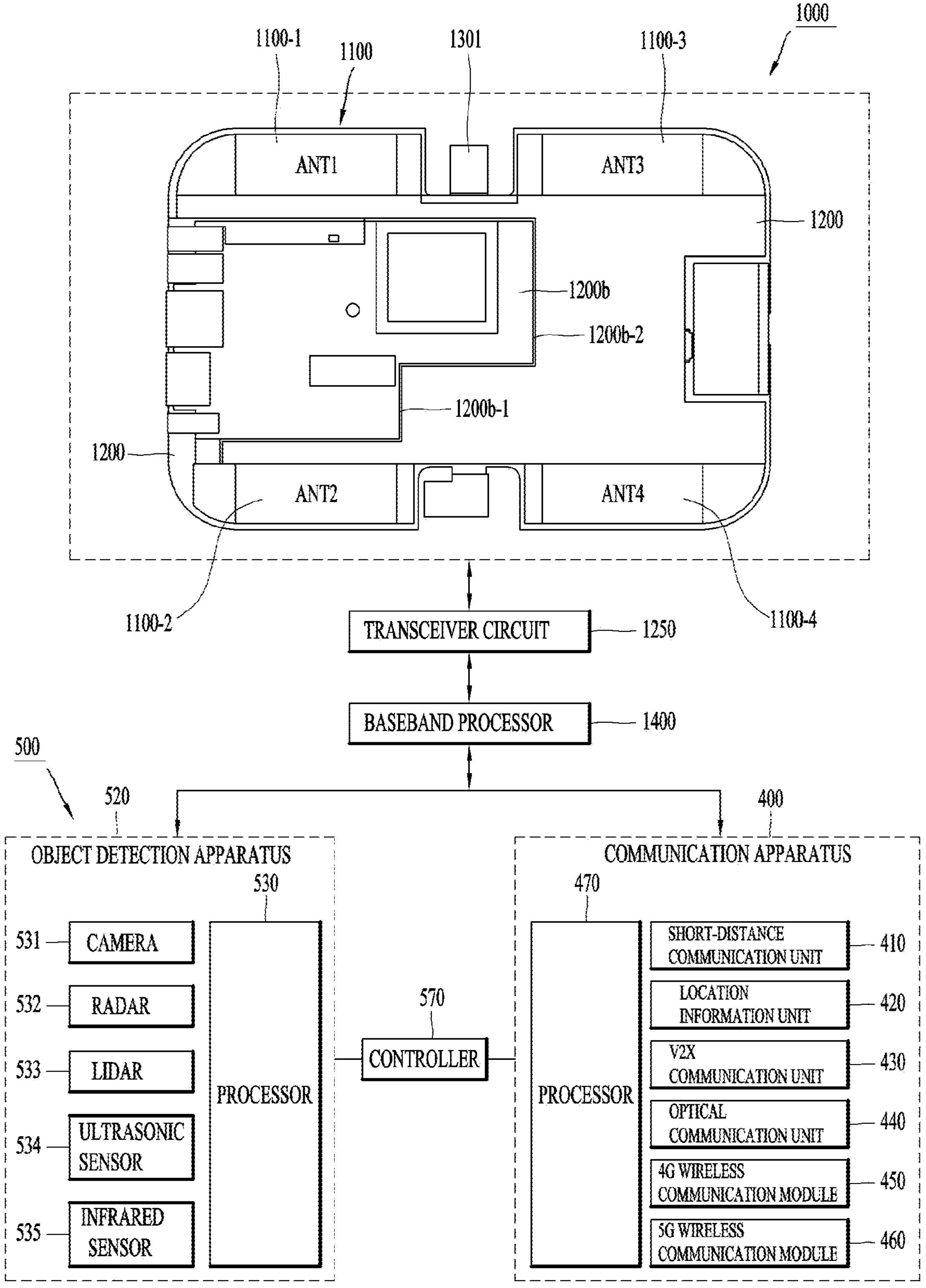
FIG. 21 is a view illustrating a configuration of an antenna module according to an embodiment and a configuration of a vehicle to which the antenna module is mounted.

Meanwhile, FIG. 21 is a block diagram illustrating an antenna module and a vehicle on which the antenna module is mounted according to the present disclosure. Specifically, FIG. 21 is a block diagram of a vehicle illustrating that an antenna module corresponding to an antenna module is mounted inside a roof of the vehicle to perform communications with adjacent electronic devices, vehicles, infrastructures.

Referring to FIG. 21, the broadband antenna module 1000 may be mounted on the vehicle. The antenna module 1000 may perform short-range communication, wireless communication, V2X communication, and the like by itself or through the communication apparatus 400. To this end, the baseband processor 1400 may perform control such that a signal is received from or transmitted to the adjacent vehicle, the RSU, and the base station through the antenna module 1000.

Alternatively, the baseband processor 1400 may perform control such that a signal is received from or transmitted to the adjacent vehicle, the RSU, the adjacent object, and the base station through the communication apparatus 400. Here, the information related to adjacent objects may be acquired through the object detecting apparatus such as the camera 531, the radar 532, the lidar 533, and the sensors 534 and 535 of the vehicle 300. Alternatively, the baseband processor 1400 may control the communication device 400 and the antenna module 1000 such that a signal is received from or transmitted to the adjacent vehicle, the RSU, the adjacent object, and the base station.

Meanwhile, referring to FIGS. 1A to 21, the vehicle 500 having the antenna module 1000 may include the plurality of antennas 1100, the transceiver circuitry 1250, and the baseband processor 1400. The vehicle 500 may further include the object detecting apparatus 520. The vehicle 500 may further include the communication apparatus 400. Here, the communication apparatus 400 may be configured to perform wireless communication through the antenna unit.

Referring to FIGS. 1A to 21, the vehicle 500 may include the antenna module 1000. The antenna module 1000 may be disposed on the bottom of the roof of the vehicle, and perform communication with at least one of an adjacent vehicle, a Road Side Unit (RSU), and a base station through the processor. Since the antenna module 1000 performs telematics operations through wireless communication in the vehicle, it may also be referred to as a telematics module. In this regard, the second PCB 1200 in the antenna module 1000 may be coupled with the first PCB 1200*b* that performs a telematics function. In this regard, the second PCB 1200 and the first PCB 1200*b* may be combined to interface with each other on the same plane.

Hereinafter, a vehicle 500 having an antenna module 1000 according to another aspect of the present disclosure will be described, with reference to FIGS. 1A to 21. The vehicle 500 may include an antenna module 1000 disposed below the roof of the vehicle. The vehicle 500 may further include a processor 1400 disposed inside or outside the antenna module 1000 and configured to communicate with at least one of an adjacent vehicle, a road side unit (RSU), and a base station.

The antenna module 1000 mounted on the vehicle may include a PCB 1110, a radiator 1110, a bottom cover 1300, and a top cover 1300*u*. Electronic components may be disposed on the PCB 1100. A PCB on which an antenna element such as the radiator 1110 may be disposed may be referred to as the second PCB 1100. Meanwhile, the second PCB 1100 may be configured to be coupled to the second PCB 1200 on which other electronic components are disposed. In this regard, the PCB 1100 and the second PCB 1200 may be formed as an integral PCB or separate PCBs.

The radiator 1110 may be configured to be electrically connected to the PCB 1100 through a side region (side surface region). The radiator 1110 may be formed as a metal pattern with predetermined length and width and configured to transmit and receive a first signal of a first band. In this regard, the first signal may be an LB signal for 4G communication or 5G communication. The first band may be a first sub-band of the LB band and may be about 700 MHz, but is not limited thereto.

The bottom cover 1300 may be disposed below the PCB 1100 and may be configured as a metal plate having slots regions SR1 and SR2. The top cover 1300*u* may be fastened to the bottom cover 1300 to accommodate the PCB 1100 and the radiator 1110 therein.

The metal plate 1300*m* of the bottom cover 1300 may include a first slot region SR1, a second slot region SR2, and a branch member 1350. The first slot region SR1 may be formed to have predetermined length and width on one side of the metal plate 1300*m*. The second slot region SR2 may be formed to have predetermined length and width to be parallel to the first slot region SR1. The branch member 1350 may be a metal plate having predetermined length and width and may be disposed between the first slot region SR1 and the second slot region SR2.

The antenna module may be configured to include a first feeder F1. The first feeder F1 may be disposed on the front surface of the PCB 1100. The first feeder F1 may be connected to the radiator 1110 to feed the first signal of the first band to the radiator. Additionally, the first feeder F1 may be connected to the radiator 1110 to feed the first signal of the second band to the slot regions SR1 and SR2. Additionally, the PCB 1100 may be connected to the bottom cover 1300 through a ground contact portion GC.

As described above, the first signal may be an LB signal for 4G communication or 5G communication. The second band may be a second sub-band of the LB band that is higher than the first sub-band and may be about 920 MHz, but is not limited thereto.

The radiator 1100 configured to radiate the first signal of the first band and the slot regions SR1 and SR2 of the metal plate 1300*m* configured to radiate the first signal of the second band may constitute a main antenna. The main antenna may be configured to operate in the LB band of the 4G communication or 5G communication bands.

The antenna module may further include a second feeder F2. The second feeder F2 may be configured to be disposed between the branch line 1350 and the metal plate forming the second slot region SR2. The second feeder F2 may be configured to feed a second signal of a third band higher than the second band to the second slot region SR2. The third band may be a frequency band for WiFi communication, and the second signal may be a WiFi signal. Accordingly, the second slot region SR2 configured to radiate the second signal of the third band may configure a WiFi antenna operating in the WiFi frequency band.

Meanwhile, a first radiator (ANT1) 1100-1, a second radiator (ANT2) 1100-2, a third radiator (ANT2) 1100-3, and a fourth radiator (ANT4) 1100-4 that are disposed on top and bottom of one side and top and bottom of another side of the bottom cover 1300. The first radiator (ANT1) 1100-1 through the fourth radiator (ANT3) 1100-4 correspond to the first through fourth radiators 1110 to 1140 of FIGS. 5 to 18B. First to fourth slot portions SP1 to SP4 may be disposed to correspond to the first to fourth radiators (ANT1 to ANT4) 1100-1 to 1100-4.

The antenna module 1000 may be disposed under the roof of the vehicle or within the roof structure in the vehicle 500 to which the antenna module 1000 is mounted. The vehicle 1400 may further include the processor 1400. The processor 1400 may be disposed inside or outside the antenna module 1000. The processor 1400 may be configured to communicate with at least one of the following: a nearby vehicle, a road side unit (RSU), or a base station.

The antenna module 1000 may include the first PCB 1200*b* on which electronic components are disposed and which constitutes a first area and a second area. The antenna module 1000 may include the second PCB 1200 which constitutes a third area by being coupled to the first PCB 1200*b* and on which at least one antenna element is disposed.

The antenna module 1000 may include the lower cover 1300 which is disposed under the first PCB 1200*b* and the second PCB 1200 and on which the first protrusion part 1301 and the second protrusion part 1302 are formed in the second area. The first PCB 1200*b*, the first radiator (ANT1) 1100-1, and the second radiator (ANT2) 1100-2 may be provided in the first area of the antenna module 1000. The first part P1 of the first PCB 1200*b* may be disposed between the first radiator (ANT1) 1100-1 and the second radiator (ANT2) 1100-2. The first PCB 1200*b* and the first recess segment 1303 and the second recess segment 1304 in the lower cover 1300 may be provided in the second area of the antenna module 1000. The second part P2 of the first PCB 1200*b* may be disposed between the first recess segment 1303 and the second recess segment 1304. The first protrusion part 1301 may be formed in the first recess segment 1303 in a manner that extends from the lower cover 1300. The second protrusion part 1302 may be formed in the second recess segment 1304 in a manner that extends from the lower cover 1300.

The second PCB 1200, the third radiator (ANT3) 1100-3, and the fourth radiator (ANT3) 1100-4 may be provided in the third area of the antenna module 1000. The second PCB 1200 may be disposed between the third radiator (ANT3) 1100-3 and the fourth radiator (ANT3) 1100-4. The processor 1400 disposed on the first PCB 1200*b* may be included in a network access device (NAD) configured to control a signal that is applied to the first to fourth radiators (ANT1 to ANT4) 1100-1 to 1100-4.

The first PCB 1200*b* and the second PCB 1200 may be operatively coupled to each other by the board-to-board connectors 1010*a* and 1010*b*. When a signal that is received through the third radiator (ANT3) 1100-3 disposed in the third area by the board-to-board connectors 1010*a* and 1010*b* is at or below a threshold value, the NAD may control a signal transfer path in such a manner that a signal is received or transmitted through the first radiator (ANT1) 1100-1 or the second radiator (ANT2) 1100-2 that is disposed in the first area.

The first to fourth radiators (ANT1 to ANT4) 1100-1 to 1100-4 may be disposed in an upper region of the first area, a lower region of the first area, an upper region of the third area, and a lower region of the third area, respectively. The antenna module 1000 may include the heat sink 1020 that is disposed in the second area of the antenna module 1000 and is configured as a structure formed of a metal material in such a manner as to absorb heat generated from the NAD 1400. The heat sink 1020 may be disposed in a middle region of the second area. The middle region thereof is positioned halfway between the upper regions of the first area and the third area, where the first radiator (ANT1) 1110-1 and the third radiator (ANT3) 1110-3 are disposed, respectively, and halfway between the lower regions of the first area and the third area, where the second radiator (ANT2) 1110-2 and the fourth radiator (ANT4) are disposed, respectively. The heat sink 1020 may be disposed in the middle region of the second area between the upper region of the second area and the lower region of the second area where the first protrusion part 1301 and the second protrusion part 1302 are disposed, respectively.

The first protrusion part 1301 may be formed to extend perpendicularly from the lower end of the first recess segment 1303 and to run in the first direction that is the upward direction. The second protrusion part 1302 may be formed to extend perpendicularly from the lower end of the second recess segment 1303 and to run in the second direction that is perpendicular to the first direction and is a direction in which one side thereof is adjacent to the second radiator (ANT2) 1100-2. The processor 1400 may perform MIMO in a low band LB using two or more antennas, among the first to fourth radiators (ANT1 to ANT4) 1100-1 to 1100-4. When a difference between first and second signals that are received through two or more antennas is at or above a threshold value, the process 1400 may perform control in such a manner that a signal is received and transmitted in the low band LB using the second radiator (ANT2) 1100-2 adjacent to the second protrusion part 1302.

The transceiver circuitry 1250 may be operably coupled to each radiator module 1100. The processor 1400 may be operably coupled to the transceiver circuity 1250. The processor 1400 may be a baseband processor corresponding to a modem, but is not limited thereto and may be any processor that controls the transceiver circuity 1250. The processor 1400 of the vehicle may be implemented as a network access device (NAD) and may be referred to as a wireless communication control IC.

The transceiver circuitry 1250 may be operably coupled to the MIMO antennas ANT1 to ANT4. The transceiver circuitry 1250 may include a front end module (FEM) such as a power amplifier or a receiving amplifier. As another example, the front end module (FEM) may be disposed between the transceiver circuitry 1250 and the antenna, separately from the transceiver circuitry 1250. The transceiver circuitry 1250 may control the amplitude and/or phase of signals transmitted to the MIMO antennas ANT1 to ANT4 or control only some antenna modules to operate by adjusting the gain or input or output power of the power amplifier or the receiving amplifier.

The processor 1400 may be operably coupled to the transceiver circuitry 1250 and may be configured to control the transceiver circuitry 1250. The processor 1400 may control the transceiver circuitry 1250 to control the amplitude and/or phase of the signals transmitted to the MIMO antennas ANT1 to ANT4 or to operate only some antenna modules. The processor 1400 may perform communication with at least one of the adjacent vehicle, the RSU, and the base station through the transceiver circuitry 1250.

In a case where there is a need to simultaneously receive information from various entities such as the adjacent vehicle, the RSU, and the base station for autonomous driving, etc., information may be received and transmitted through MIMO. Accordingly, the vehicle can improve its communication capacity by receiving different information from various entities at the same time. Therefore, the communication capacity of the vehicle can be improved through the MIMO without increasing a bandwidth.

Alternatively, the vehicle may simultaneously receive the same information from various entities, so as to improve reliability of surrounding information and decrease latency. Accordingly, ultra reliable low latency communication (URLLC) can be performed in the vehicle and the vehicle can operate as a URLLC UE. To this end, a base station that performs scheduling may preferentially allocate a time slot for the vehicle operating as the URLLC UE. For this, some of specific time-frequency resources already allocated to other UEs may be punctured.

As described above, the plurality of antennas ANT1 to ANT4 for 4G/5G communication within the antenna module 1000 may operate in the full band including the low band (LB), the mid band (MB), and the high band (HB). Here, the low band (LB) may be referred to as the first (frequency) band and the mid band (MB) and the high band (HB) may be referred to as the second (frequency) band. As another example, when the antenna system 1000 operates in the mid band (MB) and the high band (HB), the middle band (MB) is referred to as a first (frequency) band and the high band (HB) is referred to as a second (frequency) band. The 5G SUB6 band may be the same band as the LTE band in case of LTE re-farming. When 5G NR operates in a band separate from LTE, it may operate in the high band (HB) or a higher band. The 5G SUB6 band operating in the high band (HB) or higher band may also be referred to as a second (frequency) band.

The baseband processor 1400 can perform MIMO through some of the plurality of antenna elements ANT1 to ANT4 in the first frequency band. Also, the baseband processor 1400 can perform MIMO through some of the plurality of antenna elements ANT1 to ANT4 in the second frequency band. In this regard, the baseband processor 1400 can perform MIMO by using antenna elements that are sufficiently spaced apart from each other and disposed by being rotated at a predetermined angle. This can improve isolation between the first and second signals within the same band.

The baseband processor 1400 may control the transceiver circuitry 1250 to receive the second signal of the second frequency band while receiving the first signal of the first frequency band through one of the first to fourth radiators ANT1 to ANT4. In this case, there is an advantage that the baseband processor 1400 can perform carrier aggregation (CA) through one antenna.

Alternatively, the baseband processor 1400 may control the transceiver circuitry 1250 to receive the first signal of the second band through any one of the second radiator ANT2 and the fourth radiator ANT4 while receiving the first signal of the second band through any one of the first radiator ANT1 and the third radiator ANT3. In this case, there may be provided an advantage that each antenna can be designed to optimally operate in a corresponding band.

Therefore, the baseband processor 1400 can perform carrier aggregation (CA) through a combination of the first frequency band and the second frequency band. When it is necessary to receive a large amount of data for autonomous driving or the like, reception in a broad band can be allowed through the CA.

Accordingly, cMBB (Enhanced Mobile Broad Band) communication can be performed in the vehicle and the vehicle can operate as an eMBB UE. To this end, the base station that performs scheduling may allocate a broadband frequency resource to the vehicle that operates as the cMBB UE. To this end, the CA may be performed on frequency bands that are available, except for frequency resources already allocated to other UEs.

Regard the frequency band, the low band (LB), the mid band (MB), and the high band (HB) may be referred to as the first band, the second band, and the third band, respectively. The antenna system 1000 may operate as a single antenna in the first band, the second band, and the third band corresponding to the low band (LB), the middle band (MB), and the high band (HB). In this regard, the processor 1400 may determine a resource region allocated through a physical downlink control channel (PDCCH). The processor 1400 may control the transceiver circuitry 1250 to perform carrier aggregation in two or more of the first to third bands based on the allocated resource region.

The processor 1400 may perform MIMO in an EN-DC state through the first to fourth radiators ANT1 to ANT4. For example, the processor 1400 may perform an EN-DC operation through the first radiator ANT1 and the second radiator ANT2, and MIMO through the third radiator ANT3 and the fourth radiator ANT4.

In this regard, when the EN-DC operation is performed between a 4G/5G communication system and a WiFi communication system using different bands, the processor 1400 may perform the EN-DC operation through a plurality of antennas in one antenna system. Accordingly, an interference level between MIMO streams using the same band can be reduced. On the other hand, when the EN-DC operation is performed between the 4G and 5G communication systems using the same band, the processor 1400 may perform the EN-DC operation through a plurality of antennas in different antenna systems. In this case, in order to reduce the interference level in the low band (LB), the MIMO operation through the plurality of antennas in the same antenna system may be performed in the mid band (MB) or higher.

It will be clearly understood by those skilled in the art that various modifications and alternations for the aforementioned implementations related to the antenna system having the plurality of antennas, the vehicle having the antenna system, and the control operations thereof are made without departing from the idea and scope of the present disclosure. Therefore, it should be understood that such various modifications and alternations for the implementations fall within the scope of the appended claims.

In the above, an antenna module having a broadband antenna mounted on a vehicle and a vehicle including the antenna module have been described. The technical effects of such antenna module having the broadband antenna mounted on the vehicle and the vehicle equipped with the antenna module will be described as follows.

According to the present disclosure, the performance of each antenna can be optimized in the antenna module in which a plurality of antennas for 4G/5G communication are disposed.

According to the present disclosure, the antenna module in which, in addition to a 4G/5G antenna, antennas such as a GNSS antenna, a Wi-Fi antenna, and an SDARS antenna are optimally disposed can be configured. In this regard, the antenna performance can be maintained while reducing the size of the metal pattern of the 4G/5G antenna.

According to the present disclosure, various coupling structures of the antenna board and the TCU board can be provided in the vehicular antenna module. In this regard, the antenna board and the TCU board can be coupled to each other on the same plane. In addition, a plurality of antenna elements can be connected to the feeding pattern of the antenna board or the TCU board in order to optimize the size of all antennas.

According to the present disclosure, the antenna performance and the heat dissipation performance can be improved in various coupling structures of the antenna board and the TCU board in the vehicular antenna modules. In this regard, the 4G/5G antenna elements can be disposed on top and bottom of one side and top and bottom of another side of the antenna module, and the heat sink can be disposed in the center area of the antenna module.

According to the present disclosure, isolation can be maintained while optimizing both antenna performance for MIMO and antenna performance for WiFi. In this regard, the Wi-Fi antenna can be realized by forming the slot structure in the lower cover disposed in the lower area of at least one of the antennas.

According to the present disclosure, even in a case where a body of the vehicle or one portion of a roof of the vehicle is formed of a metal material, a wireless signal can be provided to a reason inside the vehicle. In this regard, the upper cover of the antenna module can be made of a dielectric material, and the slot antenna can be realized in the lower cover formed of a metal material.

According to the present disclosure, the antenna operating in a dual mode is enabled to operate in a dual mode while utilizing a ground region of the body, which constitutes the antenna module, as an antenna. In this regard, the slot antenna can be realized in the lower cover formed of a metal material, and another radiator can be disposed in the upper area.

According to the present disclosure, the antenna performance can be improved while maintaining the height of the antenna module at a predetermined level or less. In this regard, each radiator of the 4G/5G antenna can be formed to have a three-dimensional structure and can be designed in such a manner that the height thereof is minimized.

According to the present disclosure, a structure for mounting the antenna module, which is capable of operating in a wide frequency band to support various communication systems, to the vehicle can be provided. In this regard, the antenna module in which, in addition to a 4G/5G antenna, antennas such as a GNSS antenna, a Wi-Fi antenna, a V2X antenna, and an SDARS antenna are optimally disposed can be configured.

Further scope of applicability of the present disclosure will become apparent from the foregoing detailed description. It should be understood, however, that the detailed description and specific examples, such as the preferred embodiment of the present disclosure, are given by way of illustration only, since various modifications and alternations within the spirit and scope of the disclosure will be apparent to those skilled in the art.

In relation to the foregoing description, the antenna system mounted in the vehicle and the operation of controlling the same may be implemented by software, firmware, or a combination thereof. Meanwhile, the design of the antenna system mounted in the vehicle and the configuration of controlling the antenna system can be implemented as computer-readable codes in a program-recorded medium. The computer-readable medium may include all types of recording devices each storing data readable by a computer system. Examples of such computer-readable media may include hard disk drive (HDD), solid status disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may also include a controller of a terminal or vehicle, namely, a processor. Therefore, the detailed description should not be limitedly construed in all of the aspects, and should be understood to be illustrative. The scope of the invention should be determined by reasonable interpretation of the appended claims and all changes that come within the equivalent scope of the invention are included in the scope of the disclosure.

The invention claimed is:

1. A vehicle comprising:

a roof structure formed as part of an exterior of the vehicle and including a first fixing part and a second fixing part; and an antenna assembly disposed in the roof structure, wherein the antenna assembly comprises:

a first cover including a first groove portion and a second groove portion in an outer-side surface thereof and a plurality of coupling portions in an inner-side surface thereof, the first groove portion being coupled to the first fixing part of the roof structure, and the second groove portion being coupled to the second fixing part of the roof structure;

a second cover formed of a metal material, coupled to the first cover, and including four side portions;

a first printed circuit board (PCB) disposed in an inner space formed by the first cover and the second cover, the first PCB including a wireless communication control integrated circuit (IC) configured to process a wireless signal, the first PCB including a first feeder and a second feeder;

a second PCB disposed in the inner space formed by the first cover and the second cover, the second PCB including a third feeder and a fourth feeder, the second PCB being coupled to the first PCB; and a plurality of antenna structures disposed in the inner space formed by the first cover and the second cover, the plurality of antenna structures including a first radiator, a second radiator, a third radiator, and a fourth radiator, wherein a first side portion and a third side portion of the four side portions are opposite to each other, a second side portion and a fourth side portion thereof are opposite to each other, the first side portion includes a first slot portion and a second slot portion, the third side portion includes a third slot portion and a fourth slot portion, the second side portion includes a first recess segment and a first protrusion part within the first recess segment, and the fourth side portion includes a second recess segment and a second protrusion part within the second recess segment, wherein the first radiator includes a first conductive pattern and a first slot radiation portion, the first conductive pattern is disposed between the first cover and the first PCB, and the first conductive pattern is electrically connected to the first feeder disposed in a vicinity of the first slot radiation portion, wherein the second radiator includes a second conductive pattern and a second slot radiation portion, the second conductive pattern is disposed between the first cover and the first PCB, and the second conductive pattern is electrically connected to the second feeder disposed in a vicinity of the second slot radiation portion, wherein the third radiator includes a third conductive pattern and a third slot radiation portion, the third conductive pattern is disposed between the first cover and the second PCB, and the third conductive pattern is electrically connected to third feeder disposed in a vicinity of the third slot radiation portion, wherein the fourth radiator includes a fourth conductive pattern and a fourth slot radiation portion, the fourth conductive pattern is disposed between the first cover and the second PCB, and the fourth conductive pattern is electrically connected to the fourth feeder disposed in a vicinity of the fourth slot radiation portion, and wherein the first fixing part and the first protrusion part are fixed to the first groove portion by a first coupling member, and the second fixing part and the second protrusion part are fixed to the second groove portion by a second coupling member.

2. The vehicle of claim 1, wherein a first part of the first PCB is disposed between the first slot radiation portion and the second slot radiation portion, a second part of the first PCB is disposed between the first recess segment and the second recess segment, and the second PCB is disposed between the third slot radiation portion and the fourth slot radiation portion.

3. The vehicle of claim 1, wherein the first PCB further includes a first connector positioned on a first part of the first PCB, and the second PCB further includes a second connector configured to be coupled to the first connector of the first PCB.

4. The vehicle of claim 1, wherein the first PCB further includes a first ground portion, and the first ground portion and the second cover is connected at a plurality of contact points, and wherein the second PCB further includes a second ground portion, and the second ground portion and the second cover are connected at a plurality of contact points.

5. The vehicle of claim 2, wherein the wireless communication control IC of the first PCB is disposed on the second part of the first PCB, the first cover includes an opening area, and the opening area in the first cover faces the wireless communication control IC on the first PCB.

6. The vehicle of claim 5, wherein the opening area in the first cover is covered by a heat sink having a metal structure, and heat generated by the wireless communication control IC is transferred to the heat sink.

7. The vehicle of claim 1, wherein the first slot radiation portion and the second slot radiation portion are in parallel to the first side portion, and the first slot radiation portion has a greater size than the second slot radiation portion.

8. The vehicle of claim 1, wherein the first PCB further includes a fifth feeder, the first slot radiation portion includes a fifth conductive pattern connected to the second cover, the fifth conductive pattern is electrically connected to the fifth conductive pattern within the first slot radiation portion, and the first feeder and the fifth conductive pattern are disposed on the opposite surfaces of the first PCB.

9. The vehicle of claim 1, wherein the third slot radiation portion and the fourth slot radiation portion are in parallel to the third side portion, and the third slot radiation portion has a smaller size than the fourth slot radiation portion.

10. The vehicle of claim 1, wherein the first slot radiation portion is covered by a first dielectric cover within the second cover, the second slot radiation portion is covered by a second dielectric cover within the second cover, the third slot radiation portion is covered by a third dielectric cover within the second cover, and the fourth slot radiation portion is covered by a fourth dielectric cover within the second cover.

11. The vehicle of claim 1, wherein the first protrusion part is connected at a middle portion of the first recess segment, the second protrusion part is connected at a middle portion of the second recess segment, and the second protrusion part further includes a sub-protrusion portion that protrudes toward the second slot radiation portion within the second recess segment.

12. The vehicle of claim 6, wherein the plurality of coupling portions positioned on an inner-side of the first cover include a first coupling portion, a second coupling portion, a third coupling portion, and a fourth coupling portion, wherein the first conductive pattern includes a first sub pattern and a second sub pattern, the first sub pattern is disposed on the first coupling portion positioned on the inner-side surface of the first cover, the first sub pattern overlaps the first slot radiation portion of the second cover, and the second sub pattern is electrically connected to the first sub pattern and the first feeder, wherein the second conductive pattern includes a third sub pattern and a fourth sub pattern, the third sub pattern is disposed on the second coupling portion positioned on the inner-side surface of the first cover, the third sub pattern overlaps the second slot radiation portion of the second cover, and the fourth sub pattern is electrically connected to the third sub pattern and the second feeder, wherein the third conductive pattern includes a fifth sub pattern and a sixth sub pattern, the fifth sub pattern is disposed on the third coupling portion positioned on the inner-side surface of the first cover, the fifth sub pattern overlaps the third slot radiation portion of the second cover, and the sixth sub pattern is electrically connected to the fifth sub pattern and the third feeder, and wherein the fourth conductive pattern includes a seventh sub pattern and an eighth sub pattern, the seventh sub pattern is disposed on the fourth coupling portion positioned on the inner-side surface of the first cover, the seventh sub pattern overlaps the fourth slot radiation portion of the second cover, and the eighth sub pattern is electrically connected to the seventh sub pattern and the fourth feeder.

13. The vehicle of claim 12, wherein the first sub pattern, the third sub pattern, the fifth sub pattern, and the seventh sub pattern are disposed at a higher portion than the heat sink.

14. The vehicle of claim 12, wherein the first sub pattern, the third sub pattern, the fifth sub pattern, and the seventh sub pattern are disposed to be spaced a distance of 10 mm or greater apart away from the heat sink.

15. The vehicle of claim 1, wherein each of the antenna structures includes a monopole antenna portion and a bottom slot antenna portion.

16. The vehicle of claim 1, wherein each of the antenna structures operates as a 4×4 Multi-input Multi-output (MIMO) system in frequency bands of 600 MHz to 6 GHz.

17. The vehicle of claim 1, wherein each of the antenna structures is disposed within a volume size of width 86 mm, length 43 mm, and height 17 mm.

18. The vehicle of claim 1, wherein the first fixing part and the second fixing part each have the shape of a bolt, and the first coupling member and the second coupling member each have the shape of a nut.

19. The vehicle of claim 1, wherein when a signal received from the third radiator or the fourth radiator falls below a predetermined level, the wireless communication control IC is configured to receive only a signal received from the first radiator or the second radiator.

20. A vehicle comprising:

a roof structure formed as part of an exterior of the vehicle and including a first fixing part and a second fixing part; and an antenna assembly disposed in the roof structure, wherein the antenna assembly comprises:

a first cover including a first groove portion and a second groove portion in an outer-side surface thereof and a plurality of coupling portions in an inner-side surface thereof, the first groove portion being coupled to the first fixing part of the roof structure, and the second groove portion being coupled to the second fixing part of the roof structure;

a second cover formed of a metal material, coupled to the first cover, and including four side portions;

a first printed circuit board (PCB) disposed in an inner space formed by the first cover and the second cover, the first PCB including a wireless communication control integrated circuit (IC) configured to process a wireless signal, a second PCB disposed in the inner space formed by the first cover and the second cover, the second PCB including a first feeder, a second feeder, a third feeder, and a fourth feeder, and the second PCB being coupled to the first PCB; and a plurality of antenna structures disposed in the inner space formed by the first cover and the second cover, the plurality of antenna structures including a first radiator, a second radiator, a third radiator, and a fourth radiator, wherein a first side portion and a third side portion of the four side portions are opposite portions, a second side portion and a fourth side portion thereof are opposite portions, the first side portion includes a first slot portion and a second slot portion, the third side portion includes a third slot portion and a fourth slot portion, the second side portion includes a first recess segment and a first protrusion part within the first recess segment, and the fourth side portion includes a second recess segment and a second protrusion part within the second recess segment, wherein the first radiator includes a first conductive pattern and a first slot radiation portion, the first conductive pattern is disposed between the first cover and the first PCB, and the first conductive pattern is electrically connected to the first feeder disposed in a vicinity of the first slot radiation portion, wherein the second radiator includes a second conductive pattern and a second slot radiation portion, the second conductive pattern is disposed between the first cover and the first PCB, and the second conductive pattern is electrically connected to the second feeder disposed in a vicinity of the second slot radiation portion, wherein the third radiator includes a third conductive pattern and a third slot radiation portion, the third conductive pattern is disposed between the first cover and the second PCB, and the third conductive pattern is electrically connected to the third feeder disposed in a vicinity of the third slot radiation portion, wherein the fourth radiator includes a fourth conductive pattern and a fourth slot radiation portion, the fourth conductive pattern is disposed between the first cover and the second PCB, and the fourth conductive pattern is electrically connected to the fourth feeder disposed in a vicinity of the fourth slot radiation portion, and wherein the first fixing part and the first protrusion part are fixed to the first groove portion by a first coupling member, and the second fixing part and the second protrusion part are fixed to the second groove portion by a second coupling member.

21. A vehicle comprising:

a roof structure formed as part of an exterior of the vehicle and including a first fixing part and a second fixing part; and an antenna assembly disposed in the roof structure, wherein the antenna assembly comprises:

a first cover including a first groove portion and a second groove portion in an outer-side surface thereof and a plurality of coupling portions in an inner-side surface thereof, the first groove portion being coupled to the first fixing part of the roof structure, and the second groove portion being coupled to the second fixing part of the roof structure;

a second cover formed of a metal material, coupled to the first cover, and including four side portions;

a first printed circuit board (PCB) disposed in an inner space formed by the first cover and the second cover, the first PCB including a wireless communication control integrated circuit (IC) configured to process a wireless signal, the first PCB including a first feeder;

a second PCB disposed in the inner space formed by the first cover and the second cover, the second PCB including a second feeder, a third feeder, and a fourth feeder, and the second PCB being coupled to the first PCB; and a plurality of antenna structures disposed in the inner space formed by the first cover and the second cover, the plurality of antenna structures including a first radiator, a second radiator, a third radiator, and a fourth radiator, wherein a first side portion and a third side portion of the four side portions are opposite portions, a second side portion and a fourth side portion thereof are opposite portions, the first side portion includes a first slot portion and a second slot portion, the third side portion includes a third slot portion and a fourth slot portion, the second side portion includes a first recess segment and a first protrusion part within the first recess segment, and the fourth side portion includes a second recess segment and a second protrusion part within the second recess segment, wherein the first radiator includes a first conductive pattern and a first slot radiation portion, the first conductive pattern is disposed between the first cover and the first PCB, and the first conductive pattern is electrically connected to the first feeder disposed in a vicinity of the first slot radiation portion, wherein the second radiator includes a second conductive pattern and a second slot radiation portion, the second conductive pattern is disposed between the first cover and the first PCB, and the second conductive pattern is electrically connected to the second feeder disposed in a vicinity of the second slot radiation portion, wherein the third radiator includes a third conductive pattern and a third slot radiation portion, the third conductive pattern is disposed between the first cover and the second PCB, and the third conductive pattern is electrically connected to the third feeder disposed in a vicinity of the third slot radiation portion, wherein the fourth radiator includes a fourth conductive pattern and a fourth slot radiation portion, the fourth conductive pattern is disposed between the first cover and the second PCB, and the fourth conductive pattern is electrically connected to the fourth feeder disposed in a vicinity of the fourth slot radiation portion, and wherein the first fixing part and the first protrusion part are fixed to the first groove portion by a first coupling member, and the second fixing part and the second protrusion part are fixed to the second groove portion by a second coupling member.

22. The vehicle of claim 20, wherein a first part of the first PCB is disposed between the first slot radiation portion and the second slot radiation portion, and a second part of the first PCB is disposed between the first recess segment and the second recess segment, and wherein a first part of the second PCB is disposed between the third slot radiation portion and the fourth slot radiation portion, and a second part of the second PCB is disposed between the first slot radiation portion and the first slot radiation portion.

* * * * *